(12) United States Patent
Rome et al.

(10) Patent No.: US 7,851,932 B2
(45) Date of Patent: Dec. 14, 2010

(54) BACKPACK BASED SYSTEM FOR HUMAN ELECTRICITY GENERATION AND USE WHEN OFF THE ELECTRIC GRID

(75) Inventors: Lawrence Craig Rome, Strafford, PA (US); Heath Fred Hofmann, State College, PA (US); Guanghui Wang, Huixian (CN)

(73) Assignee: Lightning Packs, LLC, Strafford, PA (US)

( * ) Notice: Subject to any disclaimer, the term of this patent is extended or adjusted under 35 U.S.C. 154(b) by 366 days.

(21) Appl. No.: 12/059,440

(22) Filed: Mar. 31, 2008

(65) Prior Publication Data
US 2009/0015022 A1    Jan. 15, 2009

Related U.S. Application Data

(60) Provisional application No. 60/921,239, filed on Mar. 29, 2007, provisional application No. 60/921,240, filed on Mar. 29, 2007, provisional application No. 60/921,241, filed on Mar. 29, 2007.

(51) Int. Cl.
| | |
|---|---|
| *B60L 11/02* | (2006.01) |
| *B61C 9/38* | (2006.01) |
| *H02K 23/52* | (2006.01) |
| *F02B 63/04* | (2006.01) |
| *F02B 67/04* | (2006.01) |
| *G01P 15/00* | (2006.01) |
| *A45C 15/00* | (2006.01) |
| *A45F 3/00* | (2006.01) |

(52) U.S. Cl. ............... 290/10; 290/1 A; 290/1 R; 73/514.18; 224/576; 224/634; 224/641; 224/929; 224/930; 224/604; 224/627; 224/630; 224/631; 307/150; 323/222; 323/282; 363/21.12; 361/235; 320/114; 320/166; 703/24; 703/28

(58) Field of Classification Search ............... 290/1 A, 290/1 R, 10; 73/514.18; 224/576, 633, 634, 224/641, 929, 930, 604, 627, 630, 631; 307/125–131; 307/150; 323/222, 282; 363/21.12; 361/235; 320/114, 166; 703/24, 28
See application file for complete search history.

(56) References Cited

U.S. PATENT DOCUMENTS 3,672,306 A * 6/1972 Dehne et al. ............... 104/89

(Continued)

FOREIGN PATENT DOCUMENTS

CA    2385481    11/2002

(Continued)

OTHER PUBLICATIONS

Alexander et al., "Energy-Saving Mechanisms in Walking and Running," Journal of Experimental Biology, No Month Available, 1991, vol. 160, pp. 55-69.

(Continued)

*Primary Examiner*—T C Patel
*Assistant Examiner*—Pedro J Cuevas
(74) *Attorney, Agent, or Firm*—Woodcock Washburn LLP

(57) ABSTRACT

An electricity-generating backpack that is substantially lighter in weight, has the multiple springs replaced with one large spring whose spring constant can be adjusted in the field in seconds, and replaces a DC generator with a brushless AC generator that permits approximately 70% generator efficiency and the generation of up to 20 W of electrical power by converting mechanical energy to electrical power. A device is provided that always removes some electricity, but not too much, as necessary to extract large levels of the electricity while controlling damping by providing electrical damping circuits including a DC-DC converter designed to emulate a desired load at its input terminals. Additional electricity generating E-MOD devices may be used for generating additional power by hooking an E-Mod device to a generator and to the backpack belt at the wearer's hip and includes a wand that fits against the wearer's femur so as to move through a range of motion as the patient walks. The system also provides multiple possibilities of electricity generation when not walking including a light-weight bicycle ergometer which can be mounted to the backpack frame and generate very high power levels (100 W). The electricity generated and stored by the backpack may be used to charge batteries and to power a number of devices that may be carried by the backpack, such as a Sterling Cooler System that is powered by the backpack's stored power to provide cooling power for cooling items carried by the backpack.

35 Claims, 33 Drawing Sheets

U.S. PATENT DOCUMENTS

| | | | |
|---|---|---|---|
| 3,677,357 A * | 7/1972 | Baumgartner | 177/188 |
| 3,760,905 A | 9/1973 | Dower | 185/2 |
| 3,914,669 A * | 10/1975 | Holtz | 104/293 |
| 3,914,670 A * | 10/1975 | Holtz | 104/292 |
| 4,194,656 A | 3/1980 | Zufich | 224/631 |
| 4,887,751 A | 12/1989 | Lehman | 224/629 |
| 5,136,173 A | 8/1992 | Rynne | 290/53 |
| 5,443,247 A | 8/1995 | Polites et al. | 267/283 |
| 5,503,314 A | 4/1996 | Fiscus | 224/665 |
| 5,552,695 A | 9/1996 | Schwartz | 323/271 |
| 5,564,612 A | 10/1996 | Gregory | 224/633 |
| 5,613,665 A | 3/1997 | Lund | 267/69 |
| 5,617,984 A | 4/1997 | Fabel | 224/641 |
| 5,628,443 A | 5/1997 | Deutsch | 224/583 |
| 5,682,353 A * | 10/1997 | Eitan et al. | 365/194 |
| 5,696,413 A | 12/1997 | Woodbridge et al. | 310/15 |
| 5,762,243 A | 6/1998 | McMaster et al. | 224/262 |
| 5,769,431 A | 6/1998 | Cordova | 280/1.5 |
| 5,806,740 A | 9/1998 | Carlson | 224/628 |
| 5,818,132 A | 10/1998 | Konotchick | 310/17 |
| 5,890,640 A * | 4/1999 | Thompson | 224/630 |
| 5,902,073 A | 5/1999 | Eungard et al. | 224/187 |
| 5,904,282 A | 5/1999 | Gleason | 224/635 |
| 5,955,904 A * | 9/1999 | Kawasaki | 327/156 |
| 5,984,157 A | 11/1999 | Swetish | 224/631 |
| 6,020,653 A | 2/2000 | Woodbridge et al. | 290/53 |
| 6,179,186 B1 | 1/2001 | Blanking | 224/629 |
| 6,202,907 B1* | 3/2001 | Higgins | 224/156 |
| 6,276,584 B1* | 8/2001 | McLachlan | 224/637 |
| 6,351,137 B1* | 2/2002 | Hariton | 326/30 |
| 6,360,534 B1 | 3/2002 | Denniss | 60/398 |
| 6,423,412 B1 | 7/2002 | Zhang et al. | 428/421 |
| 6,545,384 B1 | 4/2003 | Pelrine et al. | 310/309 |
| 6,548,993 B1* | 4/2003 | Rutyna et al. | 323/288 |
| 6,600,346 B1* | 7/2003 | Macaluso | 327/108 |
| 6,607,107 B2 | 8/2003 | Dexheimer | 224/604 |
| 6,619,523 B1* | 9/2003 | Duckworth | 224/634 |
| 6,622,483 B2 | 9/2003 | Denniss | 60/398 |
| 6,626,342 B1* | 9/2003 | Gleason | 224/633 |
| 6,637,631 B2* | 10/2003 | Lafoux et al. | 224/197 |
| 6,646,463 B1* | 11/2003 | Hariton | 326/30 |
| 6,651,853 B2* | 11/2003 | Higgins et al. | 224/155 |
| 6,801,027 B2* | 10/2004 | Hann et al. | 323/282 |
| 6,802,442 B1 | 10/2004 | Thompson | 224/637 |
| 6,876,135 B2 | 4/2005 | Pelrine et al. | 310/339 |
| 6,982,497 B2* | 1/2006 | Rome | 290/1 A |
| 7,046,528 B2* | 5/2006 | Sankman et al. | 363/41 |
| 7,131,534 B2 | 11/2006 | Enes | 206/315.3 |
| 7,155,979 B2* | 1/2007 | Lasalandra et al. | 73/514.18 |
| 7,212,932 B1* | 5/2007 | Taylor | 702/66 |
| 7,230,838 B2* | 6/2007 | Xu | 363/86 |
| 7,287,677 B2* | 10/2007 | Reid | 224/637 |
| 7,345,407 B2* | 3/2008 | Tanner | 310/339 |
| 7,361,999 B2* | 4/2008 | Yeh | 290/1 R |
| 7,365,953 B2* | 4/2008 | Biros et al. | 361/93.1 |
| 7,391,123 B2* | 6/2008 | Rome | 290/1 R |
| 7,461,553 B2* | 12/2008 | Lasalandra et al. | 73/514.18 |
| 7,638,889 B2* | 12/2009 | Yeh | 290/1 A |
| 7,703,562 B2* | 4/2010 | Kalik | 180/8.1 |
| 2001/0035723 A1* | 11/2001 | Pelrine et al. | 318/116 |
| 2002/0170932 A1* | 11/2002 | Higgins et al. | 224/156 |
| 2002/0171213 A1 | 11/2002 | Kim | 280/47.26 |
| 2002/0190699 A1* | 12/2002 | Mueller-Fiedler et al. | 323/224 |
| 2003/0025983 A1* | 2/2003 | Lasalandra et al. | 359/290 |
| 2003/0062723 A1 | 4/2003 | Mancl et al. | 290/1 A |
| 2004/0183306 A1* | 9/2004 | Rome | 290/1 R |
| 2006/0011689 A1* | 1/2006 | Reid | 224/637 |
| 2006/0046907 A1 | 3/2006 | Rastegar et al. | 482/91 |
| 2006/0192386 A1* | 8/2006 | Rome | 290/1 R |
| 2007/0096469 A1* | 5/2007 | Yeh | 290/1 R |
| 2007/0107492 A1* | 5/2007 | Lasalandra et al. | 73/1.88 |
| 2008/0185411 A1* | 8/2008 | Rome et al. | 224/633 |
| 2008/0203128 A1* | 8/2008 | Bass et al. | 224/628 |
| 2008/0245835 A1* | 10/2008 | Reid | 224/641 |

FOREIGN PATENT DOCUMENTS

| | | | |
|---|---|---|---|
| DE | 29615526 U1 | | 10/1996 |
| SU | 815541 B | * | 3/1981 |
| SU | 1684237 A1 | * | 10/1991 |
| WO | WO 00/19862 | | 4/2000 |
| WO | WO 2004082427 A2 | * | 9/2004 |
| WO | WO 2007/016781 A1 | | 2/2007 |

OTHER PUBLICATIONS

Alexander et al., "The Role of Tendon Elasticity in the Locomotion of the Camel," Journal of Zoology, Apr. 13, 1982, vol. 198, pp. 293-313.

Balague et al., Abstract of "Non-Specific Low Back Pain in Children and Adolescents: Risk Factors," European Spine Journal, No Month Available, 1999, vol. 8, No. 6, pp. 429-438, one page.

Biewener et al., "In Vivo Muscle Force-Length Behavior During Steady-Speed Hopping in Tammar Wallabies," Journal of Experimental Biology, May 12, 1998, vol. 201(ptl 1), pp. 1681-1694.

Biewener et al., Abstract of "Muscle and Tendon Contributions to Force, Work, and Elastic Energy Savings: A Comparative Perspective," Exerc Sport Sci Rev, Jul. 2000, vol. 28, No. 3, pp. 99-107, one page.

Cavagna et al., "Mechanical Work in Terrestrial Locomotion: Two Basic Mechanisms for Minimizing Energy Expenditure," American Journal of Physiology, 1977, vol. 233, R243-261.

Cavagna, G.A. et al., "Mechanical Work and Efficiency in Level Walking and Running", J. Physiol (London), No Month Available, 1977, 268, 467-481.

Cavagna, G.A. et al., "Pendular Energy Transduction within the Step in Human Walking", J. Exp. Biol., Jul. 11, 2002, 205, 3413-3422.

Chansirinukor et al., "Effects of Backpacks on Students: Measurement of Cervical and Shoulder Posture," Australian Journal of Physiotherapy, No Month Available, 2001, vol. 47, No. 2, pp. 110-116.

Davies et al., "Maximal Mechanical Power Output of Cyclists and Young Adults," European Journal of Applied Physiology, No Month Available, 1989, vol. 58, pp. 838-844.

De Gaspari et al., "Hot Stuff, Advanced Materials are moving out of the Lab and Into the Commercial World," Mechanical Engineering, Dec. 2002, pp. 32-35.

Drake, "The Greatest Shoe on Earth," Feb. 2001, Wired, pp. 90-100.

Engsberg et al., "Comparison of Effort Between Below-Knee Amputee and Normal Children," Journal of the Association of Children's Prosthetic-Orthotic Clincs, No Month Available, 1991, 26(2), pp. 46-53.

Fedak et al. "One-step N2-Dilution technique for calibrating Open-Circuit VO2 Measuring Systems," Journal of Applied Physiology, Apr. 13, 1981, R51, pp. 772-776.

Ferguson, R.A. et al., "Muscle Oxygen Uptake and Energy Turnover during Dynamic Exercise at Different Contraction Frequencies in Humans", J. Physiol( London), May 21, 2001, 536, 261-271.

Franklin et al., "ACSM's Guidelines for Exercise Testing and Prescription," 6th Edition, No Month or Year Available, p. 303.

Gard, S.A. et al., "Comparison of Kinematic methods for Computing the Vertical Motion of the Body Center of Mass During Walking", Hum Mov Sci, 2004, 22, 597-610.

Gonzalez et al., "Human Powered Piezoelectric Batteries to Supply Power to Wearable Electronic Devices," International Journal of the Society of Materials Engineering for Resources, 2002, vol. 10, pp. 34-40.

Good, "Effects of Controlled Vertical Motion in Load Carriage Systems," Queen's University of Kingston, Ontario, Canada, Sep. 2003, 185 pages.

Grabowski, A. et al., "Independent Metabolic Costs of Supporting Body Weight and Accelerating Body Mass during Walking," J. Appl. Physiol, Feb. 2005, vol. 98, 579-583.

Hagood, N. W. et al., "Development of Micro-Hydraulic Transducer Technology", 10th International Conference on Adaptive Structures and Technologies, 1999, 71-81.

Heglund et al., "Energetics and Mechanics of Terrestrial Locomotion. IV. Total Mechanical Energy Changes as a Function of Speed and Body Size in Birds and Mammals," Journal of Experimental Biology, No Month Available, 1982, vol. 97, pp. 57-66.

Hirano et al., "Jumping Performance of Frogs(Rana Pipiens) as a Function of Muscle Temperature," Journal of Experimental Biology, No Month Available, 1984, vol. 108, pp. 429-439.

Holt et al., "Increased Musculoskeletal Stifness During Load Carraige at Increasing Walking Speeds Maintains Constant Vertical Excursion of the Body Center of Mass," Journal of Biomechanics, No Month Available, 2003, vol. 36, pp. 465-471.

Hong et al., "Gait and Posture Responses to Backpack Load during Level Walking in Children," Gait and Posture, Jan. 16, 2002, vol. 17, No. 1, pp. 28-33.

Hong Kong Society for Child Health and Development., "The Weight of School Bags and its Relation to Spinal Deformity," Hong Kong: The Department of Orthopedic Surgery, University of Hong Kong, The Duchess of Kent Children's Hospital, 1998, 62 pages.

Kargo, W.J. et al., "Functional Morphology of Proximal Hindlimb Muscles in the Frog", J. Exp. Biol, May 3, 2002, vol. 205, 1987-2004.

Kargo, W.J. et al., "Jumping in Frogs: Assessing the Design of the Skeletal System by Anatomically Realistic Modeling and Forward Dynamic Simulation", J. Exp. Biol, Mar. 25, 2002, vol. 205, 1683-1702.

Kim, H.W. et al., "Energy Harvesting Using a Piezoelectric Cymbal Transducer in Dynamic Environment", Japanese Journal of Applied Physics, 2004, 43(9A), 6178-6183.

Kram "Carrying Loads with Springy Poles," Journal of Applied Physiology, No Month Available, 1991, vol. 71, No. 3, pp. 1119-1122.

Kymissis et al., Abstract of "Parasitic Power Harvesting in Shoes," IEEE Int'l Conference Wearable Computing, No Month Available, 1998, pp. 132-139, one page.

LaFriandra et al., "The Effect of Walking Grade and Backpack Mass on the Forces Exerted on the Hips and Shoulders by the Backpack," United States Army Research Institute of Environmental Medicine. United States Science Conference, No Month Available, 2002, 2 pages.

Lesieutre, G.A. et al., "Damping as a Result of Piezoelectric Energy Harvesting", Journal of Sound and Vibration, Jan. 2004, 269(22), 991-1001.

Liu, Y. et al., "Investigation of Electrostrictive Polymers for Energy Harvesting", IEEE Transactions on Ultrasonics, Ferroelectrics, and Frequency Control, 2005, 52, 2411-2417.

Liu, Y., "Active Energy Harvesting", Ph.D. Dissertation, The Pennsylvania State University, Dec. 2006.

Lutz et al., "Built for Jumping: The Design of the Frog Muscular System," Science, Jan. 21, 1994, vol. 263, pp. 370-372.

Martin, "Inertial-load Method Determines Maximal Cycling Power in a Single Exercise Bout," Medicine and Science in Sports and Exercise, 1997, vol. 29, No. 11, pp. 1505-1512.

Mitcheson, PD. et al., "Architectures for Vibration-Driven Micropower Generators", Journal of Microelectromechanical Systems, 2004, 13, 429-440.

Modica, Jr. et al., "Metabolic Energy and Muscular Activity Required for Leg Swing in Running", J. Appl. Physiol, Jan. 28, 2005, vol. 98, 2126-2131.

Negrini et al., "Backpack as a Daily Load for Schoolchildren," The Lancet, Dec. 4, 1999, vol. 354(9194), 1 page.

Negrini, et al., "Backpacks on! Schoolchildren's Perception of Load, Associations with Back Pain and Factors Determining the Load", Spine, 2002, 27(2), 187-195.

Ottman, G.K. et al., "Adaptive Piezoelectric Energy Harvesting Circuit for Wireless Remote Power Supply", IEEE Transactions on Power Electronics, 2002, 17, 669-676.

Ottman, G.K. et al., "Optimized Piezoelectric Energy Harvesting using Step-Down Converter in Discontinuous Conduction Mode", IEEE Transactions on Power Electronics, 2003, 17, 696-703.

Park, et al., "Ultrahigh Strain and Piezoelectric Behavior in Relax of Based Ferroelectric Single Crystals", J. Appl. Phys., 1997, 82, 1804.

Pascoe et al., "Influence of Carrying Book Bags on Gait Cycle and Posture in Youths," Ergonomics, No Month Available, 1997, vol. 40, No. 6, pp. 631-641.

Pelrine, et al., "Dielectric Elastomers: generator Mode Fundamentals and Applications", Proceedings of SPIE-The International Society for Optical Engineering, 2001, 4329, 148-156.

Roberts et al., "Muscular force in Running Turkeys: The Economy of Minimizing Work," Science, Feb. 21, 1997, vol. 275, pp. 1113-1115.

Rome, L.C. et al., "Generating Electricity while Walking with Loads", Science, 2005, 309, 1725-1728.

Saltin et al., "Maximal Oxygen Uptake in Athletes," Journal of Applied Physiology, Sep. 1967, vol. 23, pp. 353-358.

Shearer, T.L. et al., "Sensorless Control of a Thermoacoustic Refrigerator", Journal of the Acoustical Society of America, Jul. 2004, 116(1), 288-293.

Shenck, N. S. et al., "Energy Scavenging with Shoe-Mounted Piezoelectrics", IEEE, 2001, 30-42.

Starner, T et al., "Human Generated Power for Mobile Electronics", Low Power Electronics Design, CRC Press, No Month Available, Fall 2004, pp. 1-30.

Taimela et al., "The Prevalence of Low Back Pain Among Children and Adolescents. A Nationwide, Cohort-based Questionnaire Survey in Finland," Spine, May 15, 1997, vol. 22, No. 10, pp. 1132-1136.

Taylor et al., "The Energetic Cost of Generating Muscular Force During Running," Journal of Experimental Biology, 1980, vol. 86, pp. 9-18.

Troussier et al., Abstract of "Back Pain in School Children a Study Among 1178 Pupils," Scandanavian Journal of Rehabilitation Medicine, No Month Available, 1994, vol. 26, pp. 143-146, one page.

Vacheron et al., Abstract of "The Effect of Loads Carried on the Shoulders," Military Medicine, Aug. 1999, vol. 164, No. 8, pp. 597-599, one page.

Vandewalle et al., "Force-Velocity relationship and Maximal Cycling Power on a Cycle Ergometer Correlation with the Height of a Vertical Jump," European Journal of Applied Physiology, 1987, vol. 56, pp. 6650-6656.

Xia et al., "High Electromechanical Responses in Terpolymer of Poly(vinylidene fluoride trifluoethylene-chlorofluroethylene," Adv Masters, Nov. 4, 2002, vol. 14, pp. 1574-1577.

* cited by examiner

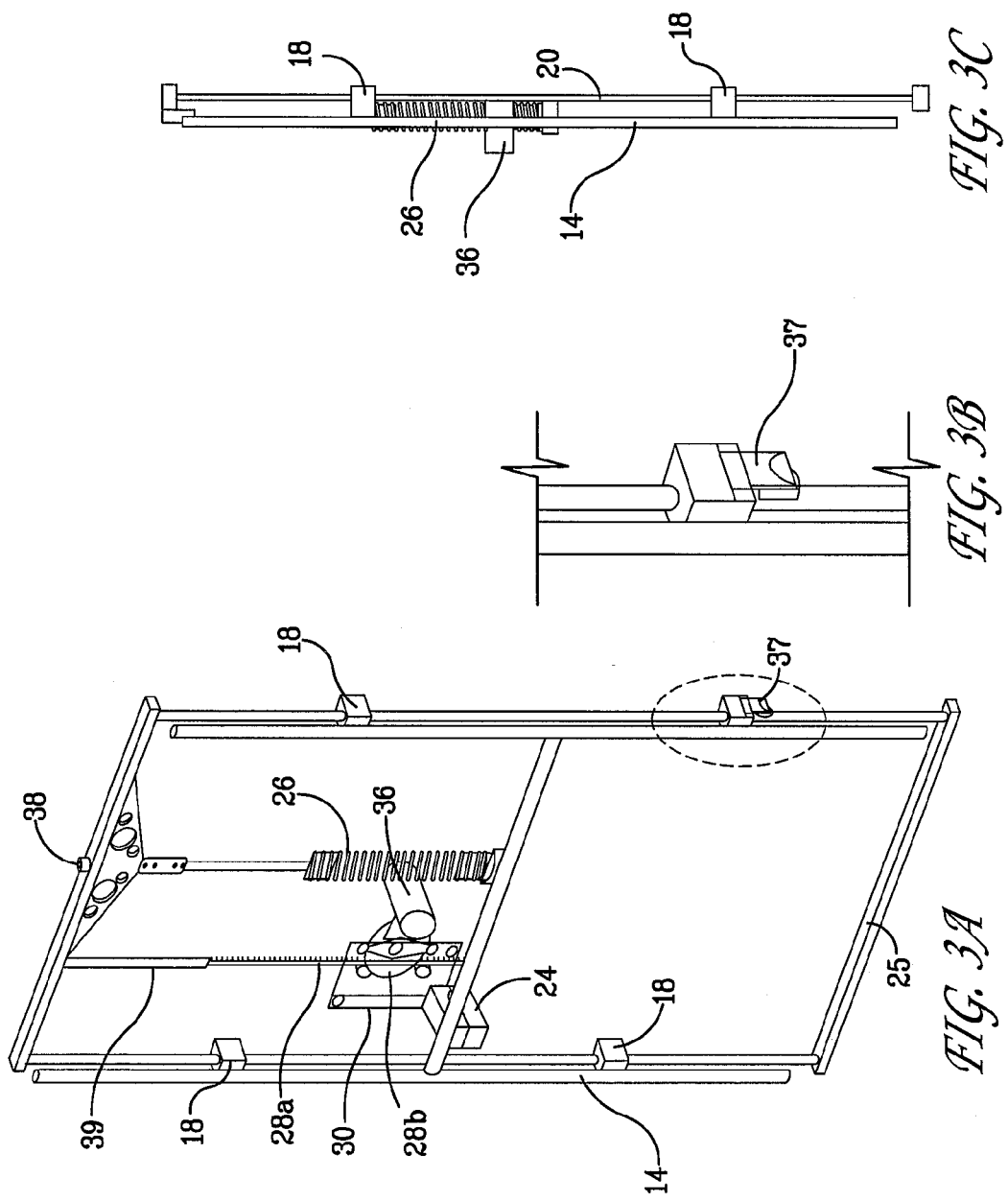

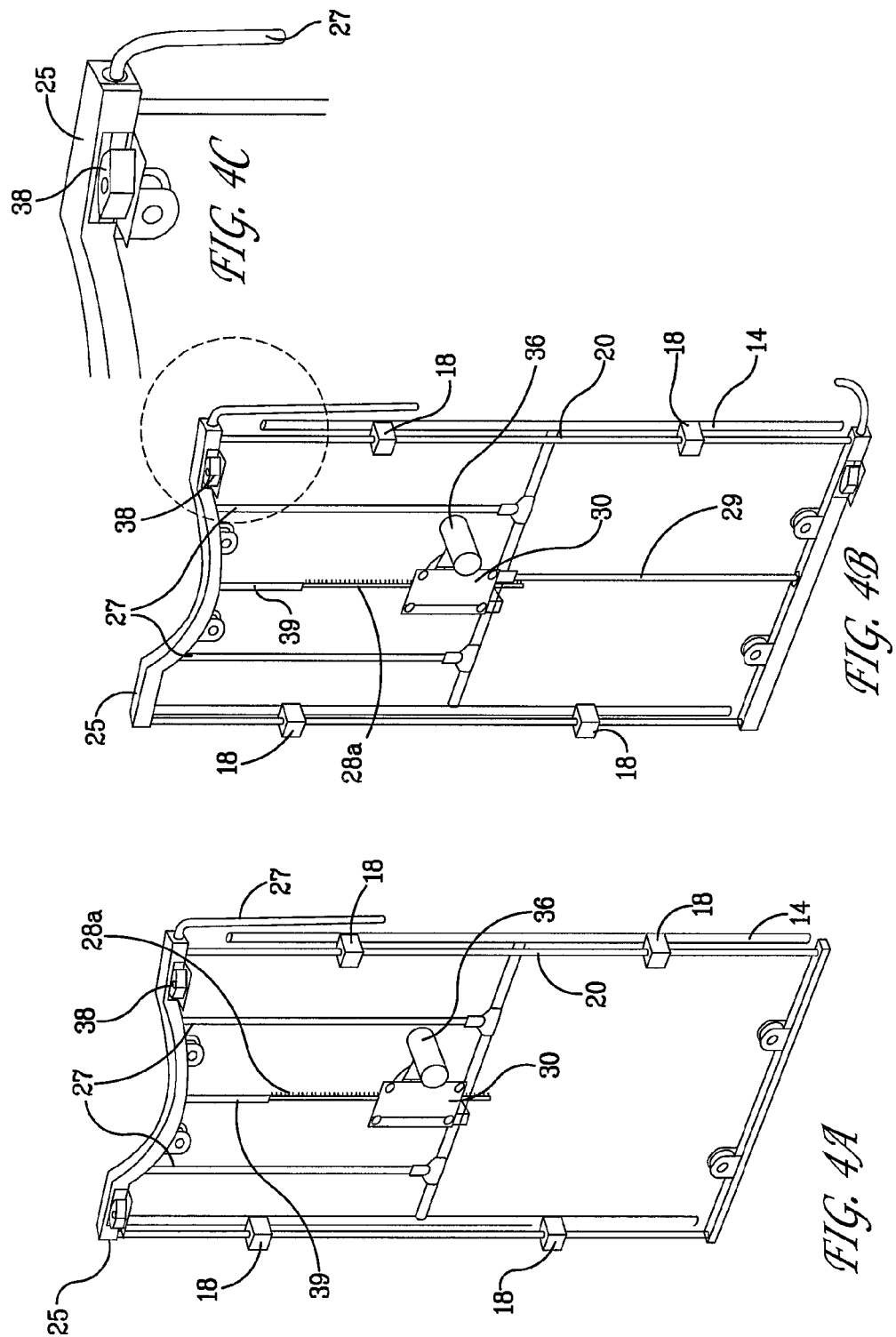

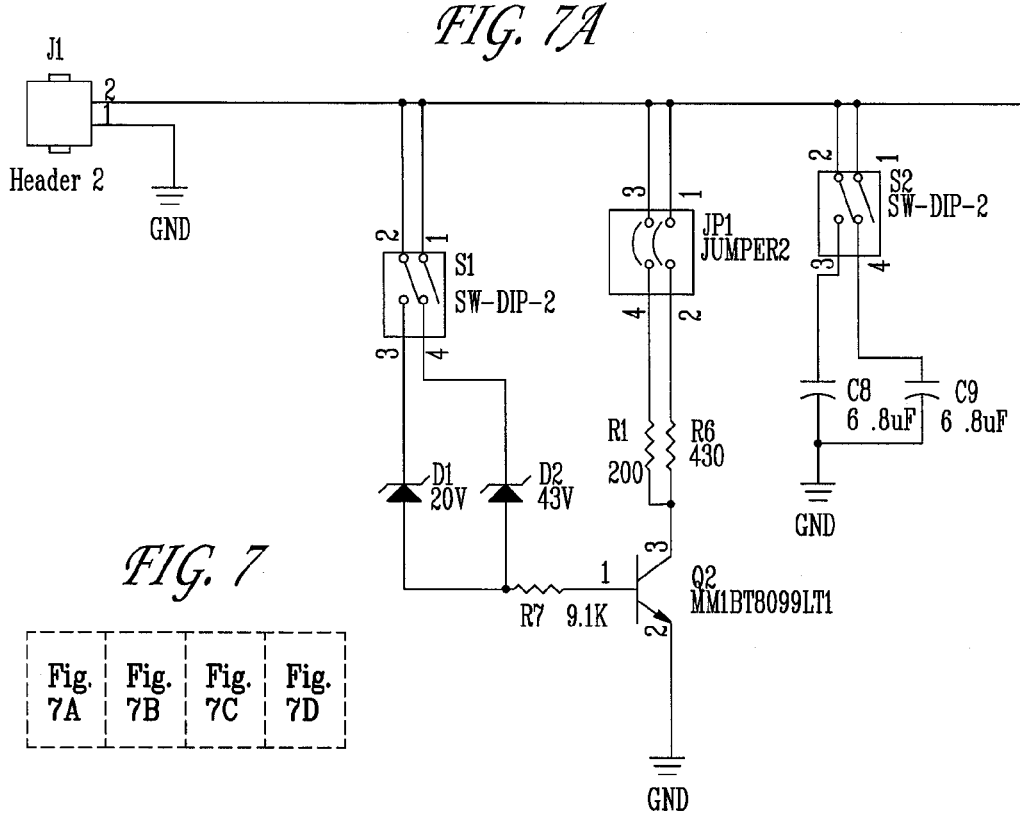
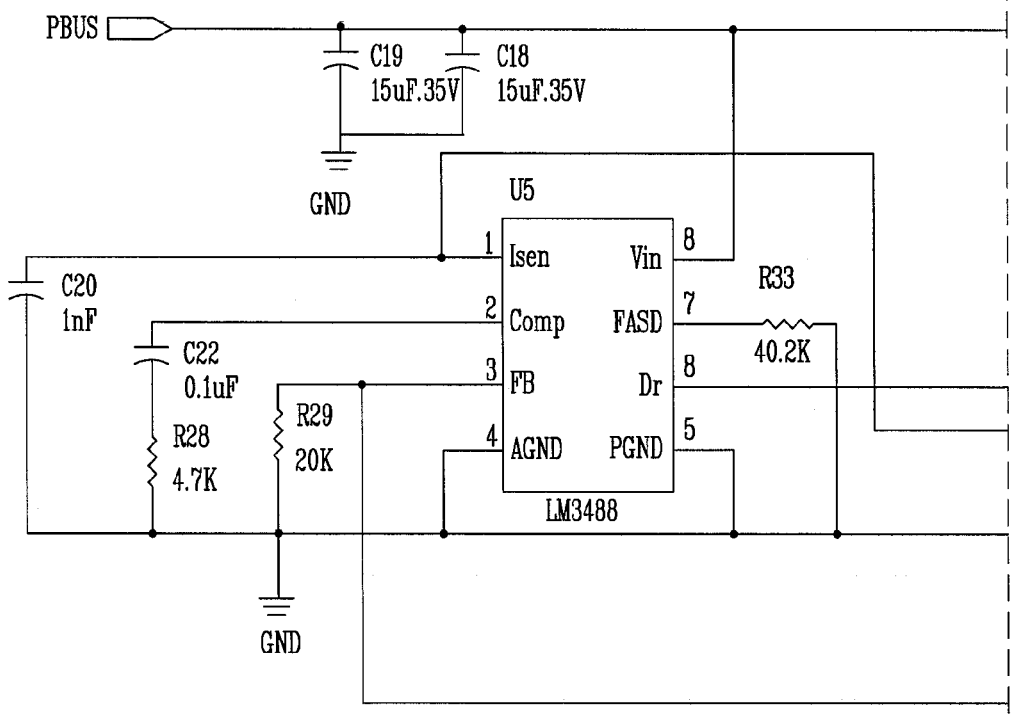

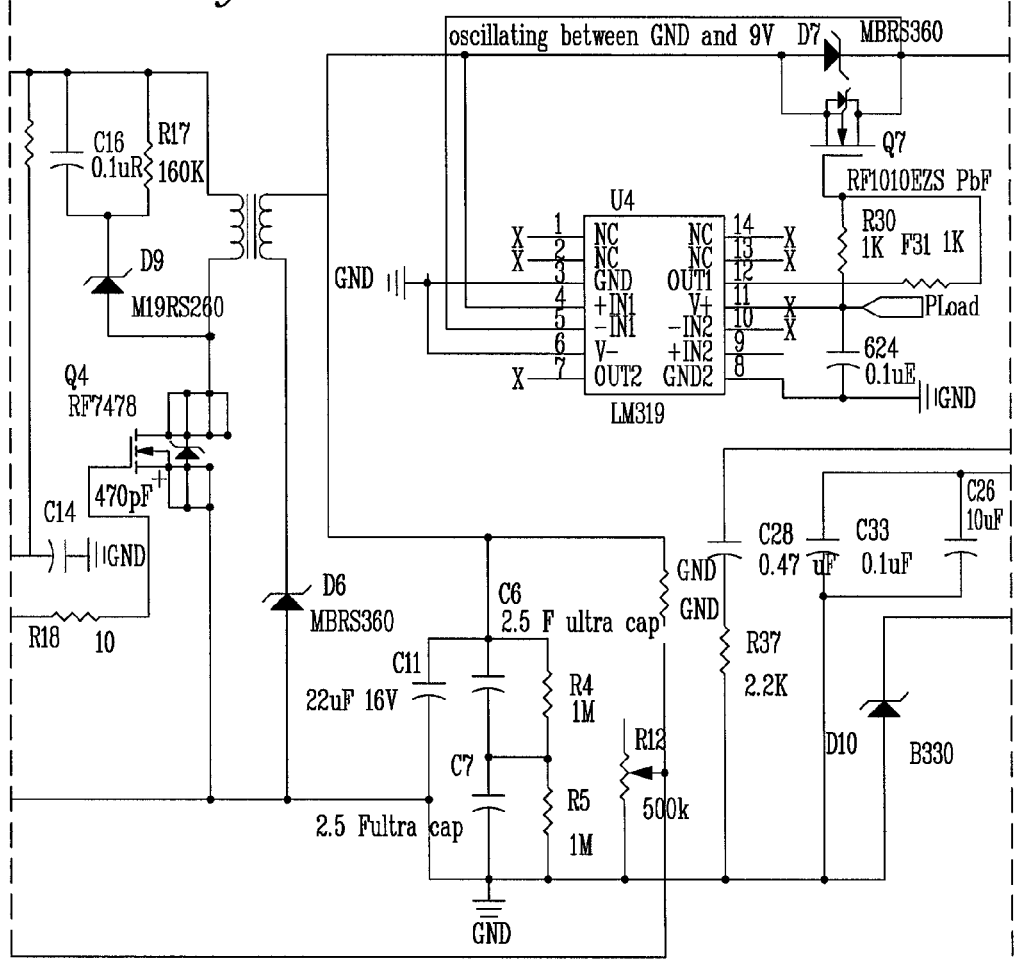
FIG. 7C
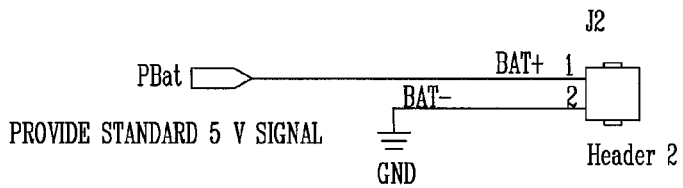

Difference Amplifier

| Fig. 9A | Fig. 9B |
| --- | --- |
| | Fig. 9C |

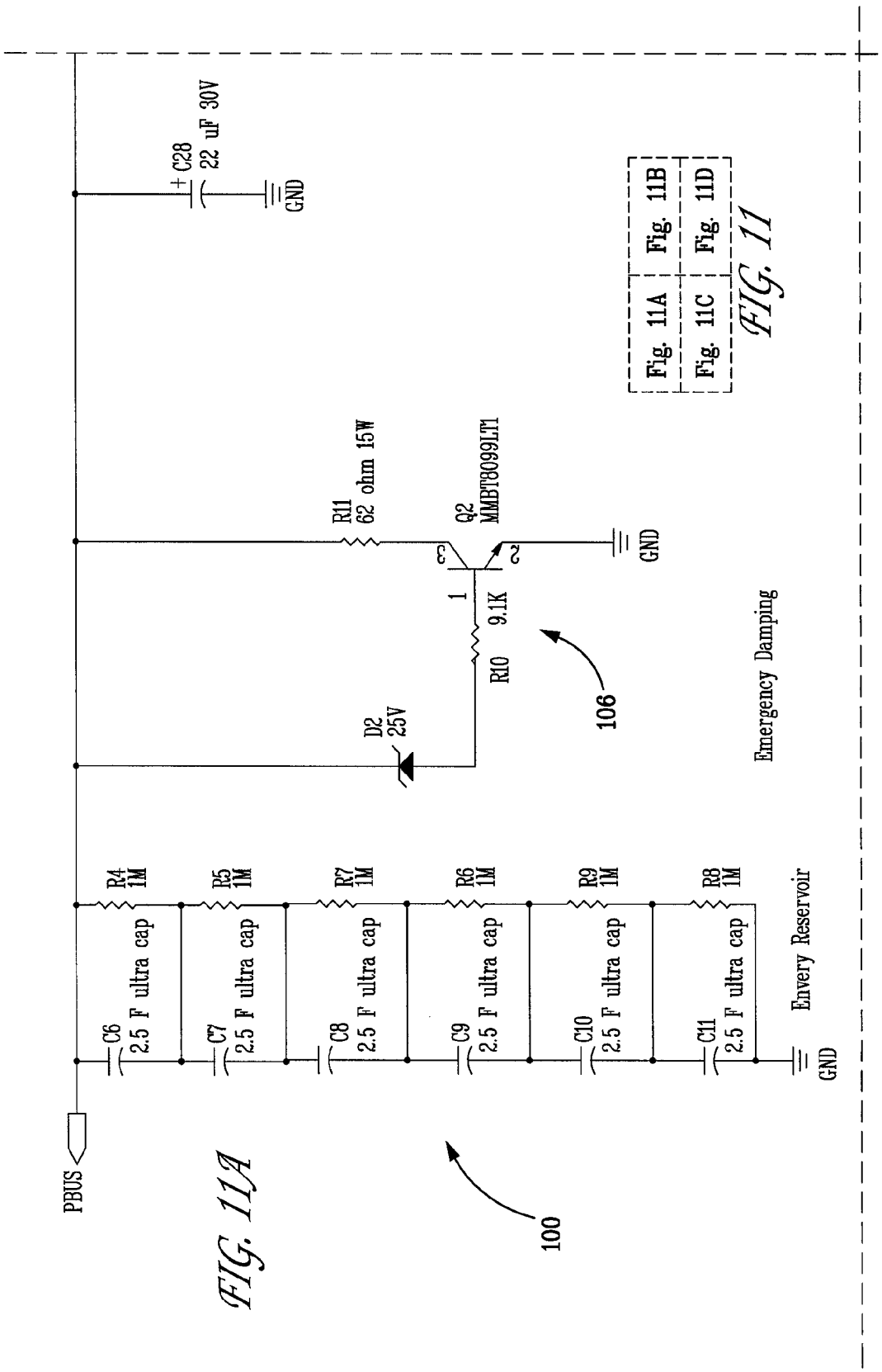

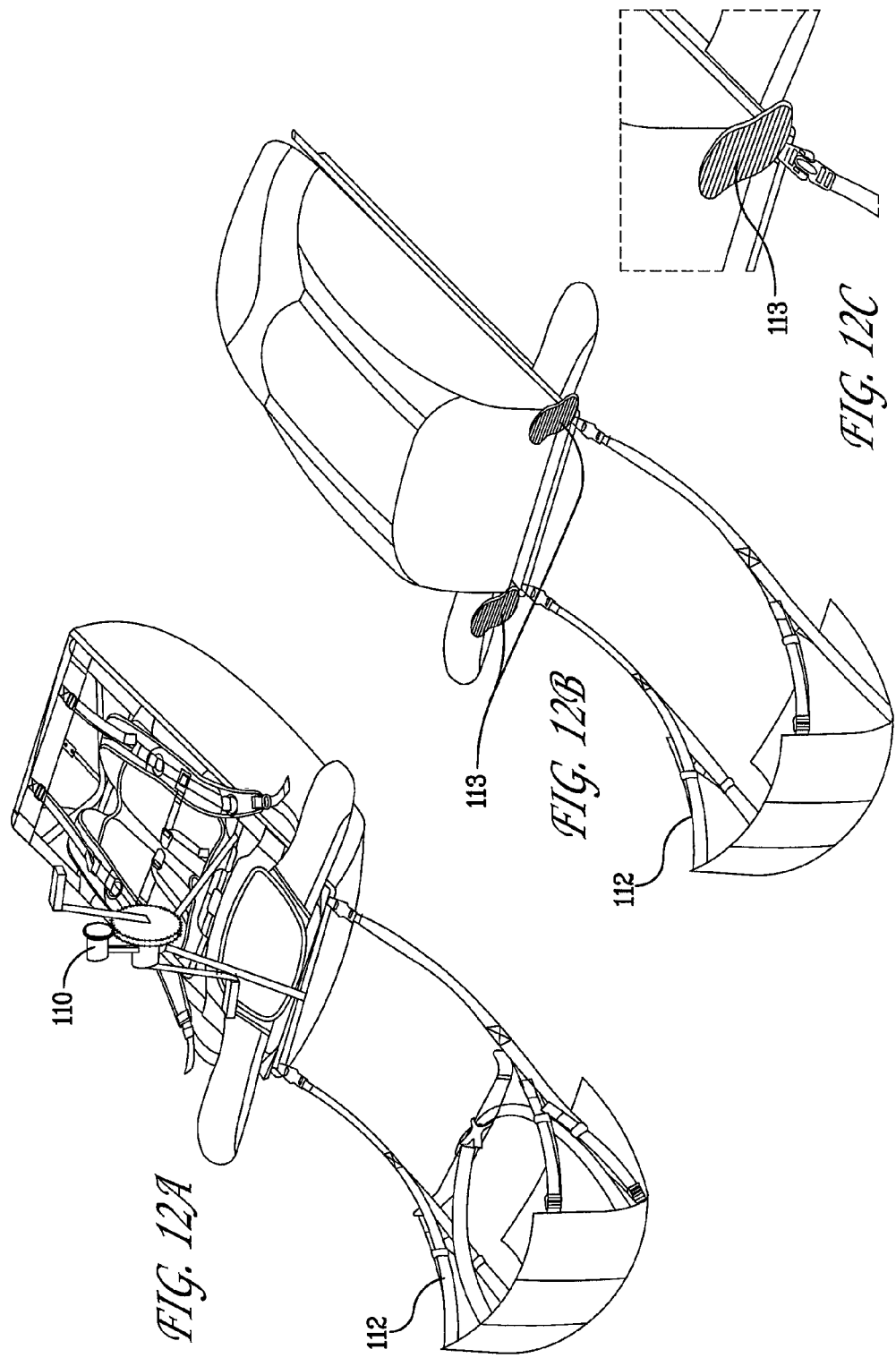

Back view of Wand Attachment to Trouser

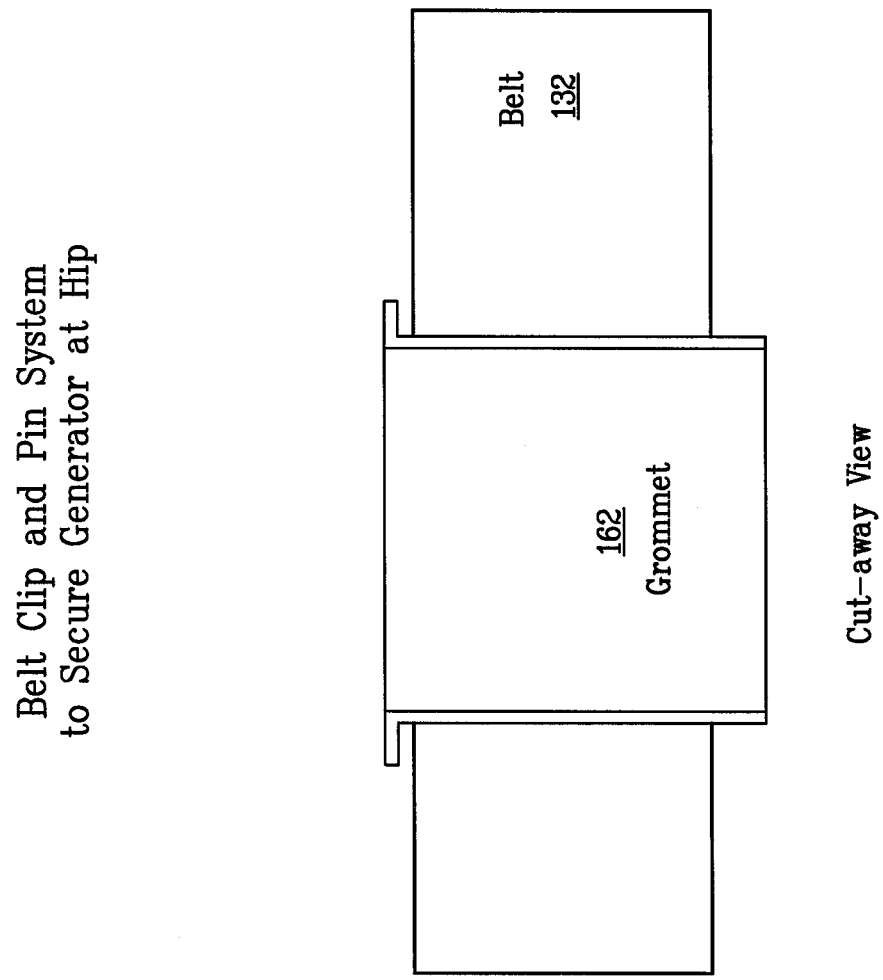
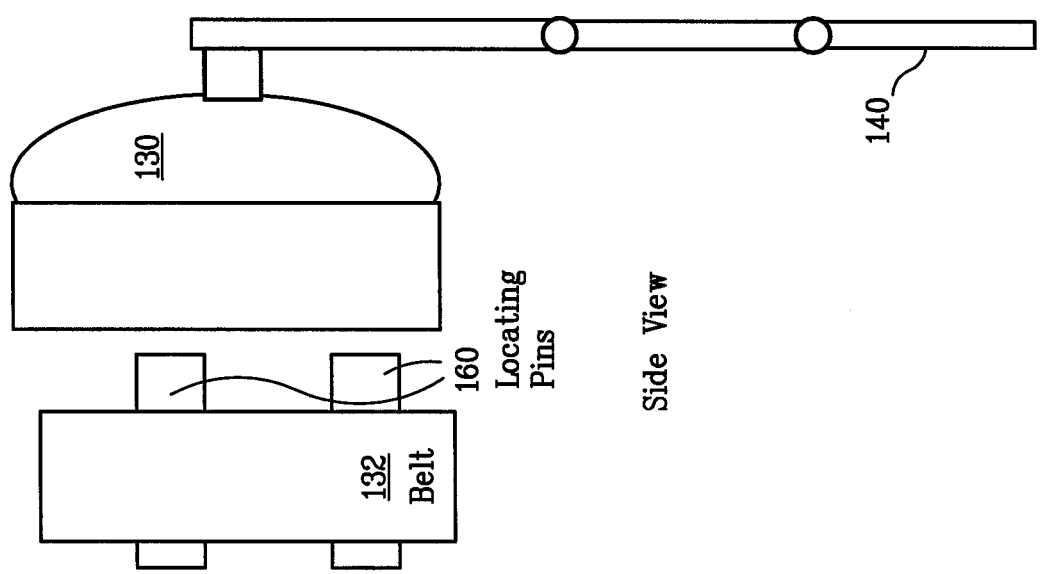
FIG. 17

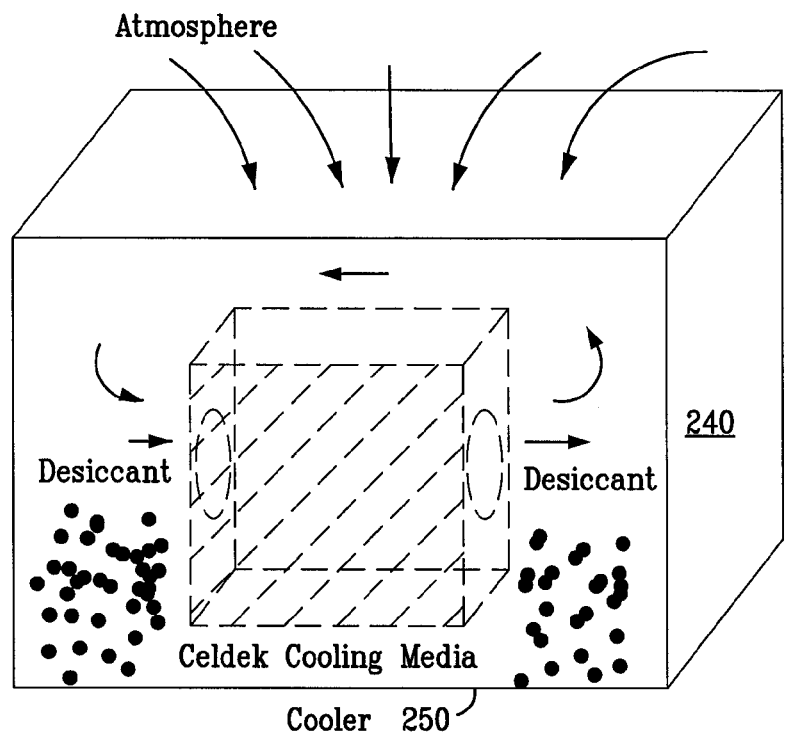
FIG. 24
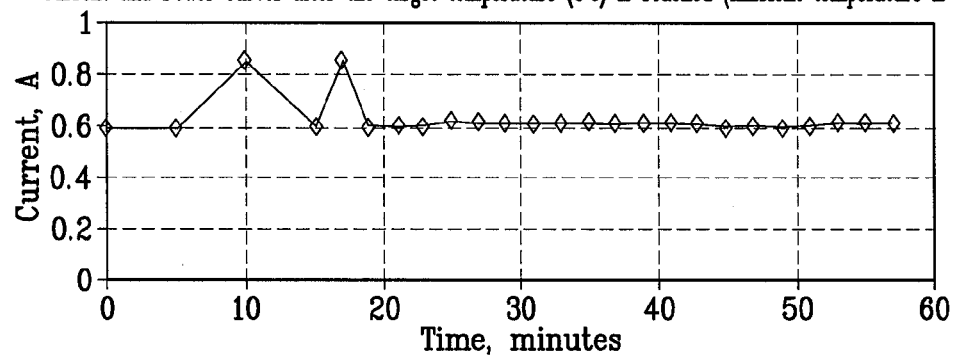
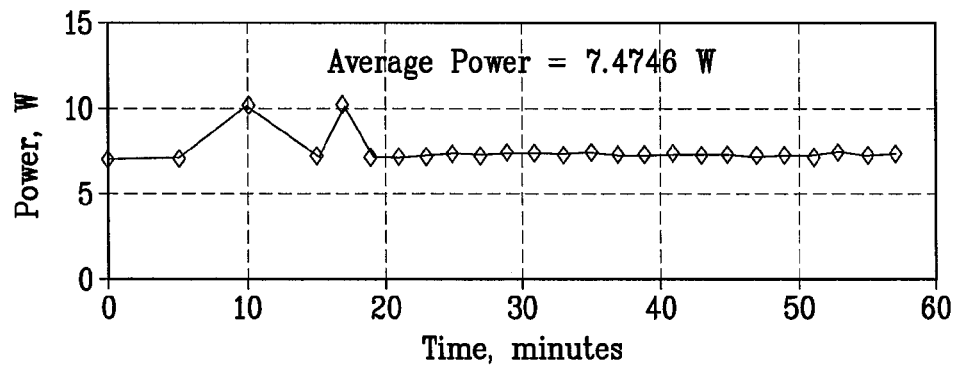
FIG. 25

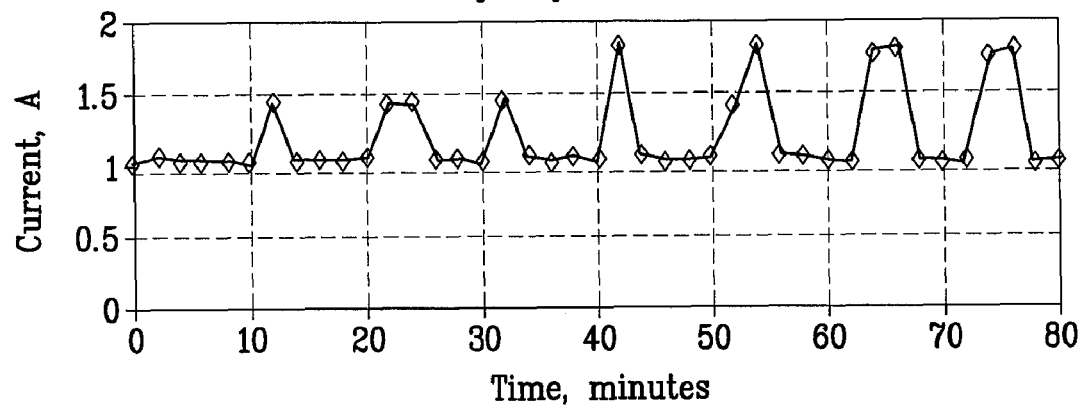
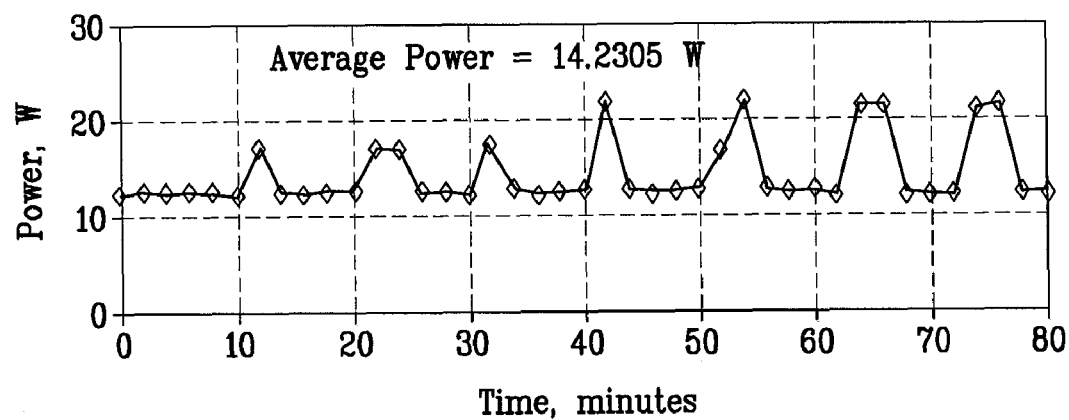
FIG. 26

BACKPACK BASED SYSTEM FOR HUMAN ELECTRICITY GENERATION AND USE WHEN OFF THE ELECTRIC GRID

CROSS-REFERENCE TO RELATED APPLICATIONS

The present application claims priority under 35 U.S.C. §119(e) to U.S. Provisional Patent Application Ser. Nos. 60/921,239, 60/921,240, and 60/921,241, filed Mar. 29, 2007, the contents of which are incorporated herein by reference.

STATEMENT REGARDING FEDERALLY SPONSORED RESEARCH OR DEVELOPMENT

This invention was made with government support under N00014-06-M-0309 awarded by the Office of Naval Research and under Grant No. 1R43-HD55110-01A1 awarded by the National Institutes of Health. The government has certain rights in the invention.

FIELD OF THE INVENTION

The invention relates to a backpack based system for energy generation that generates electricity from the wearer's movement.

BACKGROUND OF THE INVENTION

Man has become more dependent on portable technology in all arenas of life from business, to medicine, to recreation, to first response/disaster relief, to exploration, to field scientists, and to the military. This dependence requires electricity, which is presently provided by batteries. Total dependence on batteries is problematic as people working off the electric grid may have to carry up to 25 lbs of batteries. A device that could generate significant electrical energy to recharge batteries would provide much more freedom and operational ability.

Until recently, electrical energy harvesting from body movements has been extremely limited in terms of wattage (10 or 20 milliwatts). The present inventor has previously disclosed a backpack device which can generate electricity when carrying very heavy loads (U.S. Pat. No. 6,982,497 "A Backpack for Harvesting Electrical Energy During Walking and for Minimizing Shoulder Strain"). That device suspends the load so that it operates as a force-damped oscillator that generates electricity from a geared generator via a rack and pinion arrangement. The description in U.S. Pat. No. 6,982,497 is hereby incorporated by reference.

Exemplary applications of such a power generating backpack include backpacks for soldiers. Combat units operating on foot in remote regions are highly dependent on electrical energy for communications, navigation and sensing. As the use of electronic devices on the battlefield has increased, so has the need for electrical energy independence. At present, power is provided by carrying a large weight of batteries (as much as 20 lbs), which when added to their usual 80$lb$ packs, represents a crushing burden, resulting in reduced performance and back/joint injuries for the soldiers. The electricity-generating backpack described in U.S. Pat. No. 6,982,497 addresses this problem by providing significant levels of electricity generation from human movement. For example, during normal walking, the backpack originally generated over 2 watts of electricity and was later modified to generate up to 7.5 watts of electricity. This is significantly more energy than previous devices. At the same time, the backpack provides ergonomic benefits as the soldiers walk. This electricity production will permit soldiers to replace up to 20 lbs of disposable batteries with a small rechargeable battery.

Use of backpacks of the type described in U.S. Pat. No. 6,982,497 will permit longer and better performance in the field by combat soldiers and special forces. The backpack will enable military units to go into the field and essentially generate their own electrical power as they need it. This will permit them to stay longer in the field, and because they will not need to carry 20 lbs of batteries, the soldiers will be more mobile. Further, because of the reduction in forces on the body, the soldier will be able to move faster (i.e., run) than they can presently, with an expected reduction in orthopedic injury. Hence, use of the ergonomic backpacks described in U.S. Pat. No. 6,982,497 is expected to lead to not only lower incidence of orthopedic injury during deployment, but also fewer orthopedic problems following deployment and in later years. Finally, at present Marines use disposable batteries because of their higher energy density. The 1 kg batteries used presently cost $70-90 each and Marines may use 1 or 2 a day that are disposed of after use. The electricity generating backpack of U.S. Pat. No. 6,982,497 will greatly reduce this recurring battery cost and reduce the environmental cost of manufacturing and disposing of millions of lithium-ion batteries. Such a backpack will also save considerable funds by generating the electricity for free.

However, there are a number of limitations that limit the practical use of the backpack of U.S. Pat. No. 6,982,497. For example, a significant limitation involves the necessity for damping of the mechanical dynamics and hence the need for appropriate management of energy drawn from the mechanical system by the generator. The backpack also has several other limitations including: 1) it is very heavy (14.5 lbs of extra weight over and above a normal backpack); (2) if the weight carried in the backpack has to be changed or the speed of the wearer changes significantly, then the springs (and/or spring placement) have to be modified, which is very difficult to accomplish in the field; (3) the efficiency of the generator is only 30-40%; (4) the electrical power generated, though much larger than other devices, is modest; and (5) the electricity is unusable in its present form for attaching a typical electronic device will overdamp the system and prevent sufficient movement of the load.

A next generation electricity generation backpack addressing these problems is desired. The present application is directed to such a backpack.

SUMMARY OF THE INVENTION

A next generation electricity-generating backpack is disclosed that is substantially lighter in weight, has the multiple springs replaced with one large spring whose spring constant can be adjusted in the field in seconds, and the DC generator is replaced by a geared brushless AC generator that permits approximately 70%-80% overall efficiency and the generation of up to 20 W of electrical power during walking and 25 W during running. The invention also addresses potential limitations to the function of this backpack. For example, in the backpack described in U.S. Pat. No. 6,982,479, the electrical power generated by the generator (which is measured by the voltage and current across a power resistor) is converted to heat, and is essentially unusable. The problem is that when an electronic device such as a battery charger is connected across the output of the generator, it draws too much current, and overdamps the movement of the load. The overdamping prevents the large excursions and high velocities of the load (with respect to the backpack frame), which are necessary to generate high electrical powers. Although removal of too much power is problematic, removing too little power is also problematic. Because the spring constant of the backpack is set so that the natural frequency is matched to the walking frequency, if electricity is not removed from the system, the load would resonate uncontrollably making it difficult to walk. A device is thus provided that addresses this potential problem by limiting the amount of electrical power removed from the system.

A device that always removes some electricity, but not too much, is necessary to extract large levels of the electricity while controlling damping. Embodiments of the invention are provided that perform this function using electrical circuitry. In a first embodiment, electrical damping circuits are provided including a flyback converter designed to emulate a desired load at its input terminals.

The electricity generating backpack also includes numerous design efficiencies that have been implemented to decrease weight and improve electricity generation from mechanical movement. For example, the position of the generator has been moved to a position internal to the backpack that is safer for the generator and reduces noise. Movement of the generator also permits the suspension components to be enclosed in a dust cover to keep the components safe and clean so as to facilitate efficient operation. The gears and generator are also reengineered for efficiency, and special grease and gear coatings are preferably used to prolong the life of the electricity generating mechanism and to reduce noise.

In particular embodiments of the electricity generating backpack, additional electricity generating devices are added to the backpack for generating additional power. For example, a so-called E-Mod device hooks a generator to the backpack belt at the wearer's hip and includes a wand that fits against the wearer's femur so as to move through a range of motion as the wearer walks. The movement of the wearer's femur moves the wand, which, in turn, cranks the generator gears to generate power. Another embodiment permits the wearer, when not walking, to crank the generator using pedals that are connected to a separate generator. In this embodiment, the device includes a harness for restraining the user with respect to the backpack and the pedals so as to effectively form a recumbent ergometer that generates, for example, up to 100 W.

The electricity generated and stored by the backpack may be used to charge batteries and to power a number of devices that may be carried by the backpack. For example, the backpack may include a commercial Sterling Cooler System that is powered by the backpack's stored power to provide cooling power for cooling items carried by the backpack. In a particularly useful embodiment, the power generated by the backpack powers a cooling system that enables the refrigeration of vaccines and medications that are to be delivered to remote areas.

These and other characteristic features of the invention will be apparent to those skilled in the art based on the following detailed description of the invention.

BRIEF DESCRIPTION OF THE DRAWINGS

The above and other objects and advantages will become apparent to one skilled in the art based on the following detailed description of the invention, of which:

FIG. 3 illustrates the assembled electricity generating mechanism of the embodiment of FIG. 1.

FIGS. 4(a) and 4(b) illustrate alternative embodiments of the electricity generating mechanism of FIG. 1 where the compliant spring is replaced by a bungee cord.

FIGS. 12(a) and 12(b) illustrate bottom and top views of a lightweight bicycle ergometer used to generate larger levels of power by converting the linear motion of the legs into the rotary motion of an AC generator.

FIG. 17 illustrates embodiments for holding the generator in place using clamps on the wearer's belt that prevent the rotation of the AC generator as the wearer walks.

FIG. 24 illustrates the structure of an alternate embodiment of the evaporative cooler.

FIG. 25 illustrates the current and power consumption of a Stirling cooler when the setting temperature (3° C.) is reached and the ambient temperature is 25° C.

FIG. 26 illustrates the case when the setting temperature (3° C.) is reached and the ambient temperature is 38° C.

DETAILED DESCRIPTION OF ILLUSTRATIVE EMBODIMENTS

A detailed description of illustrative embodiments of the present invention will now be described with reference to FIGS. 1-28. Although this description provides detailed examples of possible implementations of the present invention, it should be noted that these details are intended to be exemplary and in no way delimit the scope of the invention.

The electricity generating backpacks described in U.S. Pat. No. 6,982,479 and in related U.S. patent application Ser. No. 11/957,222, filed Dec. 14, 2007, entitled "Suspended Load Ergonomic Backpack" (the contents of both of which are incorporated herein by reference) have been further refined to introduce several novel features as will be described herein. General improvements to the backpack will first be described and then alternate embodiments of supplemental electricity generating devices and uses of the generated power will be described.

I. Improvements to Electricity Generating Backpack

Protection from Physical and Environmental Damage

In accordance with an exemplary embodiment, the electricity generator within the backpack is moved from the top of the backpack to a safer place where the electricity generator is less prone to damage, the rack on which the load is mounted need not stick up so as to injure the wearer, and less noise is generated. In the exemplary embodiment, the electricity generator and rack are placed between the backpack frame and the suspensions system within the boundaries of the pack body where it may be completely protected within a box formed by the top and bottom structures and the bearing tubes on the side. This design keeps all moving elements within a frame such that nothing sticks out and so that the frame may be encased within a protective casing that preferably keeps out undesirable elements such as dirt, dust, and/or water. For military applications, for example, the casing material may be formed of a resilient material such as plastic such that the surface bends to avoid restricting movement of a helmeted wearer.

Figure 1:
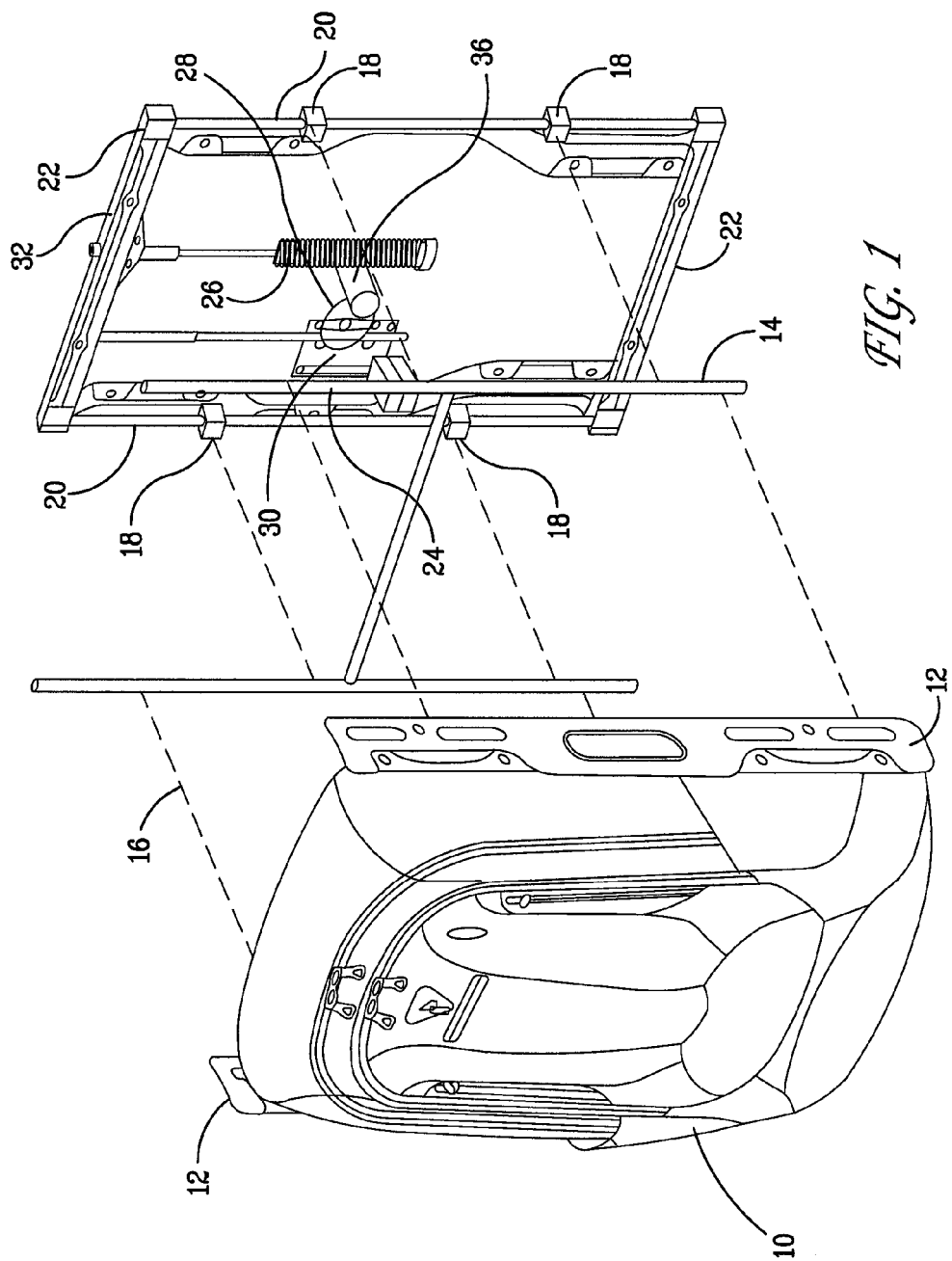
FIG. 1 illustrates an exploded view of a backpack designed in accordance with a first embodiment of the invention.

FIG. 1 illustrates an exploded view of a backpack designed in accordance with the invention. As illustrated, the backpack body 10 is rigidly attached to molded composite side walls 12 that secure the backpack body 10 to H frame 14 as generally indicated by dashed lines 16 while also hiding the power generating mechanism from view (generally for aesthetic reasons). As indicated, the H frame 14 mounts on bearings 18 that slide along rails 20 in accordance with the up/down movement of the backpack body 10 with respect to the wearer. The rails 20 are held by top and bottom molded plastic protectors 22 that define top and bottom boundaries for movement of the electricity generating mechanism. As shown, a clamp 24 attaches the H frame 14 to the body frame 25 (FIG. 3) formed by elements 20, 22 via spring 26 and rack and pinion mechanism 28 placed in mounting bracket 30 adjacent body panel 32 so as to crank the AC generator 36. It is noted that the body frame 25 is generally fixed with respect to the body, while H frame 14 is fixed with respect to the backpack body 10 and moves up/down on rails 20 of body frame 25 to provide the relative movement that is converted into electrical power during operation.

Figure 2A:
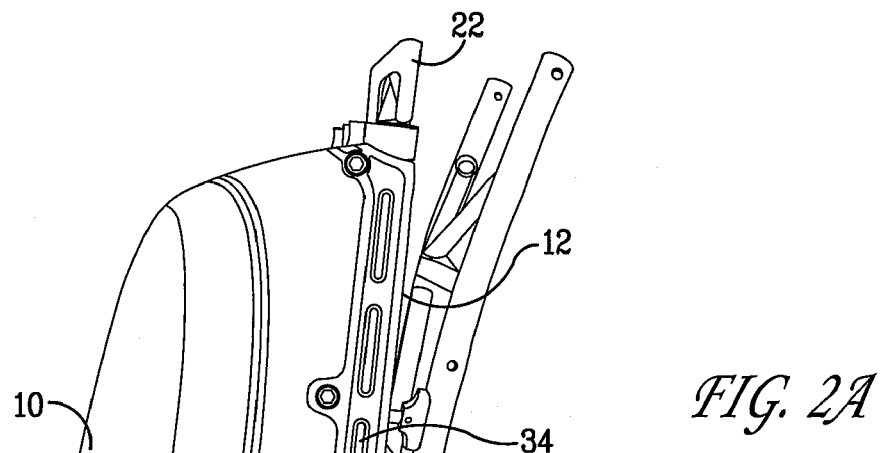
FIGS. 2(a) and 2(b) respectively illustrate a side view and a front view of the assembled backpack of FIG. 1.
Figure 2B:
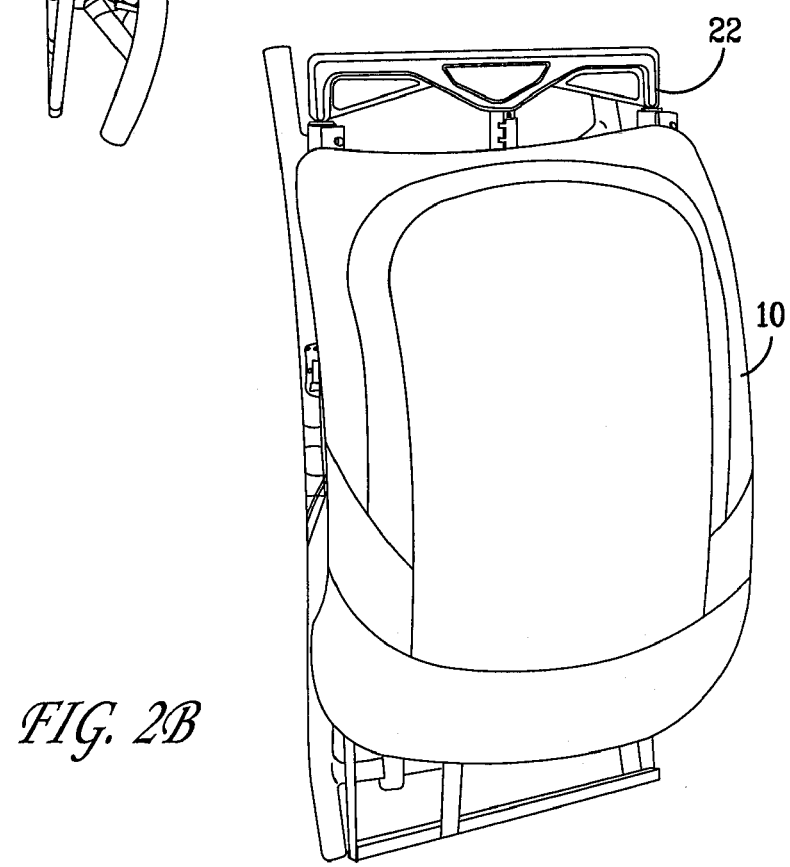

FIG. 2(a) illustrates a side view of the assembled backpack, including thermoplastic polyurethane side bumpers 34 that cover the bearings 18 and rails 20 and stick out from the sides of side walls 12 to protect the backpack body 10, particularly the electricity generating mechanism, from impact and abrasion, while FIG. 2(b) illustrates a front view of the assembled backpack. In an exemplary embodiment, the backpack body 10 may be adapted to accommodate battery holders and wiring for devices to be powered by the electricity generating mechanism.

FIG. 3 provides a better view of the assembled electricity generating mechanism including body frame 25 and H frame 14. The electricity generating mechanism is designed so that the backpack body 10 on H frame 14 may move freely with respect to the body frame 25 without impeding the functioning of the electricity generating functions of the rack and pinion system 28 and generator 36. As illustrated, the spring 26 is connected between the body frame 25 and the H frame 14 so as to permit relative movement in accordance with the spring constant of the spring 26. The relative movement of the body frame 25 with respect to the H frame 14 causes relative movement of rack 28a with respect to pinion gear 28b which, in turn, causes the cranking of the AC generator 36 by pinion gear 28b. The lock mechanism 37 locks the pack body 10 in place when the up/down movement for electricity generation is not desired. The tension (spring constant) of spring 26 may be adjusted by turning tension adjuster 38, which is easily accessible at the top of the body frame 25. Turning of the tension adjuster 38 screws a threaded plug into or out of the spring 26 so as to reduce or increase the number of active coils of spring 26.

In the embodiment of FIGS. 1-3, electricity generating efficiency is improved by providing simple gears in a gear plane that is perpendicular to the long axis of the AC generator 36. Fitting the AC generator 36 in this new position necessitates that the AC generator 36 stick into the pack body 10. In an exemplary embodiment, a lightweight vacuum molded plastic protective cup was built into back pack body 10 to accommodate the AC generator 36 in a direction perpendicular to the wearer's body. A protective cup was thus formed outside the backpack body 10, and the inside is angled to prevent carried materials from catching on an edge.

FIGS. 4(a) and 4(b) illustrate alternative embodiments of the electricity generating mechanism of FIG. 1 where the compliant spring is replaced by a bungee cord 27 that compliantly connects the H-frame 14 with the body frame 25 as illustrated. The tension of the bungee cord 27 is tightened by pulling the end of the bungee cord through cam 38 to shorten the bungee cord 27 or is loosened by loosening cam 38 and lengthening the bungee cord 27. The electricity generating mechanism otherwise operates in the same fashion as in the embodiment of FIGS. 1-3. Also, as in the embodiment of FIGS. 1-3, the spring constant of bungee cord 27 is matched to a frequency of up/down movement of the backpack body 10 as a result of the gait of the wearer of the backpack or the application of force to the backpack body 10. The spring constant can be adjusted in several ways. First, the length of the bungee cord 27 suspending the load can be altered by bypassing the pulleys as shown in FIG. 4(a) (a shorter cord has greater stiffness). Second, the length can be changed by pulling up on the bungee cord 27 an routing the bungee cord 27 though at least one square tube such that the cam projects into the square tube and clamps the bungee cord against an inside surface of the square tube. Finally, for high spring constants, an additional bungee cord 29 can be routed up from the bottom of the backpack as illustrated in FIG. 4(b). The spring constants of the top and bottom bungee cords add to increase stiffness, and importantly, the top bungee cord 27 can be pulled against the bottom bungee cord 29, and the bottom one against the top one, thereby providing as much stiffness as required to increase the resonant frequency of the system. This is not possible when one has a single bungee cord pulling only from the top, where the tension in the bungee cord is set by the weight of the load. Importantly, this bungee cord's routings can be changed in the field in several minutes and effectively convert an ergonomic suspension into an electricity-generating suspension.

Those skilled in the art will appreciate that, when working in areas off of the electric grid, there is the potential to be exposed to extreme environments. This is particularly the case for soldiers who may submerge their backpacks in fresh and potentially salt water. This is problematic for the electrical system and the bearings. To address this problem, the generator of the backpack of FIGS. 1-3 is preferably mounted to facilitate removal. For example, the AC generator 36 may be designed so that it can be removed by unscrewing 1 or 2 screws so that the AC generator 36 may be placed in a water-tight plastic bag, which is then placed into the back pack body 10 for protection. The battery and electricity harvesting electronics similarly may be placed in the backpack body 10 and similarly secured in a water-tight bag. The bearings 18 may be sealed with grease or a sealant to prevent water and/or dust damage.

Figure 13A:
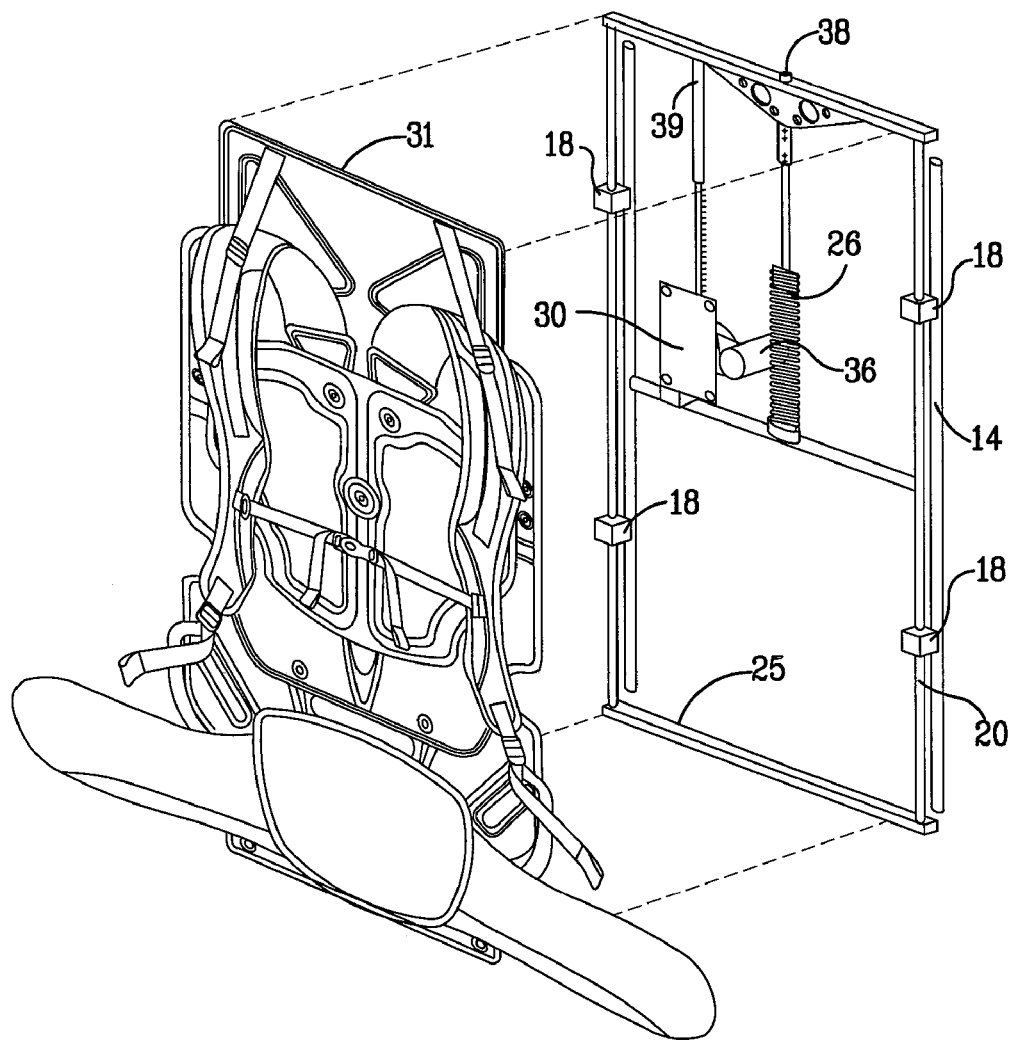
FIG. 13(a) illustrates a backpack with an internal frame.
Figure 13B:
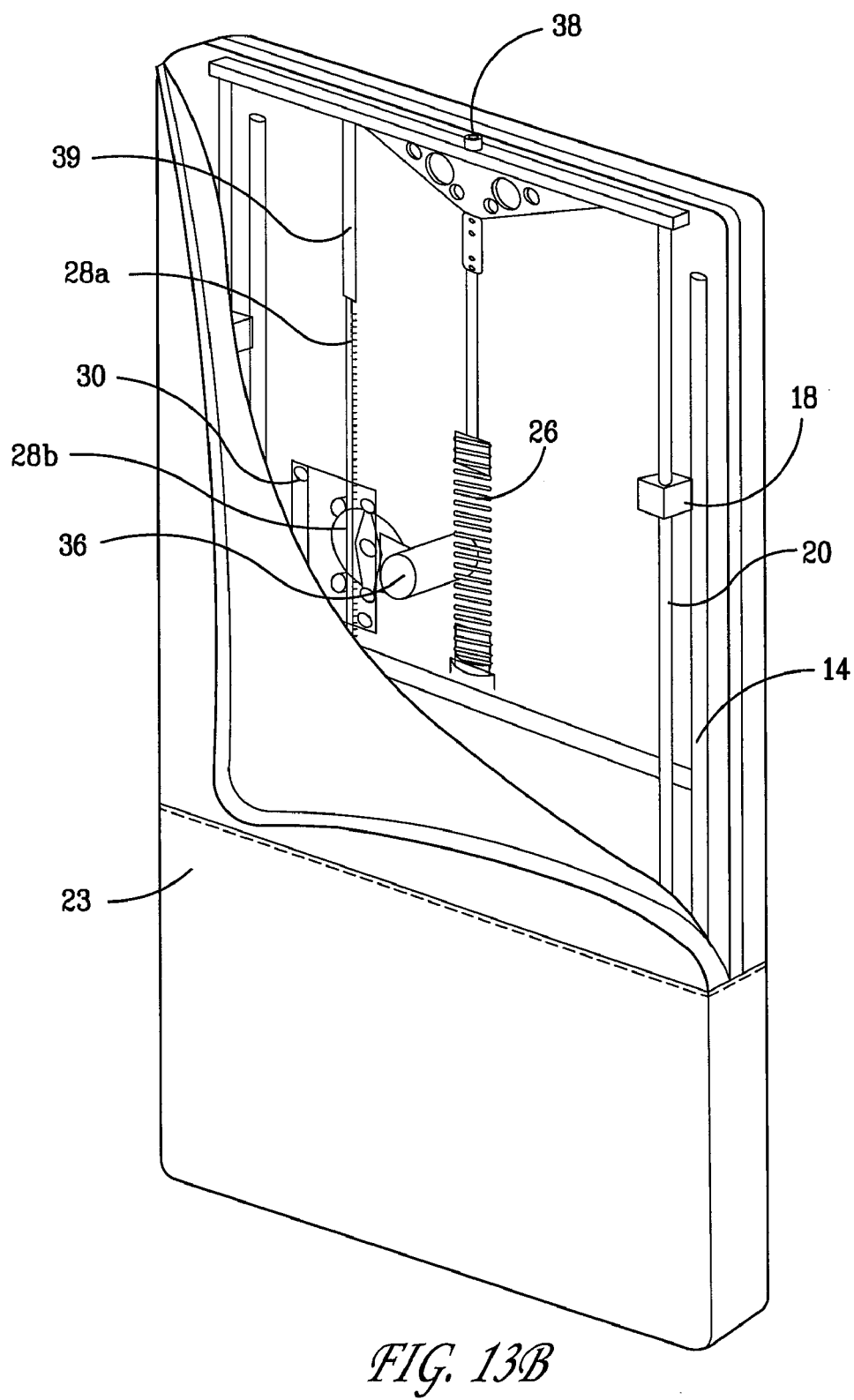
FIG. 13(b) illustrates a dust cover for the embodiment of FIGS. 1-3.

Furthermore, when the backpack is worn in desert environments, there is the problem of sand, dirt, and dust being lodged in surfaces between moving parts, which would reduce efficiency and potentially damage the parts. Such areas include between the gears of the rack and pinion system 28, between the bearings 18 and the rails 20, and in the AC generator 36. Instead of encapsulating individual components, a dust cover 23 as illustrated in FIG. 13(b) is preferably used to enclose the gear train and bearing surfaces, thereby preventing dust or mud from impeding the function of the electricity generating system. The dust cover 23 may be fitted with a zipper and arranged so that the dust cover can be unzipped so as to make the AC generator 36 and rack and pinion system 28 accessible so that they can be quickly removed prior to submersion as explained above. The illustrated dust cover encloses the external frame embodiment of FIG. 2, for example. A dust cover for the internal frame embodiment of FIG. 1 would be a bit different as one face of the dust cover would be the back of the internal frame.

Increasing Efficiency of Conversion of Mechanical to Electrical Energy

As noted above, the backpack described in U.S. Pat. No. 6,982,497 had an efficiency of conversion of mechanical to electrical energy of 30-40%. Theoretically, generators should have approximately 90% efficiency. On the surface, this suggests that there is a large mechanical inefficiency in the system of driving the rotor of the backpack of U.S. Pat. No. 6,982,497 at high speeds, which includes a 25:1 planetary gear set and a rack and pinion arrangement. Upon examination of the specifications for the DC gear motor used in the backpack of U.S. Pat. No. 6,982,497 as a generator, the efficiency of the planetary gear was discovered to be only 68%. The present inventors have thus replaced the DC gear motor with a geared/generator system that uses a brushless AC motor (as opposed to the brushed DC motor). The efficiency of the gearing is greatly improved by utilizing a single stage gear design. The planetary gear system used in the backpack of U.S. Pat. No. 6,982,497 had multiple stages and hence losses at each stage. To obtain the required high gear ratio in a single stage, the following approach was used. The rack 28a interfaces with a very small diameter pinion gear 28b. On the same axle is a large diameter spur gear that meshes with a small gear cut into the axle of the generator 36. By having only one stage, the gear system is very efficient. Although the required high gear ratio can be achieved, this requires the spur gear to be quite large and orthogonal to the generator axis, giving the generator 36 a large foot print and making it difficult to fit in between the pack body 10 and the frame of the backpack. This problem has been overcome by essentially carving out space in the backpack body for the generator 36 to project into in a direction perpendicular to the wearer's back and then protecting the generator 36 with a vacuum formed plastic shell incorporated into the backpack body 10 as noted above.

Figure 28:
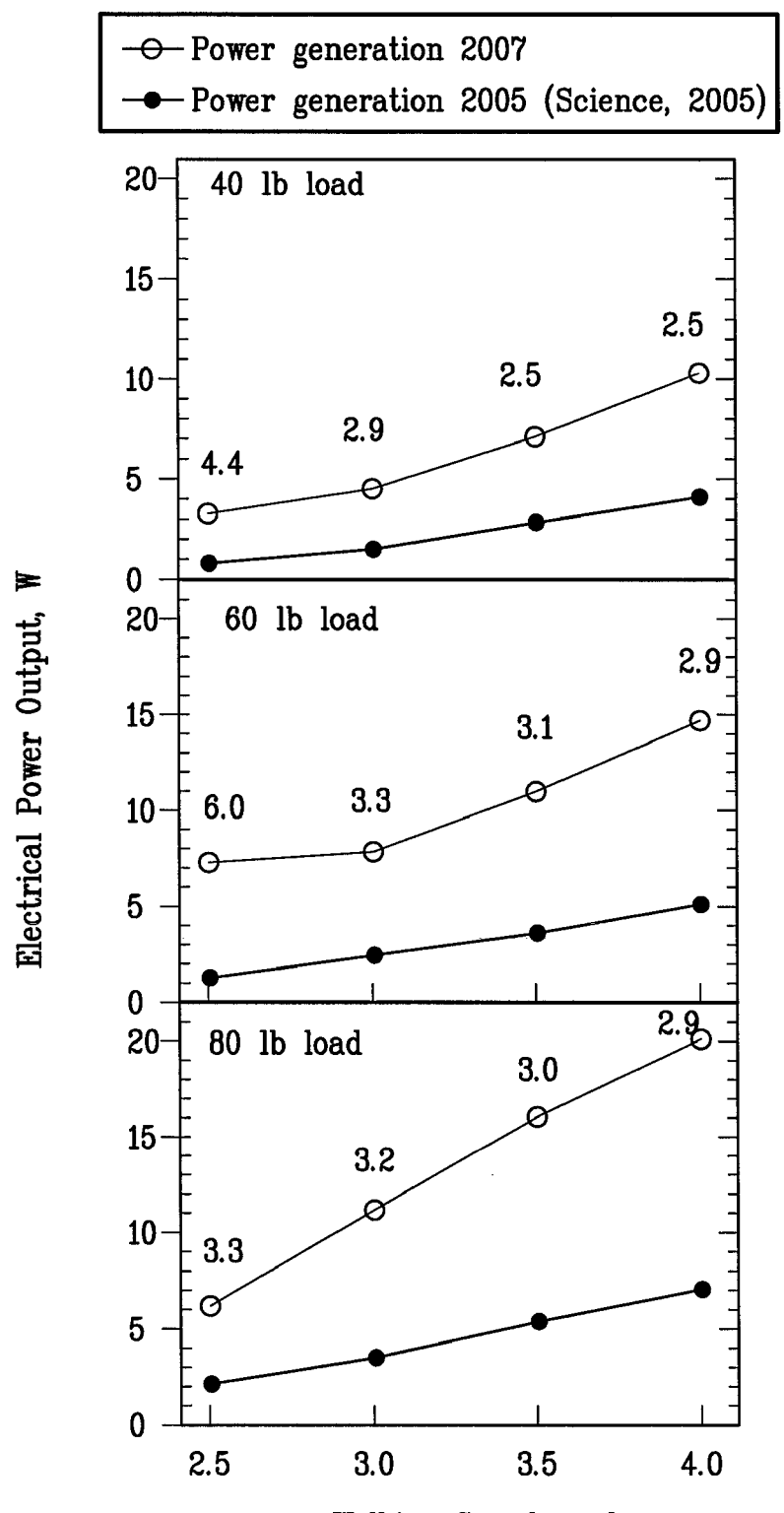
FIG. 28 illustrates the improved electrical output of the electricity generating backpack of the invention versus the earlier generation of the backpack described in *Science* in 2005.

The average efficiency of the new geared generator has been found to be about 75% when driven by an actuator or during walking experiments, and the efficiency has been found to be 85-90% when traveling unidirectionally at a constant speed. The measured improvements in power generating efficiencies were typically higher at slow walking speeds than at high walking speeds, which had the important advantage of producing a significant amount of power at low walking speeds. At high weights and the fastest walking speeds, this leads to a remarkable average electrical power output of up to 20 W of electricity. To put this in perspective, before the electricity-generating backpack of U.S. Pat. No. 6,982,497, the highest reported power output that was generated during walking was between 20-200 mW. Moreover, this property permits the electricity generating system of the invention to be used even in daypacks with relatively small (e.g., 20-30 pound) loads while still producing several watts of power. FIG. 28 illustrates the improved electrical output of the electricity generating backpack of the invention versus the earlier generation of the backpack described in Science in 2005. The numbers correspond to the proportional improvement.

By way of example, FIG. 1 illustrates a day pack without an external frame, while FIG. 2 illustrates the backpack mounted on an external frame. It will be appreciated that the day pack embodiment of FIG. 1 does not require the external frame since the electricity generating suspension formed by parts 22 on the top and bottom and 20 on the sides creates a rigid structure to which the shoulder straps and hip belt can attach directly or indirectly via rigid structure 31 as shown in FIG. 13(a) to form a rigid internal frame.

The inventors do not believe that these improvements are due solely to using a more efficient generator. Rather, some of the improved electrical power and efficiency was achieved by reducing frictional losses, particularly at the rack-pinion gear interface using coatings and greases that also significantly extend the life of the gears. In the backpack of U.S. Pat. No. 6,982,497, the rack was not positioned exactly, and pressure and position were achieved by using a fixed Teflon bearing surface. In the backpack described herein, the fixed Teflon bearing surface is replaced by roller bearings used to position the rack with respect to the pinion gear. Furthermore, the rack 28a is now connected to the backpack plate by a semi-flexible aluminum rod 39 (FIG. 3), which permits the rack to line up even if there is lateral movement of the backpack frame with respect to the generator. All of these contribute to higher power and improved efficiency in the electrical generation, particularly at slow walking speeds Weight-Reduction The parasitic weight of the backpack of U.S. Pat. No. 6,982,497 has been reduced by some 70%, from 14.23 lbs to 4.5 lbs (4.3 lbs plus 0.2 lbs for the power electronic circuitry). The major weight savings involved using a tube structure, rather than a plate, to hold the backpack body 10 and using electro-less nickel-coated aluminum tubes rather than solid steel for the vertical bearing rods 20. Weight was also saved by reducing the size of many of the structural components. Finally, the AC generator 36 and gears of rack and pinion system 28 are also much lighter than the DC generator and gears of the backpack of U.S. Pat. No. 6,982,497.

Spring Design and Control of the Spring Constant.

A disadvantage of the backpack of U.S. Pat. No. 6,982,497 is that it used up to 5 springs (and their respective hardware), and the springs (or attachment points) had to be changed for different weights carried. The present backpack replaces the multiple springs with only 1 stainless steel spring 26 between the fixed frame 25 and moving H frame 14 having an adjustable spring constant that adjusts to loads ranging from 40 to 100 lb loads by engaging more or less active coils. Although one stainless steel spring is considerably lighter than the 5 springs used in U.S. Pat. No. 6,982,497, the extra hardware associated with the spring constant adjustment makes the total weight about the same as with the backpack of U.S. Pat. No. 6,982,497. However, the adjustment system is a significant functional improvement, as in a matter of seconds the spring constant (k) of the system can be changed. The advantage is that the resonant frequency of the system $$\left(\omega_{res} = \sqrt{\frac{k}{m}}\right)$$

can be adjusted to match the step frequency during walking and thereby improve the power output of the backpack system for a given walking speed and weight of the load.

Circuit Design of Power Management and Battery Charging

As noted above, the electrical output of the geared DC servomotor generator used in the electricity generating backpack described in U.S. Pat. No. 6,982,479 was run through a power resistor so that the electrical power generated could be easily measured. However, for the backpack to function effectively, the damping, which is determined largely by the current output of the generator, must be controlled. Too much current flow, as would be observed when attaching most electronic devices (e.g., battery charger), overdamps the load, leading to little relative movement of the load with respect to the backpack frame, and thus low electrical power output On the other hand, too little current removed results in the load undergoing large vertical oscillations making it difficult to walk (this is a special concern as the resonant frequency of the backpack is matched to walking frequency). Accordingly, it is desired to provide a circuit that: 1) controls current output from the generator to optimize harvesting and ergonomics, 2) directs current to power the portable devices in real-time, 3) sends excess power to either ultracapacitors or rechargeable batteries or both, and 4) in the special case where there is no damping because all storage devices are full and no portable devices connected, then damping is obtained by switching a load resistor across the output of the generator. In this case the electrical energy is converted to heat and lost, but this load resistor is usually out of the circuit and only switched in during this special case.

In addition to the damping considerations, there are important electrical considerations as well. A characteristic of charging and recovering energy from batteries is that there can be a significant loss of electrical energy, as much as 30-50%. This makes it advantageous to power devices in real-time directly from the backpack. In addition, storing electrical energy in high specific energy capacitors can avoid some of these losses. The disadvantage of capacitors is that they have a smaller energy density than batteries. It is likely therefore that after powering devices in real time, the highest priority will be to store at least some of the extra electrical energy on high specific energy capacitors (high priority), after which the remainder will be stored on lower-priority batteries. Hence, the circuits described below are designed to maximize the amount of usable electricity from the mechanical power removed from the human-backpack system.

Figure 5:
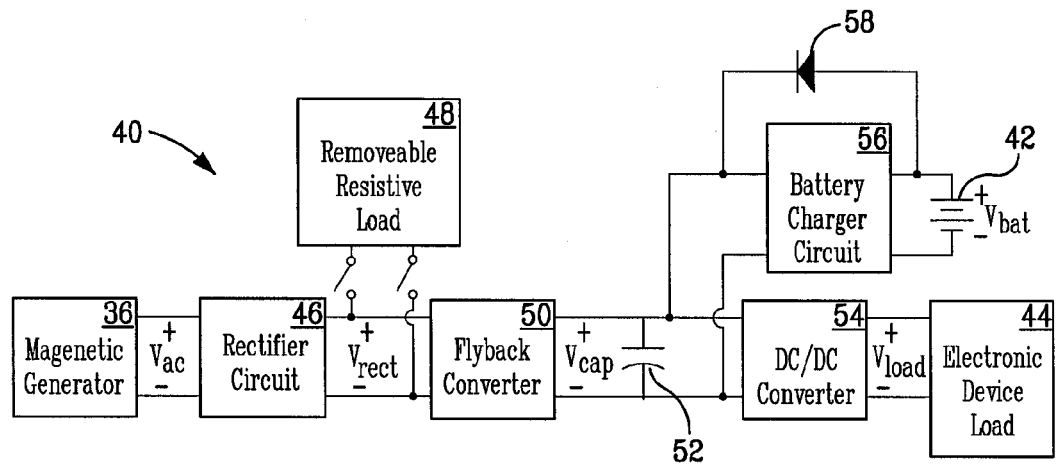
FIG. 5 illustrates a power electronic circuit used in the backpack of FIGS. 1-4 to extract energy from the AC generator for charging a lithium-technology battery pack and providing power to an electronic load.

As illustrated in FIG. 5, power electronic circuit 40 is provided in accordance with a first embodiment to extract energy from the backpack AC generator 36 and to use this energy to both charge a lithium-technology battery pack 42 and to provide power to an electronic load 44. In an exemplary embodiment, the AC generator 36 may be a brushless AC generator with input spur gear, guide rollers for a rack, speed increasing gears, slotless brushless 3-phase windings with rare earth magnets and output circuit board with Schottky diodes to convert the 3-phase AC output of the winding to DC with approximately 98% efficiency. The AC generator 36 is preferably light in weight, preferably less than 0.5 pounds.

The output of the brushless AC generator 36 is rectified through a full-bridge diode rectifier circuit 46. Should the output voltage of the rectifier circuit 46 attempt to exceed a preset value, a variable resistive load 48 is enabled which limits the voltage to this value. This feature protects the power electronic circuit 40, as well as provides some minimum amount of damping to the backpack to avoid excessive displacements. The output voltage from the rectifier circuit 46 is then converted by a flyback DC-DC converter 50 designed to emulate a desired (e.g., resistive) load at its input terminals. As explained below, the brushless AC generator 36 in the backpack application of the invention, where the speed of the AC generator is constantly changing, is more efficient if the current drawn from the AC generator 36 is a certain function of the rotor speed. In particular, a resistive-type load is more efficient than a constant voltage or constant current load. This resistive emulation also provides a linear damping to the mechanical dynamics of the backpack, which was found to be necessary to avoid excessive displacements of the backpack that occur in an underdamped condition.

Ultracapacitors 52 at the output of the flyback converter 50 provide an energy storage mechanism from which power can be stored and extracted efficiently. This is desired for the backpack application, as the output voltage of the rectifier circuit 46 is a rectified sinusoid at the relatively low frequency of approximately 2 Hz, and the power drawn from the rectifier circuit 46 is proportional to the square of this voltage. The ultracapacitors 52 therefore provide constant power to the electronic device load 44 through a DC/DC converter 54 and to battery pack 42 via battery charger circuit 56 when the power output of the rectifier circuit 46 is low, and store the excess power available when the power output of the rectifier circuit 46 is high. The ultracapacitor voltage powers the lithium-technology battery charger 56, plus the separate DC/DC converter 54 that provides a regulated output voltage to electronic device load 44. When the output voltage of the flyback converter 50 is lower than the battery voltage, the diode 58 begins to conduct, and the battery pack 42 provides power to the electronic device load 44.

In an exemplary embodiment, 7.2V lithium ion batteries were used for battery pack 42, and the ultracapacitor energy storage system included four ultracapacitors, rated at 2.5 F and 5.4V, with two sets of parallel ultracapacitors connected in series. The output voltage of the flyback converter 50 in this embodiment was therefore limited to 9.5V to ensure that the combined rated voltage of the ultracapacitors was not exceeded. It is noted that in many applications, particularly military, voltages of 12-30 Volts will be desired and the system can be adjusted to achieve this. The battery charger circuit 56 was designed to charge a 7.2V lithium-ion battery at charging currents up to 1 A. This current decreases as the battery voltage gets close to its fully charged value. The minimum voltage experienced by the ultracapacitors 52 in this embodiment is therefore approximately 6.9V while the battery pack 42 is charged (7.2V minus approximately 0.3V across the diode 58, in this case a Schottky rectifier). The voltage regulator 54 is designed to provide a constant 5V output voltage for the electronic load 44 at current levels up to 2 A.

Structure of the AC Generator

As noted above, the AC generator 36 functions to converting mechanical energy into electrical energy. Those skilled in the art will appreciate that this can be achieved using one of the following methods:

- magnetic-field-based energy conversion,
- electric-field-based energy conversion, or
- energy conversion using materials with electromechanical constitutive properties (e.g., piezoelectric materials).

Magnetic-field-based devices tend to be preferable to electric-field-based devices due to the fact that significantly higher forces and torques can be practically generated with magnetic fields as opposed to electric fields. Energy conversion devices based upon materials with electromechanical constitutive properties tend to be desirable in applications where the power levels are relatively low (i.e., on the order of milliwatts). As the performance and reliability of magnetic-field-based devices are well known, an exemplary embodiment of the AC generator 36 is a magnetic-field-based device.

Magnetic-field-based electro-mechanical energy conversion devices tend to work best when the electrical frequencies associated with the device are high (i.e., in the tens or hundreds of Hz). There are two main reasons for this: power density and energy conversion efficiency.

Power Density: The size of an electromechanical device tends to determine the maximum force or torque that the device is capable of generating. The power converted by the device, however, is given by the expression:

$$P = f_{fld} v$$

or $$P = \tau_{fld} \omega$$

where $f_{fld}$ and $\tau_{fld}$ are the electromagnetic force or torque, respectively, v is the linear velocity and $\omega$ is the rotational velocity. Hence, for high power density, it is desirable that the velocity be high. This corresponds directly to a high electrical frequency of the voltage and current waveforms in the device.

Efficiency: High electrical frequency is also necessary to achieve a high efficiency. For example, in a permanent-magnet-based device, the RMS AC voltage generated by the magnets in a machine winding can be written as:

$$E = \omega_e \lambda,$$

where $\omega_e$ is the electrical frequency in radians/sec, and $\lambda$ is the RMS flux-linkage of the permanent magnets in the device's windings. This peak flux-linkage is fixed for a given design. The converted electromechanical power in a device winding is given by:

$$P_{conv} = EI,$$

where I is the RMS current in the winding. The electrical losses in the device will often be dominated by conduction losses. The conduction losses in a winding are given by:

$$P_{closs} = RI^2$$

where R is the electrical resistance of the winding. The efficiency is therefore given by:

$$\eta = \frac{\omega_e \lambda I - RI^2}{\omega_e \lambda I}$$

Inspection of this expression makes it clear that a high electrical frequency is necessary for high efficiency. It is therefore typically desirable to operate electromechanical devices in the range of 10's to 100's of Hz, with the higher frequencies corresponding to higher performance.

Generally, the mechanical oscillation frequencies associated with human-based energy harvesting are on the order of 1 Hz, a frequency much too low for efficient direct energy conversion with magnetic-field-based devices. Therefore, the need in accordance with the invention to boost the electrical operating frequency of the device leads to two proposed approaches, namely linear and rotary converters.

Linear Device: For a linear device, the recommended structure for use in accordance with the invention includes a relatively short stator that resides on the stationary part, and a relatively long "mover" consisting of a shaft covered with a series of alternately poled permanent magnets. The magnets should be placed along the entire stroke length of the shaft in order to harvest as much energy as is available. This can make the design of a linear generator with high power density challenging. The relationship between the linear velocity v of the shaft and the electrical frequency $\omega$ of the device is given by:

$$\omega = \frac{v}{\lambda}$$

where $\lambda$ is the "wavelength" of the device, corresponding to the length of a north-south pole-pair on the shaft. In order to achieve a high electrical frequency, the wavelength of the resulting flux waveform generated by the permanent magnets will need to be small to convert the slow mechanical velocity into a high electrical frequency. The shaft design would therefore need to consist of a large number of small magnets. Under these circumstances, in order to achieve good magnetic coupling between the stator and mover with such a design, the "gap" between the mover and stator will also need to be relatively small.

Rotating Device: A rotating electromechanical device could also be used as the AC generator 36. This would require a system that would convert the linear motion of the system into rotational motion. Two approaches to achieving this conversion include:

- a pulley- or gear-based method, or
- a hydraulic-based method.

Such a system could also be used to create a high rotational velocity in the machine, and thereby achieve the requisite high power density and high electrical frequency. However, this system will also entail some mechanical losses, which will increase with an increasing rotational/linear velocity ratio, and so an "optimal" rotational speed would need to be determined in order to maximize the overall efficiency of the energy harvesting. Rotating magnetic devices with the power levels needed for this application are readily available, some with optional gearing systems, and are presently preferred for use as the AC generator 36 as they are less expensive and more power dense than a comparable linear-based energy harvesting system.

Resistive Load Emulation

It can be shown that the magnetic-field-based generator under the conditions of a backpack application, where the speed of the generator is constantly changing, is more efficient if the current drawn from the AC generator 36 is a certain function of the rotor speed. In particular, a resistive-type load can be shown to be more efficient than a constant voltage or constant current load. In such case, the DC-DC converter 54 that interfaces with the rectifier circuit 46 and the ultracapacitor energy storage system 52 can be designed in such a way as to mimic a resistive load. Although a buck-boost converter topology may implement this function, flyback converter 50 (which is essentially a buck/boost converter with the inductor replaced by a transformer) was selected since the electrical isolation provided by the flyback transformer of the flyback converter 50 eliminated the need for isolated gate driver circuitry and since the turns ratio of the flyback transformer created an extra degree of freedom that allowed the design of a converter that would operate in discontinuous current conduction mode (DCM) over all operating points with reasonable efficiency.

In the case of both the buck-boost and flyback converters, when operating in DCM mode the input voltage of the converter mimics a resistive load. It can be shown that, under these conditions, the power drawn by the converter is proportional to the square of the input voltage, i.e.:

$$P_{in} = \frac{V_{in}^2 D^2}{2 f_s L} = \frac{V_{in}^2}{R_{eff}},$$

where $V_{in}$ is the input voltage of the converter, $f_s$ is the switching frequency, L is the converter inductance (in the case of the flyback converter 50, L corresponds to the magnetizing inductance of the flyback transformer on the primary side), and D is the duty cycle. Hence, if the flyback converter 50 is operating at a fixed duty cycle it will emulate a constant resistance. The duty cycle that emulates a desired resistance $R_{des}$ can be determined from the following equation:

$$D = \sqrt{\frac{2 f_s L}{R_{des}}}$$

Design of Flyback Converter in Discontinuous Conduction Mode

In an exemplary embodiment, the flyback converter 50 emulates a resistive load of, for example, 10Ω over a voltage range of up to $24 V_{pk}$ from the AC generator 36. This corresponds to a maximum power $P = V^2/R = 57.6$ W that is drawn from the AC generator 36 by the flyback converter 50. The flyback converter 50 is thus designed to operate at this operating point, at which the components in the flyback converter 50 will experience the maximum voltage and current levels, and DCM will be most difficult to accomplish.

Figure 6:
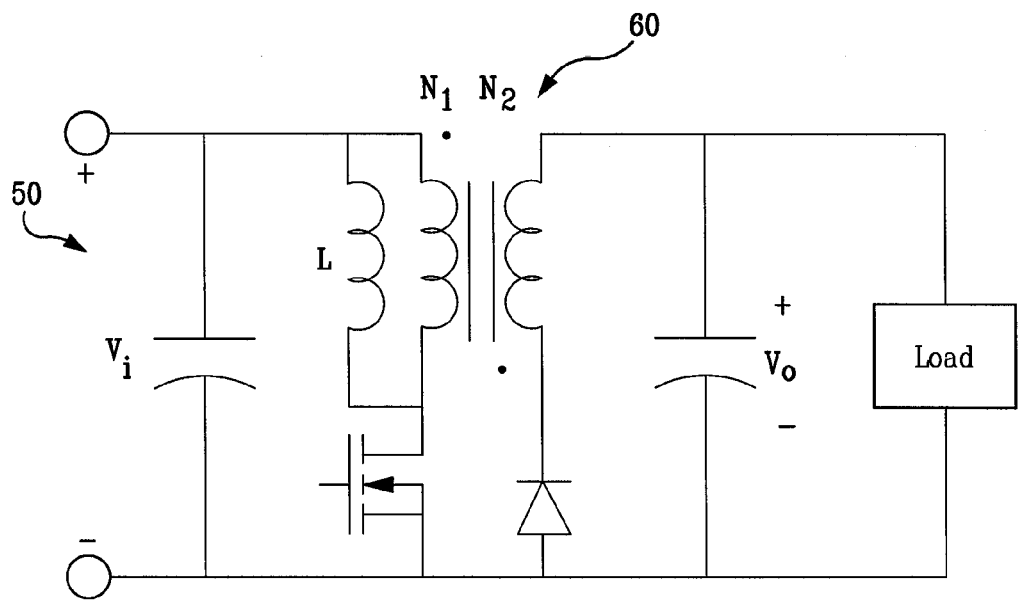
FIG. 6 illustrates an embodiment of a toroidal, magnetic-power-based core used for the flyback transformer of the flyback converter of the circuit of FIG. 5.

As illustrated in FIG. 6, a toroidal, magnetic-power-based core was chosen for the flyback transformer 60 of the flyback converter 50. This core material possesses a relative permeability $\mu_r=125$ and is capable at operating at frequencies up to 600 kHz. In an exemplary embodiment, the toroid has inner and outer diameters $d_i=0.491$ in and $d_o=0.671$ in, respectively, and a thickness $t=0.261$ in. The primary winding was chosen to have $N_1=9$ turns of 16 AWG wire, hence the magnetizing inductance of the transformer 60, as transferred to the primary side, is given by:

$$L = \frac{\mu N_1^2 t}{2\pi} \ln\left(\frac{d_o}{d_i}\right) = 4.2 \ \mu H$$

A switching frequency $f_s=100$ kHz was chosen for the flyback converter 506. At a power level of 57.6 W, the peak energy stored in the flyback converter 50 is $E_{pk}=P/f_s=576$ μJ. The peak current seen in the primary winding is therefore:

$$i_{ppk} = \sqrt{\frac{2 E_{pk}}{L}} = 16.6 \ A$$

The peak magnetic flux density in the core is therefore given by:

$$B_{max} = \frac{\mu N_1 i_{pk}}{\pi d_i} = 0.6 \ T,$$

well within the saturation flux density of the core material. For an input voltage of 24V, the duty cycle which achieves this peak current is:

$$D = \frac{i_{ppk} f_s L}{V_{in}} = 0.29$$

In order to ensure that the flyback converter 50 stays in discontinuous current conduction mode, the energy stored in the flyback converter 50 is completely discharged through the secondary winding before the switching period ends. As the minimum possible output voltage of the converter is 3.3V, the number of secondary turns that will guarantee discontinuous current conduction over all operating points is given by:

$$N_2 = \frac{N_1 (1-D) V_{out \ min}}{f_s L i_{ppk}} = 3 \text{ turns}$$

As this number of turns is low, it was achieved by wrapping three separate coils of 18 AWG wire at three turns apiece, and connecting them in parallel. This design also mitigates the skin effect and its adverse impact on winding resistance in the secondary winding. The peak value of the secondary current is therefore:

$$i_{spk} = \frac{N_1}{N_2} i_{ppk} = 49 \ A$$

In the approach described above, a fixed duty cycle will cause the flyback converter 50 to appear as a resistive load to the AC generator 36, and hence the power drawn from the AC generator 36 will be proportional to the square of the generator voltage. However, this approach should be modified if the ultracapacitor energy is at its maximum allowable voltage, and the battery charger circuit 56 and/or electronic device load 44 are drawing less power than that prescribed by these conditions.

Figure 7B:
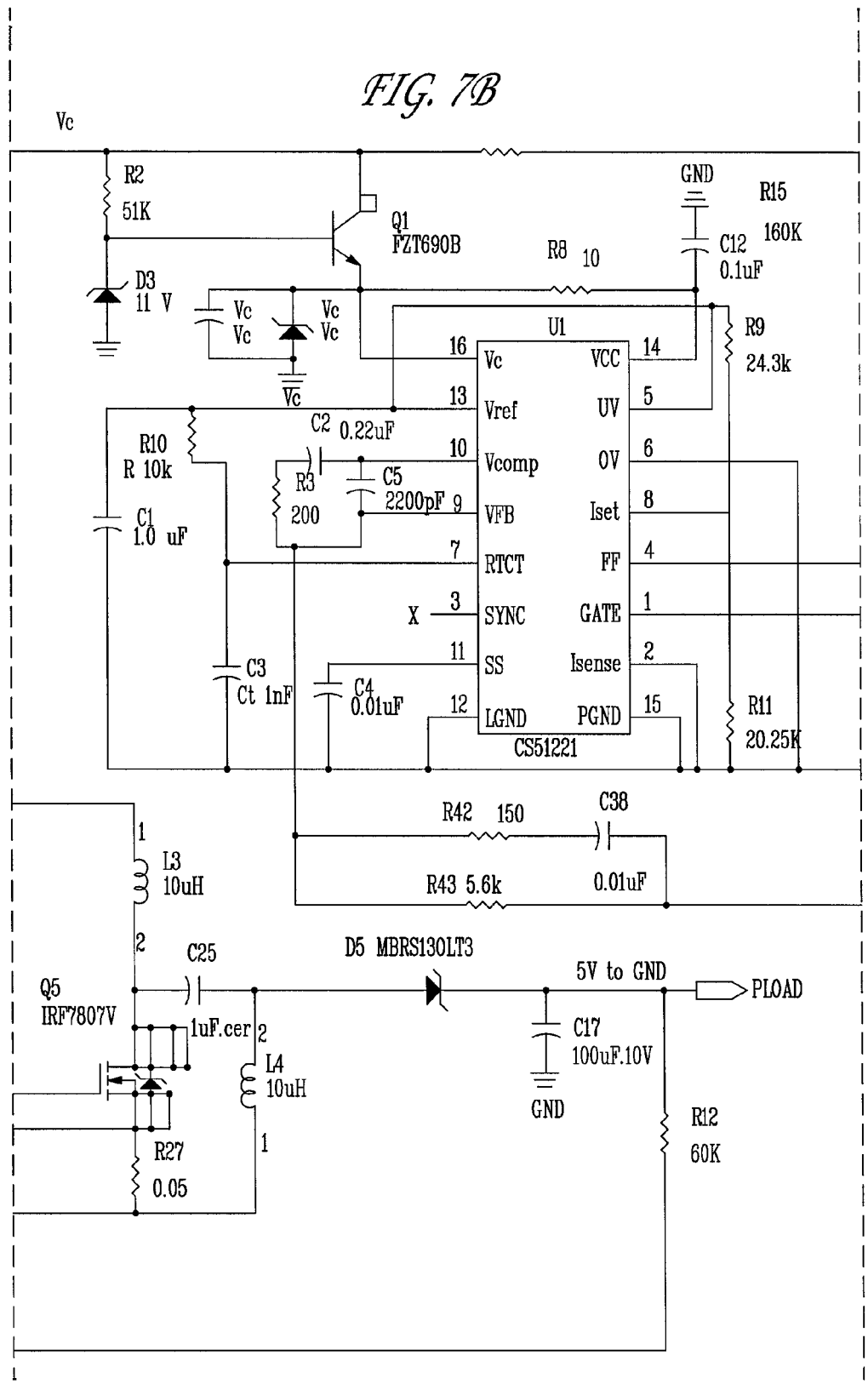
FIG. 7 illustrates the schematic for an embodiment of the circuit of FIG. 5.
Figure 7D:
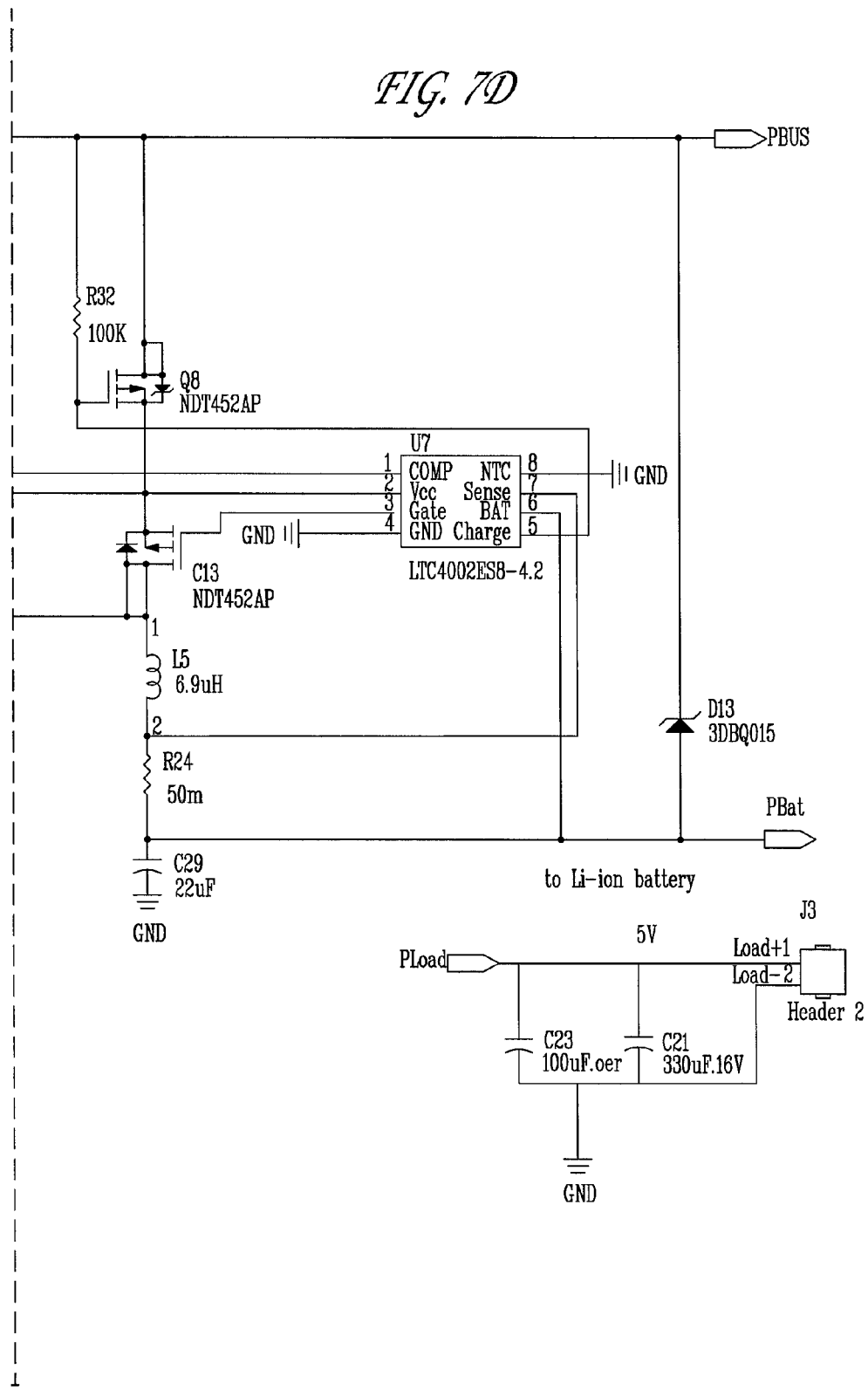

This property is achieved in the circuit implementation of FIG. 6 by using a commercially available controller IC (not shown), such as the CS51221 by On Semiconductor. This controller IC is designed to regulate the output voltage of the flyback converter 50 yet possesses the ability to constrain the duty cycle to a maximum prescribed value. By setting the command output voltage of the flyback converter 50 to be the maximum allowed voltage across the ultracapacitors 52, the desired behavior can be achieved. While the ultracapacitor voltage is below this maximum value, the controller IC will command the maximum allowed duty cycle in an attempt to reach this voltage. Once this voltage is reached, the duty cycle will adjust itself as necessary to supply the power required by the battery charger 56 and/or electronic device load 44. The schematic for the circuit design of the circuit of FIG. 5 is shown in FIG. 7. The input of the circuit of FIG. 7 consists of the rectified output of the AC generator 36, and is connected to two separate subcircuits: a simple circuit that connects a resistive load to the output when the output voltage exceeds a certain level, and the input to the flyback converter 50. The flyback converter subcircuit transfers the generated power to the ultracapacitor bank 52. Two subcircuits are then connected to the ultracapacitor bank 52; a lithium-ion battery charger 56, and a DC-DC converter 54 that generates a constant 5V output voltage for powering electronic device load 44. Diode 58 is connected in antiparallel with the battery charger 56, so that the battery pack 42 can provide power to the 5V DC-DC converter 54 should the power provided by the backpack be insufficient.

In the embodiment of FIG. 7, flyback converter 50 emulates a resistive load. This was accomplished by designing the converter to operate in what is known as discontinuous conduction mode. Although this allowed the emulation of a resistive load, it also constrained the design of the flyback converter 50 in a way that limited its efficiency. An alternate approach that would also achieve the goal of resistance emulation would be to regulate the input current of the flyback converter 50 so that it is proportional to the input voltage. Such an approach is similar to that used in active power factor correction circuits. This approach will remove any constraints on the converter design so that the converter can be optimized for efficiency. Accordingly, the power electronic circuitry 40 has been designed to improve the efficiency of the circuitry, to provide a resistive load with which to absorb excess power, and to allow the circuitry to represent a more general load to the backpack AC generator 36 in order to maximize the energy extracted from the AC generator 36.

SEPIC Converter Topology

Figure 8:
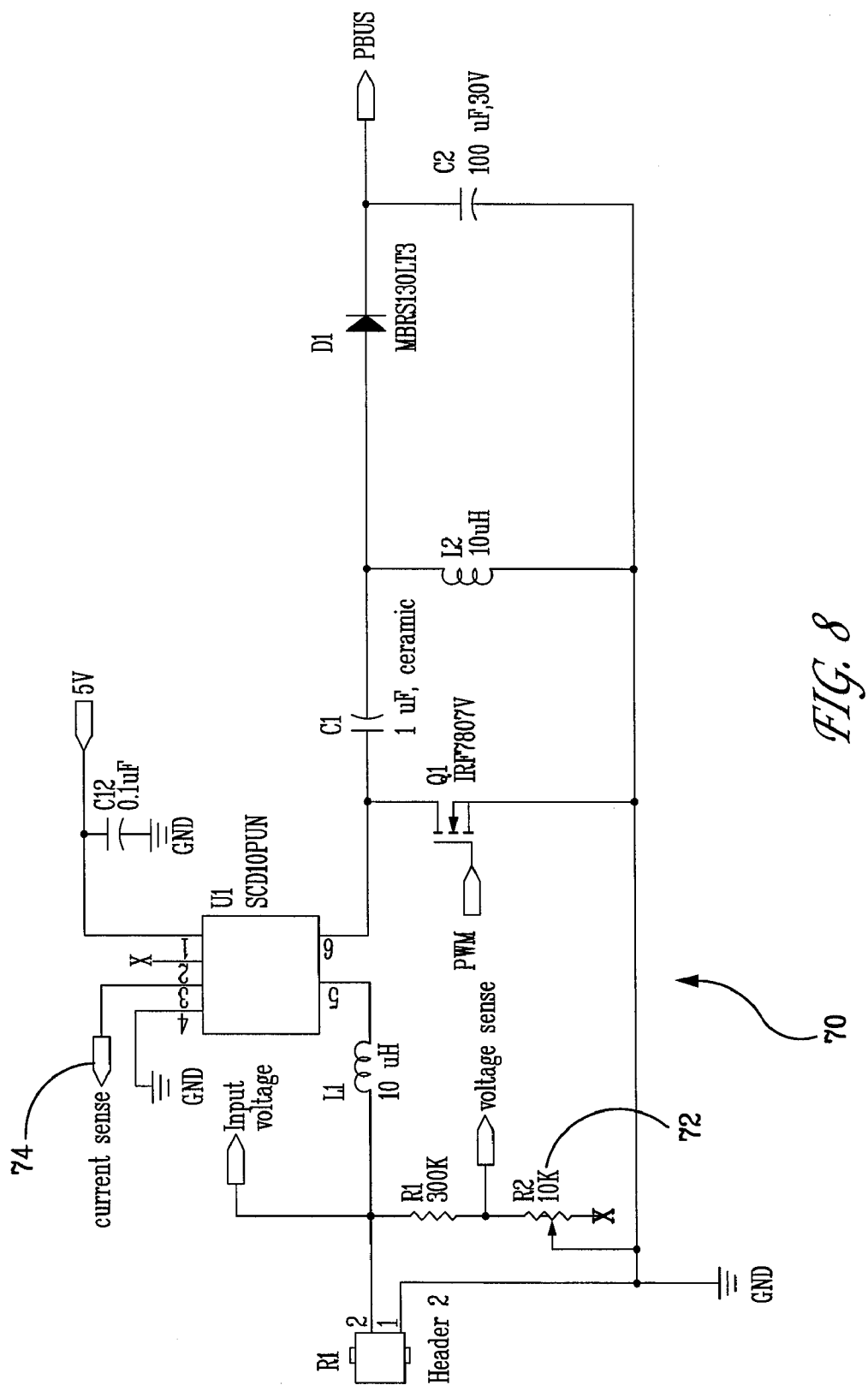
FIG. 8 illustrates the schematic for an exemplary embodiment of a SEPIC (Single-Ended Primary Inductor Converter) topology of an alternate embodiment of a flyback converter of an alternate embodiment of the circuit of FIG. 5.

A SEPIC (Single-Ended Primary Inductor Converter) topology also may be used in an exemplary embodiment of the flyback converter 50 to interface the AC generator 36 to the ultracapacitor energy storage system 52. An exemplary design of such a flyback converter is illustrated in FIG. 8. This converter, like the buck-boost converter, allows the output voltage to be greater than or less than the input voltage. This is beneficial due to the oscillating and uncertain nature of the output of the AC generator 36. Furthermore, as illustrated in FIG. 8, the SEPIC converter 70 has an input inductor L1 that creates the ability to easily regulate the input current. A voltage divider 72 is also present at the input to allow voltage measurement, and a current sensor 74 is placed in series with the input inductor L1 as illustrated. By controlling the measured current using a Proportional-Integral (PI) feedback regulator and Pulse-Width Modulation (PWM), the input current of the SEPIC converter 70 of FIG. 8 can be set to be a certain function of the measured input voltage, whereby the circuit can emulate an arbitrary load for the AC generator 36.

Figures 9, 9A:
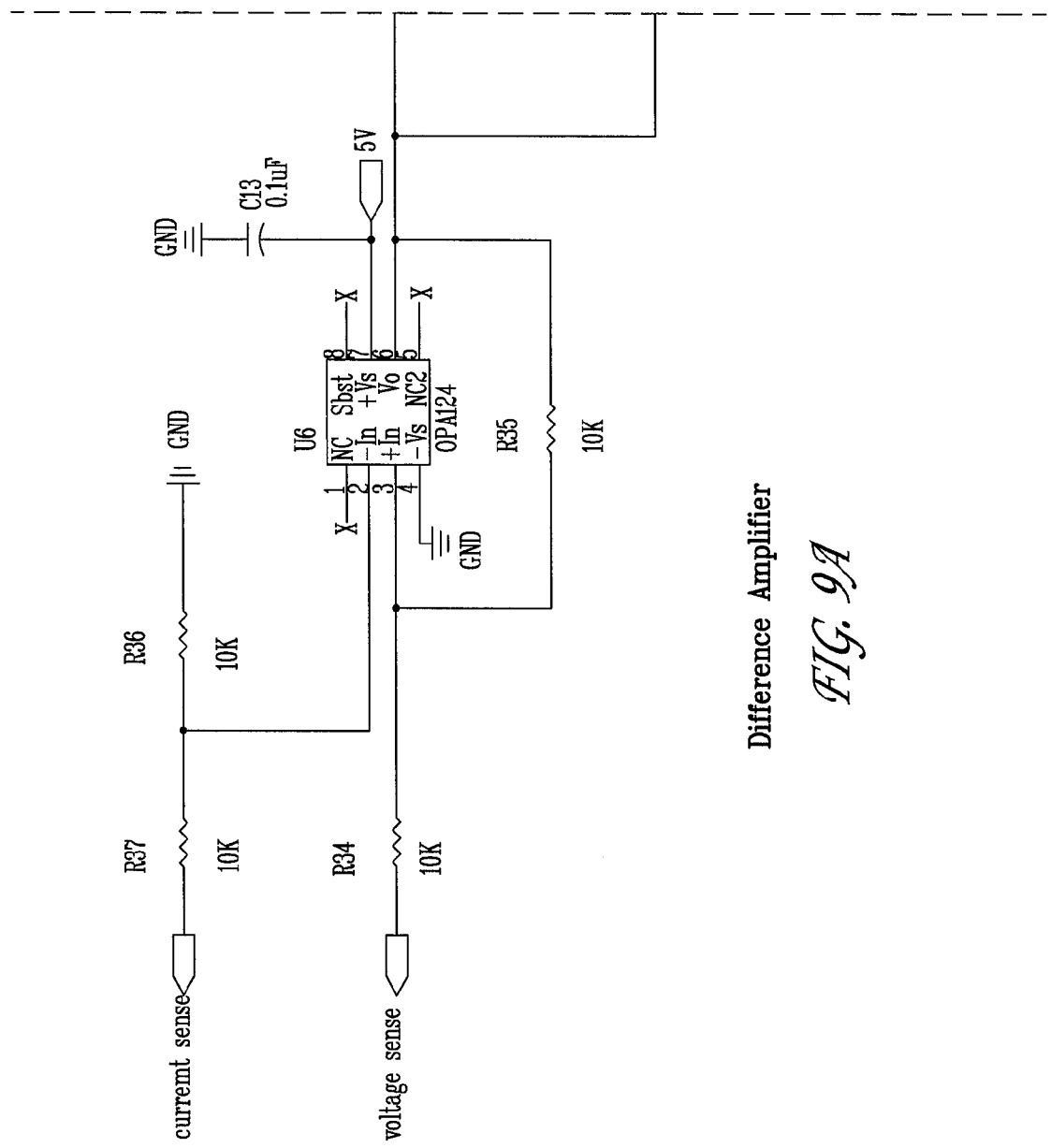
FIG. 9 illustrates the schematic of the circuitry associated with the PI regulator and the PWM generator of the circuit of FIG. 8.
Figure 9B:
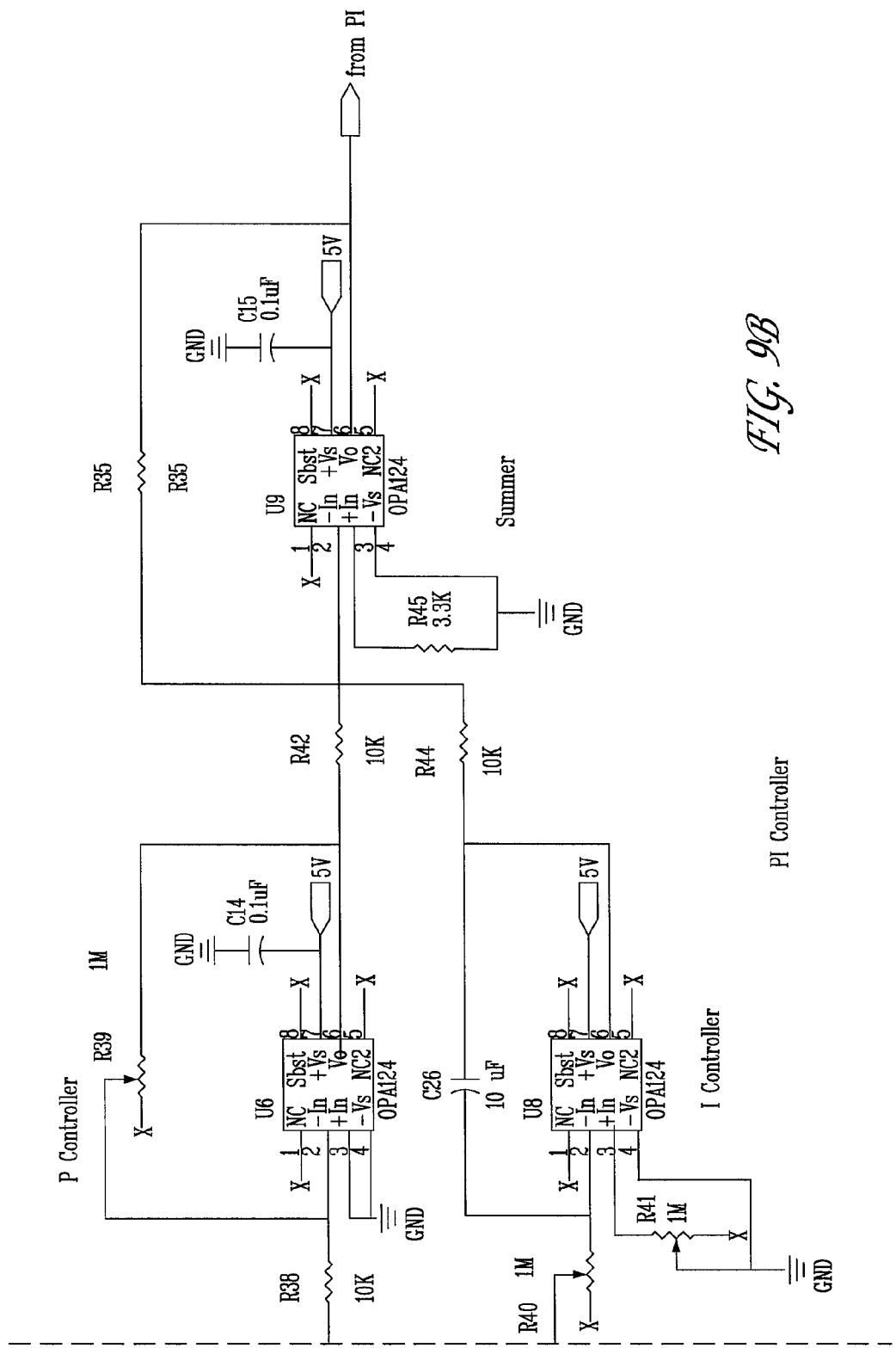
Figure 9C:
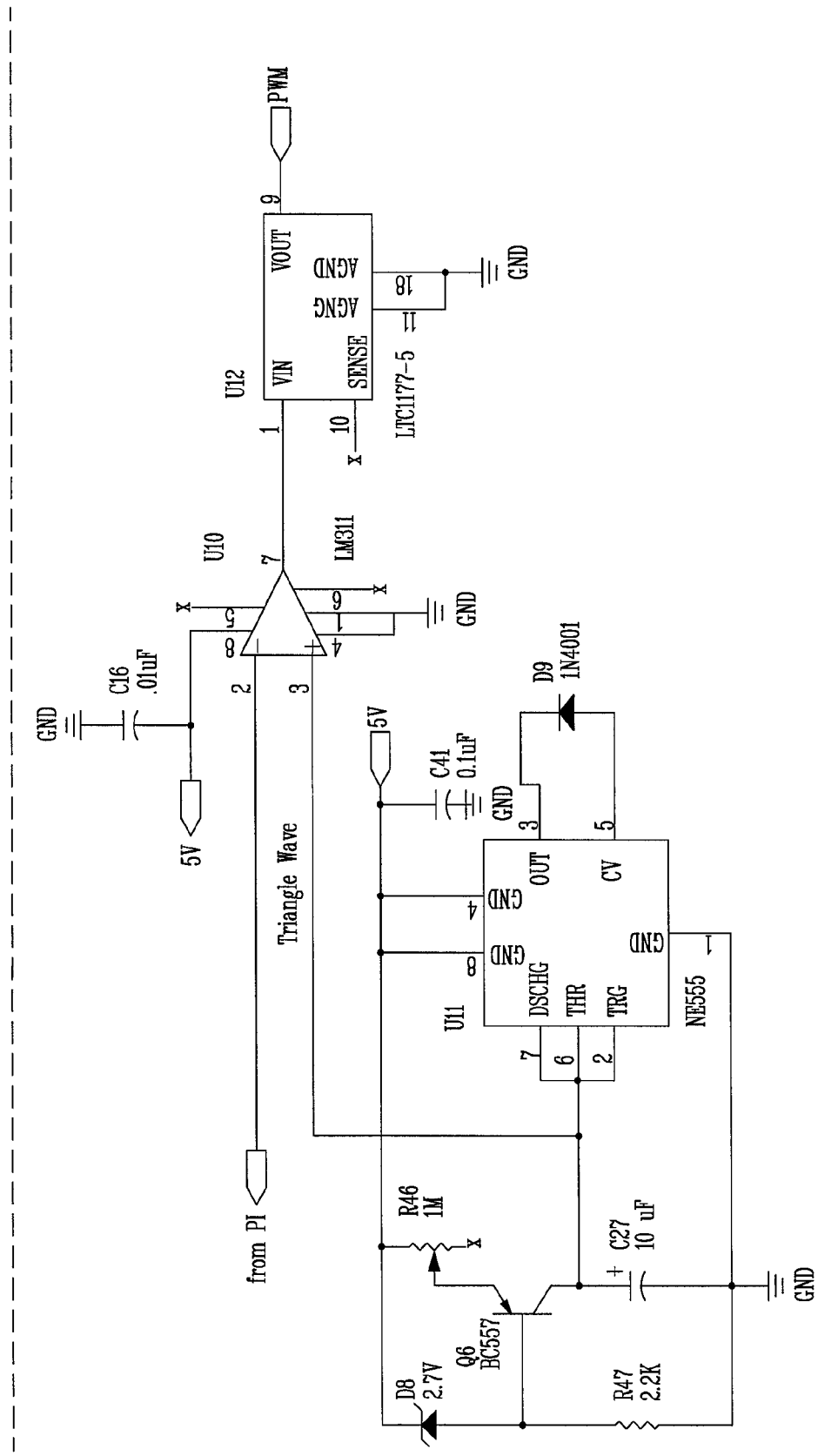

The circuitry associated with the PI regulator and the PWM generator is shown in FIG. 9. In this circuitry, the input current is set to be proportional to the input voltage; however, other, nonlinear relationships between current and voltage may be used that may enhance the amount of energy extracted from the AC generator 36. This control approach significantly improves the efficiency of energy conversion when compared to the control technique of FIG. 7, which required operation of the converter in Discontinuous Conduction Mode (DCM).

Figure 10:
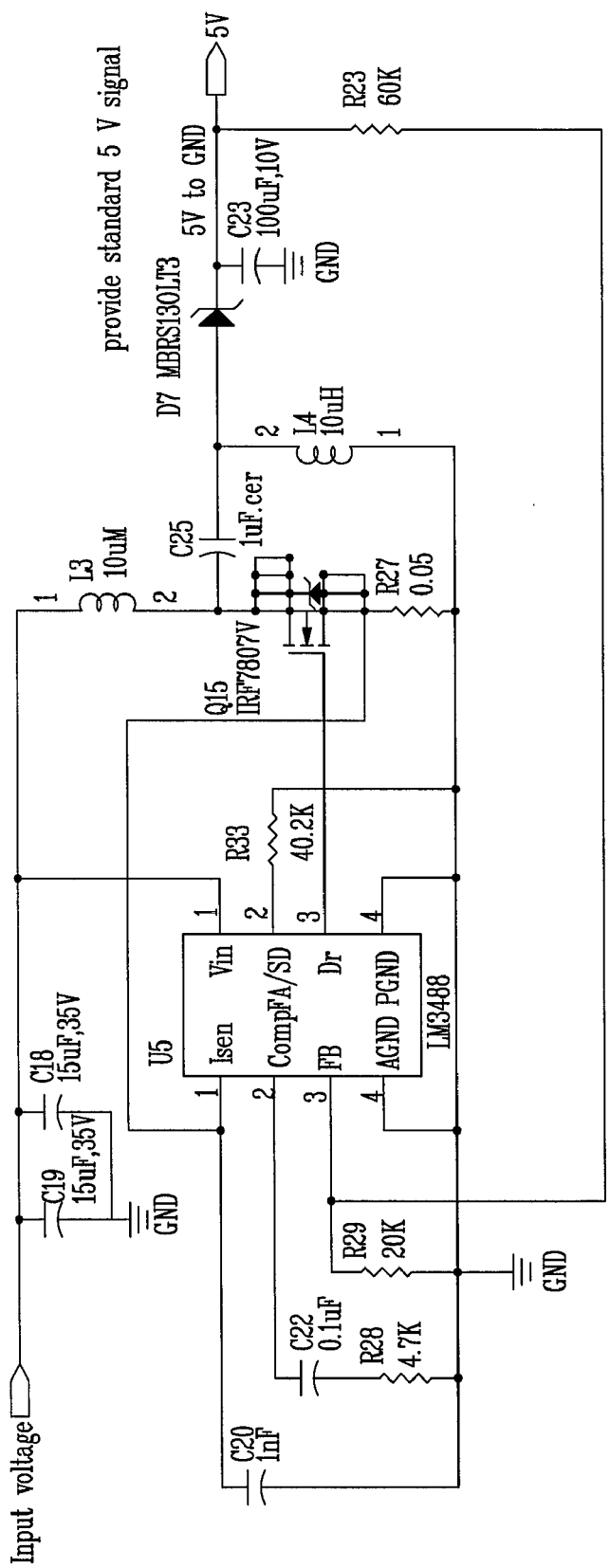
FIG. 10 illustrates the schematic of an embodiment of a power SEPIC converter that generates a constant 5V output.

The current regulator and PWM generator circuitry of FIG. 9 is, in turn, powered by a second, smaller-power SEPIC converter 80, whose input is also connected to the output of AC generator 36, and which generates a constant 5V output. This converter is controlled by a commercially-available IC. The schematic for this converter is shown in FIG. 10.

Energy Storage, Power Loads

The power extracted by the SEPIC converter 70 of FIG. 8 has several possible outlets:

- It can be directly stored in ultracapacitor energy storage system;
- It can be stored in a lithium-ion battery pack via a battery charger;
- It can power a 5V load via a SEPIC converter; or
- Should there be no other available outlet, the power will be dissipated in a 10 W load resistor.

Figure 11B:
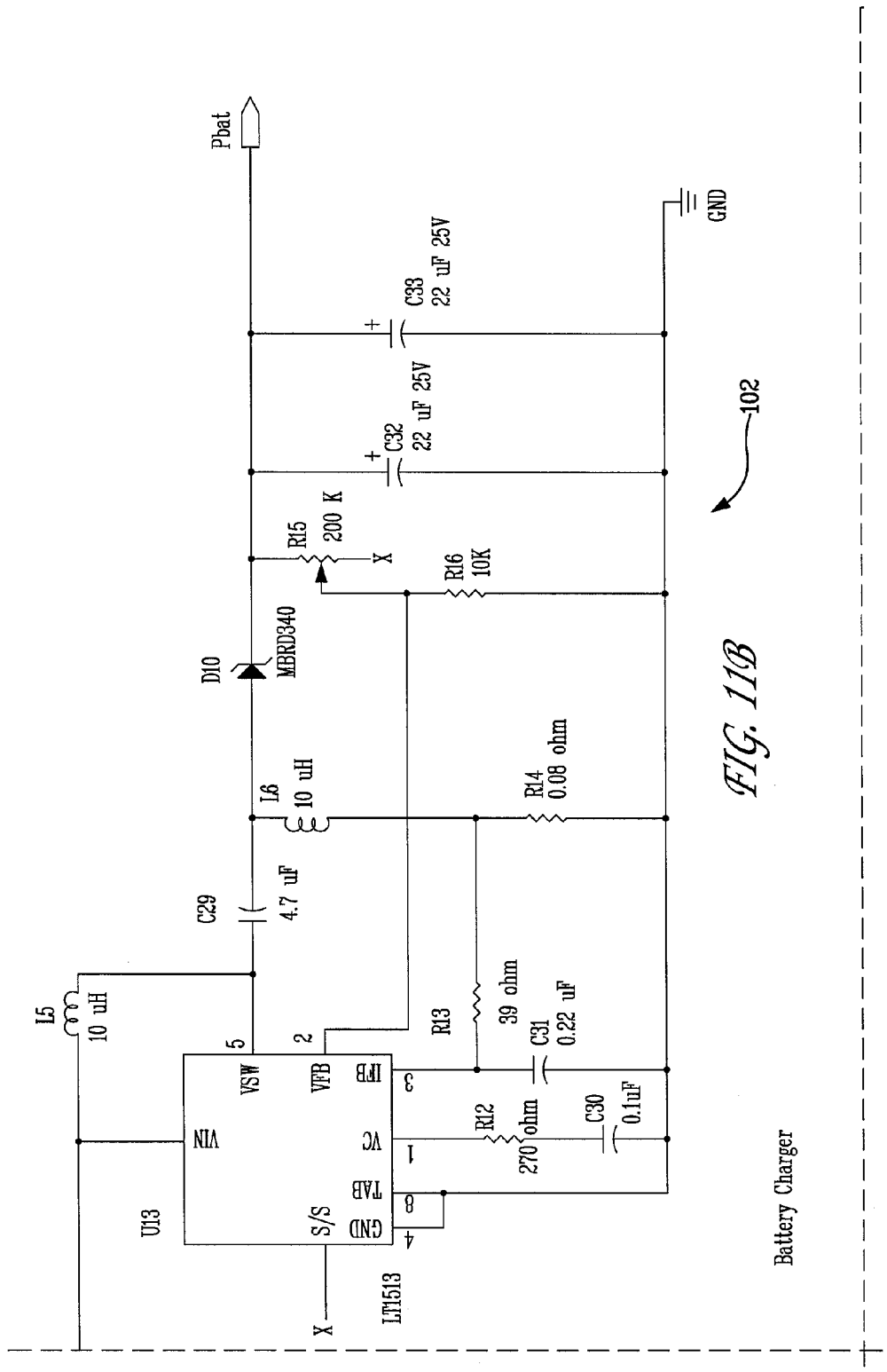
FIG. 11 illustrates the schematic of the circuitry used by the SEPIC converter used to extract power from the AC generator.
Figure 11C:
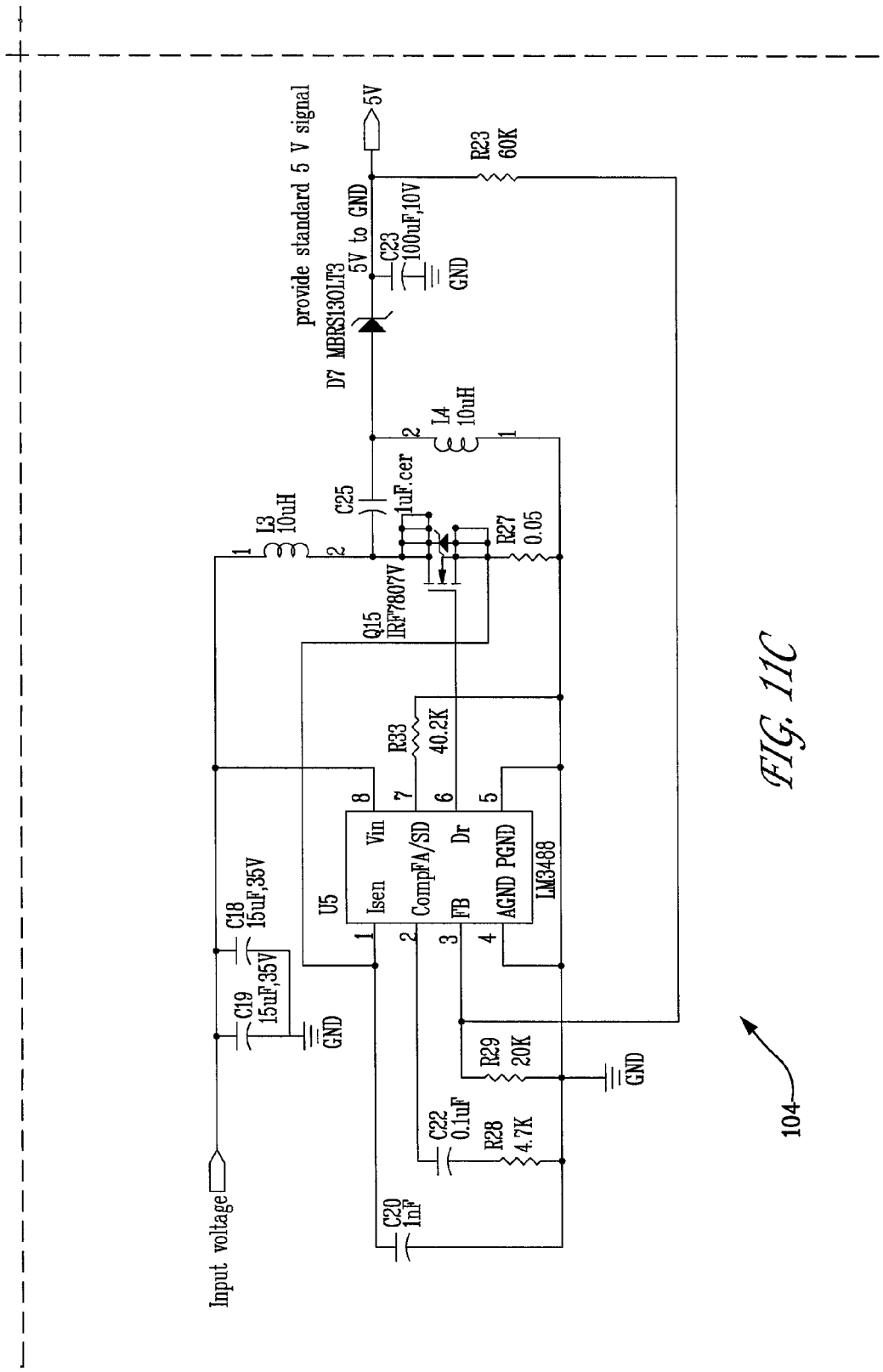
Figure 11D:
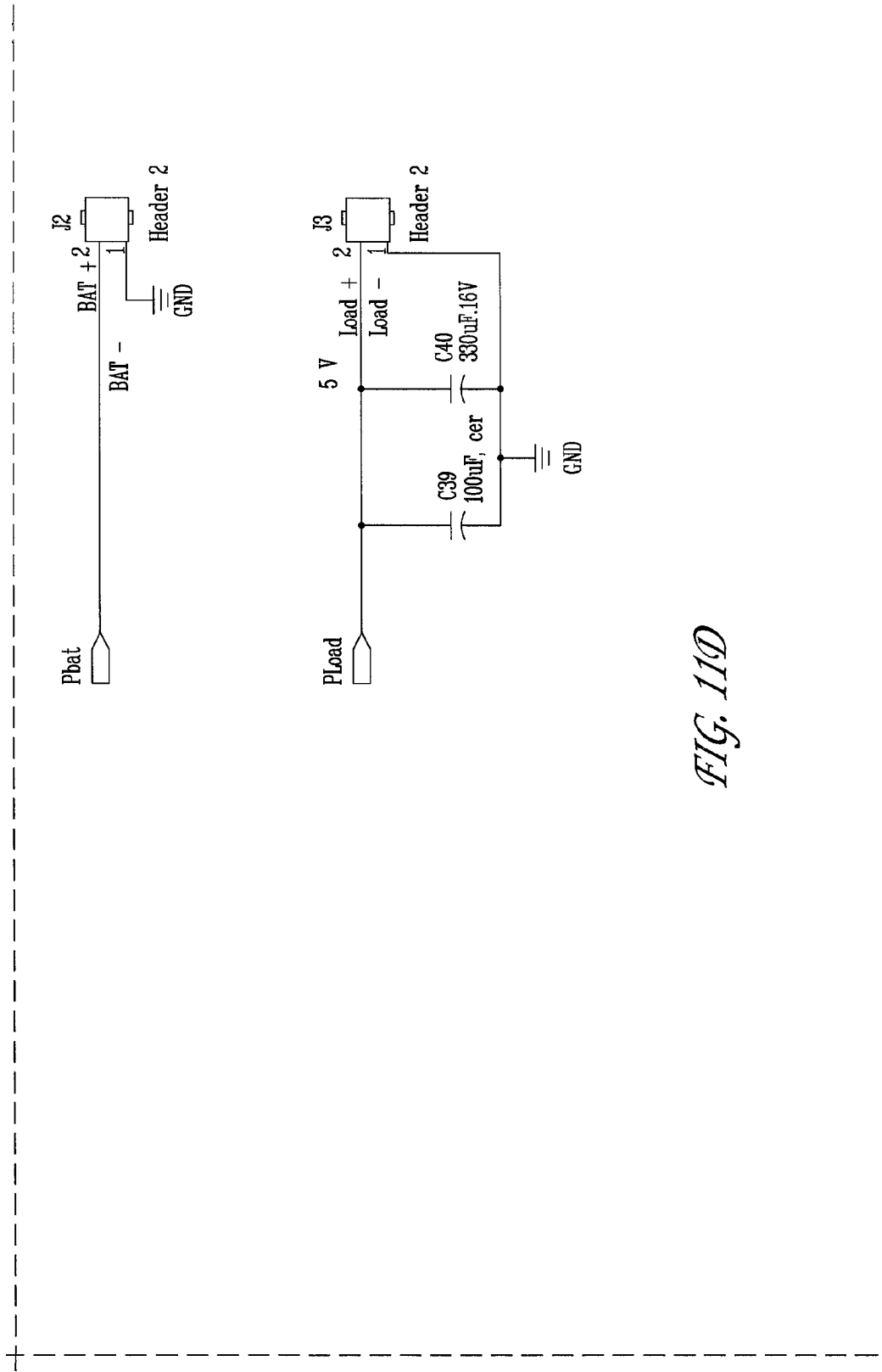

Each of these circuits is shown in FIG. 11. The ultracapacitor energy storage system 100 of FIG. 11 is similar to that of the circuit of FIG. 7 but with more capacitors in series to support higher voltage levels. For example, in this design the converter output can reach as high as 25V. Higher voltages can also be accommodated if needed. The battery charger 102 is another SEPIC converter, whose IC controller implements a programmable-current/constant-voltage battery charger suitable for lithium battery technologies. Yet another SEPIC converter 104 with an IC may be used to provide a constant 5V output voltage, suitable for powering electronic loads. The value of this output voltage can be readily changed as desired.

Should the ultracapacitor energy storage system 100 be full, and the amount of power provided by the main SEPIC converter exceed that required by the battery charger 102 and electronic load, the 10 W load resistor 106 will be connected in parallel to the ultracapacitor voltage to absorb this excess power. This is achieved by connecting the load resistance when the ultracapacitor voltage exceeds 25V.

In addition to its ability to emulate a resistive load, another important feature of the flyback converter 50 in the embodiment of FIG. 5 is the ability of its output voltage to be either less than or greater than the input voltage. This is important in the backpack application due to the highly variable nature of both the input and output voltages of the flyback converter 50. However, the flyback converter 50 suffers from the presence of leakage inductances in the flyback transformer, which can generate voltage spikes across the power electronic semiconductor devices, and hence result in failure of the circuit. This can be mitigated through the use of a "snubber" circuit, but the presence of the snubber circuit results in additional losses.

Another feature of the embodiment of FIG. 8 is that it allows the emulation of loads more complex than a simple resistive load. This can be important, as the optimal load for the AC generator 36, in terms of maximizing efficiency, may not necessarily be a resistive load. As an example, consider a permanent magnet DC generator. The power $P_{em}$ converted from mechanical to electrical form can be written as follows:

$$P_{em} = \Lambda_{PM} I \omega_r,$$

where $\Lambda_{PM}$ is the flux-linkage generated by the permanent magnets, I is the armature current, and $\omega_r$ is the angular velocity of the rotor. If it is assumed that mechanical losses in the machine can be modeled by a constant torque $\tau_{loss}$ and that electrical losses are limited to $I^2R$ winding losses, the efficiency of the generator can be written as follows:

$$\eta = \frac{\Lambda_{PM} I \omega_r - I^2 R}{\Lambda_{PM} I \omega_r + \tau_{loss} \omega_r}$$

The current drawn from the generator that maximizes the generator efficiency can therefore be determined using basic optimization theory, and is as follows:

$$I = \frac{-\tau_{loss} R + \sqrt{[\tau_{loss} R]^2 + \Lambda_{PM}^2 \omega_r R \tau_{loss}}}{\Lambda_{PM} R}$$

Hence, the optimal current drawn from the generator can be a complex function of rotor speed. When optimizing efficiency, however, it should be noted that the efficiency of the power electronic circuitry should also be taken into account.

It should be noted that the optimal load is not necessarily the load which maximizes efficiency. The mechanical power drawn by the generator results in a mechanical damping on the backpack's spring-mass system. If the amount of damping is too low, a suboptimal amount of power is harvested. However, if the amount of damping is too high, the system will be overdamped, which will limit the excursion of the backpack and hence also result in a suboptimal amount of power harvested. It can therefore be shown that an optimal amount of damping exists which will maximize the amount of power harvested. Furthermore, it is important that the effects of the AC generator 36 not have an undesirable ergonomic effect on the backpack wearer. The optimal load that is to be emulated is therefore determined through a weighted optimization of the amount of mechanical power withdrawn from the backpack, the combined efficiency of the AC generator 36 and the power electronic circuitry 40, and the ergonomic effects on the wearer.

In addition to determining this optimal load, the converter design may be optimized to maximize its efficiency through, for example, synchronous rectification. The diodes of the rectifier circuit 46 and DC-DC converter 54 of FIG. 5 can be replaced with MOSFETs that are controlled in such a way as to mimic diode behavior. For example, ICs that drive power MOSFETs in such a way as to achieve synchronous rectification may be used. The on-state voltage of the MOSFETs will be significantly smaller than the on-state voltage drop across the diode, and so this implementation increases the efficiency of the power electronic circuitry.

The AC generator 36 exhibits its best efficiency when it is connected to a load whose power draw increases with generator voltage, such as a resistive load. However, the efficiency of the flyback converter circuit 50 may not be maximized under these conditions. Typically, power electronics can best be designed to perform optimally when the operating range is somewhat limited. By placing an appropriately sized capacitance between the AC generator 36 and the energy harvesting circuit, a compromise can be achieved between the desired operation of the AC generator 36 and the flyback converter 50 so that overall efficiency is maximized. The capacitor will limit the voltage excursions at the input of the power electronics, allowing them to operate more efficiently.

The energy harvesting circuit of FIG. 5 needs to draw power from the backpack at all times, or excessive displacements of the backpack will result, impacting the ergonomics of walking. However, should there not be an electronic load connected to the circuit, and if the batteries and ultracapacitors are fully charged, there is no place for this power to go. Accordingly, another resistive load may be added to the circuit which is enabled when the ultracapacitors reach their maximum voltage. As this resistance may dissipate significant power over long periods of time, it will be mounted externally on the backpack, with an appropriate means of dissipating the heat into the air.

The inventors have found that, when run on an actuator, the backpack generates differing levels of mechanical power depending on the stiffness of the spring 26. One approach would be to simply adjust the spring constant as noted above so that one maximizes the amount of power generated. This reasonable approach, however, could be at the expense of the ergonomics and physiology of the wearer. The inventors have found that by using an elastic coupling between the backpack frame and the load, one can change the timing and magnitude of forces from the load onto the body. This has major consequences for joint injury and metabolic cost. A key factor is the compliance of the elastic structure. For example, with the springs in the electricity-generating backpack described by Rome et al. in *Science* (2005), the accelerative forces were reduced by 30%, whereas by using a much more compliant coupling (bungee cords) in the ergonomic backpack described by Rome et al. in *Nature* (2006), there was a much larger effect-a reduction by some 82% during walking. This not only makes walking with the ergonomic backpack more comfortable, but actually reduces the metabolic cost, permitting the wearer to carry 12 lbs of extra weight for the same metabolic cost. This compliance also permits individuals to actually run comfortably with the ergonomic backpack without injury.

Another embodiment of the backpack may take advantage of the greater ergonomic benefits of the bungee backpack described in related U.S. patent application Ser. No. 11/957, 222, and be able to field convert it to an electricity generating backpack. The bungee backpack described therein obtains its superior ergonomic benefits by having very long bungee cord giving a very compliant coupling. By bypassing the pulleys as illustrated in FIG. 4, the stiffness of the elastic coupling is greatly increased and this will permit the backpack to operate closer to its resonant frequency where greater electricity can be generated. Changing the conformations would only take several minutes in the field. It is also noted that the top bar of the body frame 25 is scooped so avoid interference with a wearer's helmet.

II Additional Electricity Generating Elements for Backpack

E-MOD

The backpack described herein may be further modified to include an Electric Generation Module (E-MOD), which is a wearable human-driven electricity-generation device 130 that may generate from 200 mW up to more than 1 Watt of electricity by utilizing the rotation of the leg with respect to the hip (or the knee) to generate electricity. This approximately 45° rotary movement of the leg (FIG. 14) may be used to drive the electrical generating system described above, which will convert the extracted rotational mechanical energy into electrical energy. This mechanism will provide enough energy to power small electronic devices including, but not limited to, CD/MP3/tape players/IPODS, cell phones, night vision devices, flashlights, GPS and other similar devices. These devices could be powered in real time (e.g., an IPOD charging holster can be mounted to the top of the device). Also, unused electrical energy may be utilized to charge either an onboard battery or the batteries that reside in the various portable electronic devices or, for example, special portable medical conditions where medical equipment may need to be carried and a battery recharging system would help. The electricity generating device 130 is sufficiently lightweight so it can be worn by a wide range of individuals including young and old, military and civilians, firemen, first responders, disaster relief workers, explorers, recreational hikers, field scientists, and the like.

The E-Mod 130 is particularly effective when it is integrated with a very stiff belt 132 and held on by a belt clip 134 that can withstand the torque generated by a wand on the leg without rotating the shell of the generator. Certain backpack belts and military belts are particularly stiff, preventing rotation.

Figure 14:
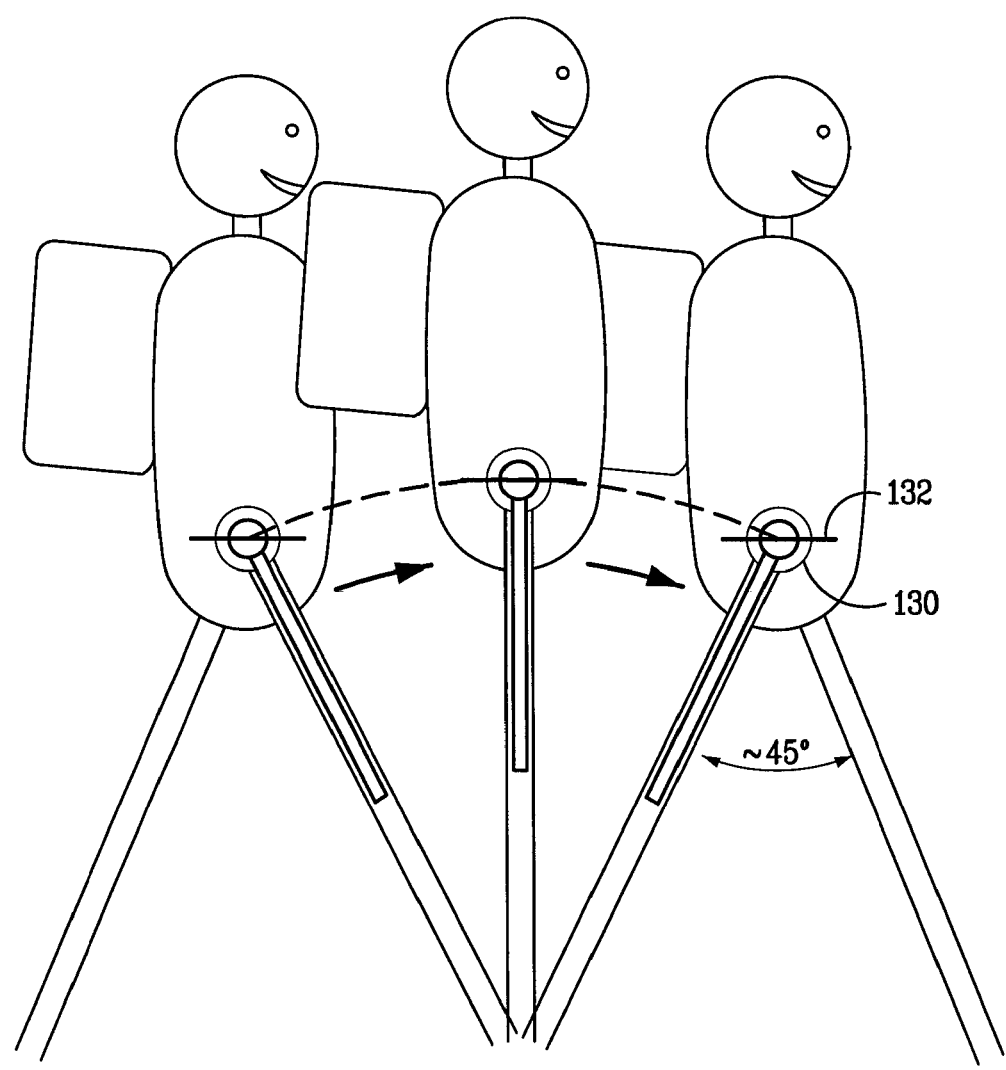
FIG. 14 illustrates a simplified depiction of an embodiment of an E-MOD device for converting the rotation of the leg with respect to the hip (or the knee) into electricity.
Figure 15:
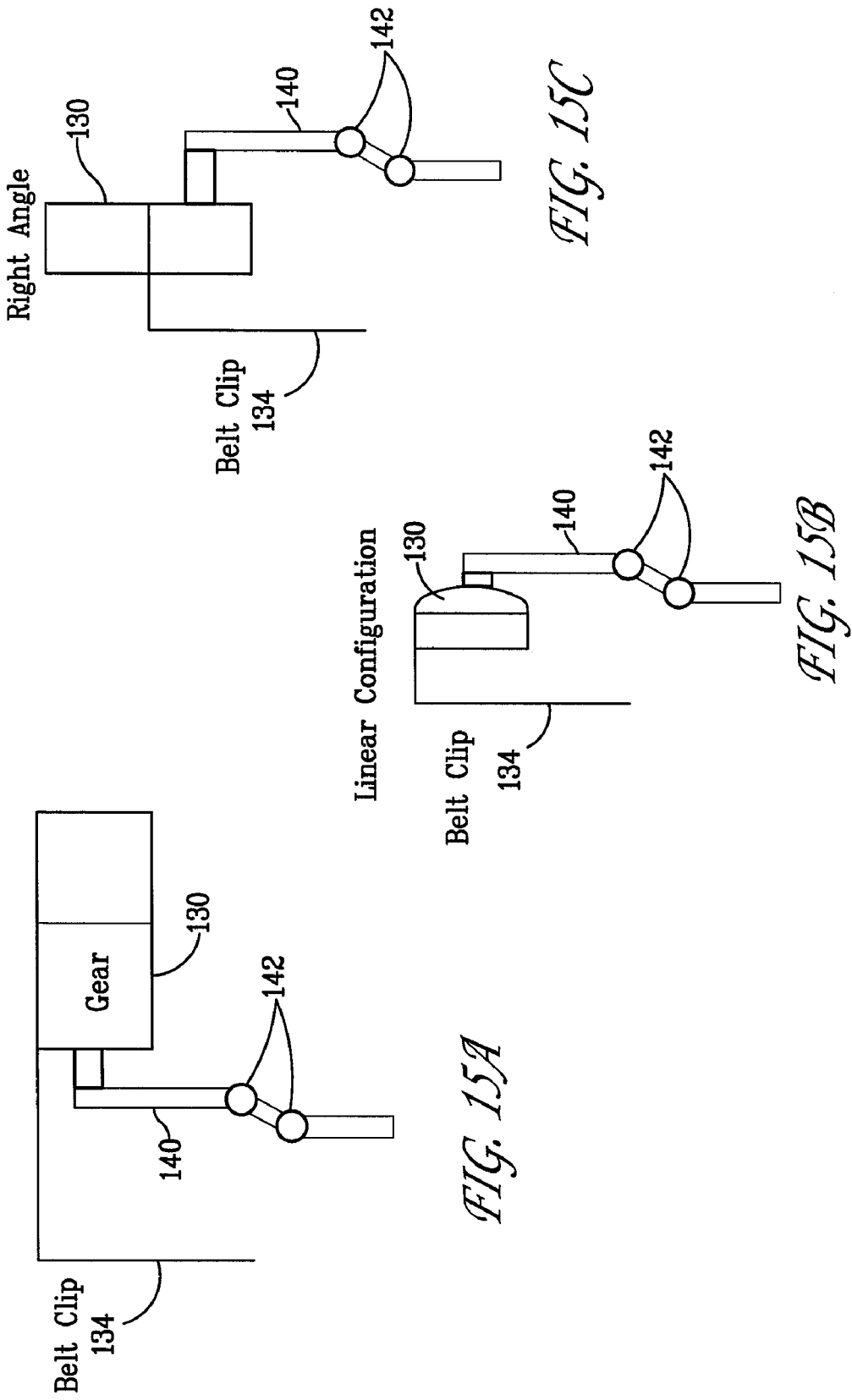
FIG. 15 illustrates the hinged wand that may be bent to best fit comfortably against the leg of the wearer so as to turn a crank gear in an AC generator as the wearer's leg moves while walking or running.
Figure 16:
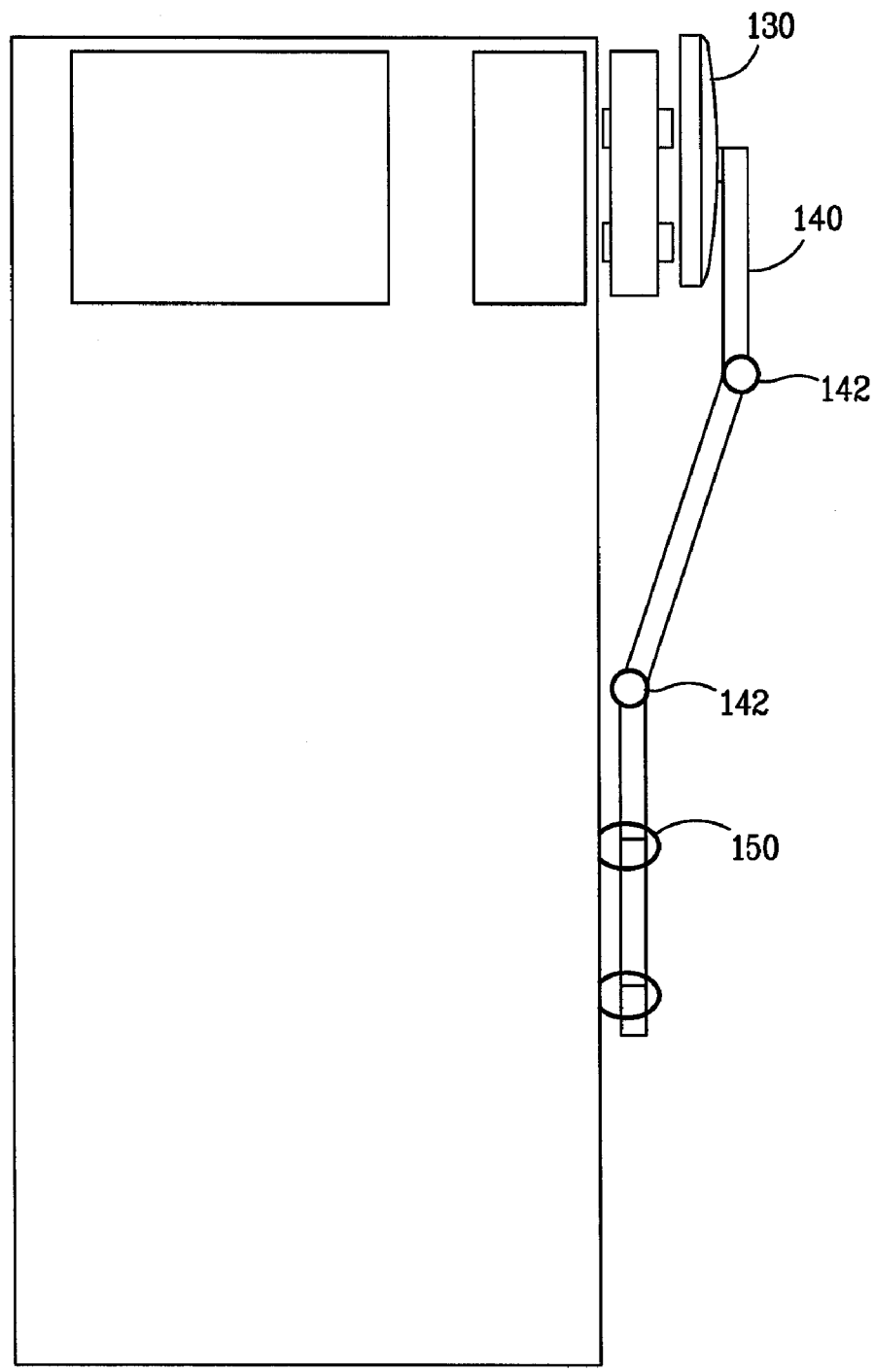
FIG. 16 illustrates the E-MOD device attached to the outside of the wearer's leg by a fastening device (loops) on the outside of the wearer's clothing.

In an exemplary embodiment, the energy conversion system of the E-Mod 130 is located at the hip as shown in FIG. 14, and a hinged wand 140 extending from the device (FIGS. 15a, 15b, 15c) will be attached to the outside of the wearer's leg by either elastic material, a fastening device 150 on the outside of the clothing (FIG. 16), or a special pocket made in the clothing to accept the wand (not shown). As illustrated in FIG. 15, the wand 140 includes several hinges or joints 142 so that the wand 140 may be bent to best fit comfortably against the leg of the wearer. The wand 140 transmits rotational force without putting a force on the axle perpendicular to its length. As the person walks, the rotation of the leg (femur) with respect to the hip (approximately 45°) will be mechanically transmitted to the energy conversion system by, for example, cranking a gear within generator 130 with wand 140. Specialized belts 132 may be used that hold the generator 130 in place using clamps. The belts 130 may have several holes through which locating pins 160 and/or grommets 162 from the clamp may project, preventing the rotation of the generator 130 (FIG. 17).

Specially designed clothing such as trousers (FIG. 16) can help to hold the energy conversion system in place and to affect the rotational movement of the wand 140. For example, a loop or elastic material 150 may be sewn into the trousers to secure the wand 140. If necessary, an elastic loop, which goes around the limb, can be placed inside the trousers to keep the trousers moving with the leg when walking. As noted above, a special pocket (not shown) in the material also may accept the wand 140 and keep it out of sight.

Figure 18:
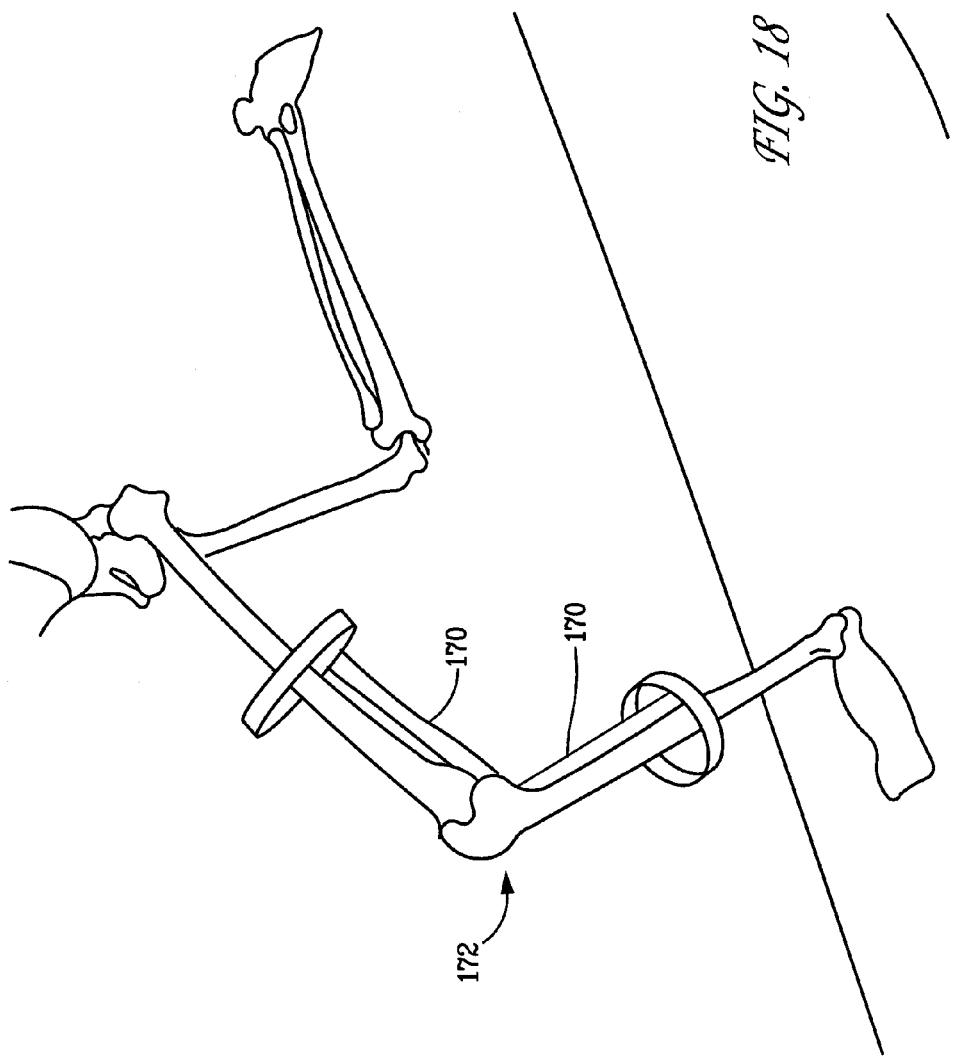
FIG. 18 illustrates an embodiment of the E-MOD device for mounting on the patient's knee for cranking the generator as a result of movement of the patient's knee.

Although the hip is the preferred location, another possible location for the generating device is the knee, as illustrated in FIG. 18. In this embodiment, the wands 170 serve to crank the gears of a generator 172 mounted at the wearer's knee. A similar device is disclosed in WO 2007/016781 by Donelan et al.

Different types of energy conversion systems can be used. One method is using a geared electromagnetic generator (or motor) 130 to generate the electricity. The motor could be either in-line with the axle axis or at right-angles to it as shown in FIG. 15. Alternately, more recently developed materials such as, but not limited to, piezoelectric, single crystal piezoelectrics, electroactive polymers (e.g. elastomers, electrostrictive materials) and yet to be discovered materials may provide a lighter more attractive system either in a geared on ungeared configurations.

The devices illustrated in FIGS. 14-18 have been found to produce 30-100 mW during walking and 200 mW during running. As the resistive force of the wand 140 does not produce any interference with walking or running, more powerful generators may be used that would permit the generation of 0.25-0.5 W during walking and 0.5-1 W or more during running. When not locomoting, a handle (not shown) also permits electricity generation by hand. In all cases, as in the backpack embodiment described above, the energy conversion systems will contain the necessary conditioning electronics. In the case of the AC generator, this includes a full wave rectifier, a DC-DC converter, and storage batteries or capacitors as in FIG. 5.

Power Generation when not Walking

If one depends on the electricity generation capabilities of the backpack when not on the electric grid, then the wearer must have the option of generating electricity when he/she is not actually walking. For instance, rain, wind, or darkness can prevent the wearer from walking around. If he/she is critically dependent on electricity to, for example, keep vaccines cool, provide communications, or GPS capabilities, then there must be an alternate way to generate electricity.

In a first embodiment, the electricity generation of the backpack can be used by holding the backpack vertically and using one's hands to rhythmically push the pack body down with respect to the frame while letting the spring return the load to its appropriate position and then push down again. No additional equipment is required in this embodiment.

In a second embodiment, one can use the stronger leg muscles to achieve the same result by having the backpack lay horizontally with its frame down and sitting with his/her feet against the pack body. The load could then be pushed by the feet in a rhythmic way so as to generate electricity. Of course, the frame must be prevented from moving, which can be achieved by lodging it against a tree, using tent stakes, or using a harness 112 and foot pads 113 that accommodate the bottom and feet of the user to keep the frame from moving away (FIG. 12(b) as the foot pads are pushed by the user's feet. Using this latter approach, it is possible to obtain a similar amount of power as one obtains during walking.

If a larger level of power is needed, then the linear motion of the legs can be converted to rotary motion of the generator by attaching a lightweight bicycle ergometer 110 to the frame of the backpack as illustrated in FIG. 12(a)). The pedals of the ergometer 110 permit the user to crank an attached generator as a recumbent ergometer by sitting in the harness 112 and cranking the pedals of the ergometer 110. The harness 112 prevents the backpack from moving with respect to the user while pedaling. Of course, the ergometer 110 of FIG. 12 also can be turned with the hands as well as the feet although the power will not be as high. Up to 100 W may be generated using the ergometer 110 when the backpack is not being worn. Although a connection to the backpack generator 36 can be made with cables, in this embodiment a second lightweight generator is used that is directly attached to the ergometer 110 and designed to provide higher electricity generation than one obtains during walking. Power generated by the bicycle ergometer 110 is run through the backpack electronics.

III. Power Uses for the Electricity Generating Backpack

Providing Power in Remote Areas

As noted above, the power generating backpack of the invention may be used to generate power for operating electronic devices of all types. Alternatively, the device of the invention may be used to generate small levels of electricity for use in remote villages in developing countries. In a report for the United Nations entitled "New Village—"Leapfrogging the Grid" on a Micro Scale," the author's thesis is that new portable devices, coupled with a micropower sources such as the backpack, can result in dramatic benefits with only small financial investments. For example, a scourge in remote villages is the contaminated drinking water. SteriPen is a low-power portable UV light device that can kill the microbes in a 0.5 liter of water using only 225 Joules of electricity (5 W for 45 s). The backpack of the invention may be used to power such devices as well as communication devices (cell/satellite phones) that can be used in case of natural disaster or medical emergency to summon help. Furthermore, low-power medical instrumentation can permit the ability to conduct rudimentary medical tests in the village.

Another potentially extremely important use of the electricity-generating backpack of the invention is to provide electricity for powering a small refrigeration system to keep vaccines and medicines cool while being delivered in remote areas. It is difficult to deliver and dispense vaccines (and certain medications) to remote areas, as these must remain refrigerated to retain their potency. As will be explained below, a small refrigeration system may be integrated into the electricity-generating backpack to keep vaccines and medications cool during delivery. In the embodiments described below, it was assumed that the cooling system must be able to maintain a temperature of 4° C., regardless of the external environment. Secondary considerations are the minimization of power consumption and weight of the cooling mechanism. As will be described below, several different approaches for cooling medicine using the electricity generated by the energy harvesting backpack of the invention may be used, including:

Thermoelectric cooling
Evaporative cooling
Stirling engine cooling

It is noted that the vapor-compression refrigeration technique is widely used in domestic and commercial refrigerators. This technique is very mature and relatively inexpensive. However, vapor-compression refrigeration uses refrigerants which are typically undesirable due to their negative environmental impact. The weight of the compressor is also a disadvantage. In addition, the efficiency of this approach is not as high as that of the Stirling engine cooler. Therefore, the vapor-compression refrigeration technique is not considered as a potential feasible solution for the self-sustainable medical cooling system.

Thermoelectric Cooling

Thermoelectric cooling uses the Peltier effect to create a heat flux between the junctions of two different types of material. Heat is then transferred from one junction to the other by the application of a voltage, and hence current, between the junctions. As a result, electrical energy is consumed by the device. Peltier devices have no moving parts, are maintenance free, and are relatively light. However, their overall cooling efficiency is generally only around 5-10% of that of the ideal Carnot cycle. This is very low compared with the 40-60% that can be achieved by conventional vapor-compression cooling systems.

Figure 19:
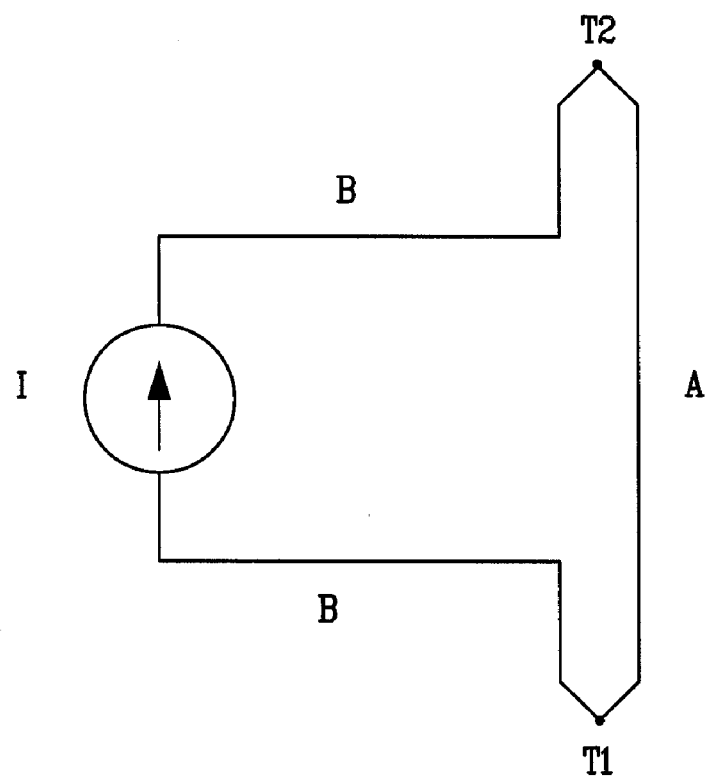
FIG. 19 illustrates an embodiment of a thermoelectric cooling circuit.

When a current I is made to flow through the circuit, as shown in FIG. 19, heat is evolved at the upper junction ($T_2$) and absorbed at the lower junction ($T_1$). The Peltier heat rate absorbed by the lower junction, $\dot{Q}$, is equal to $$\dot{Q} = \Pi_{AB} I = (\Pi_B - \Pi_A) I,$$

where $\Pi_{AB}$ is the Peltier coefficient of the device, and $\Pi_A$ and $\Pi_B$ are the coefficients of each junction material. Therefore, by controlling the current through the Peltier device, the heat absorbed by the lower junction per unit time can be controlled. As long as this value is larger than the heat transferred into the lower junction from the environment, the temperature of the lower junction can be lowered with respect to the higher junction. The lower junction is put in a confined space (e.g., the internal space of a cooler), and the desired temperature is the internal space of the cooler (i.e., not the lower junction of the Peltier device). Therefore, the performance of a thermoelectric cooler is a function of ambient temperature, the insulation capabilities of the cooler, the Peltier module geometry, and the electrical parameters of the Peltier device.

In an exemplary embodiment, the S28™ Thermoelectric Cooler by Smartparts, Inc. was used as the Peltier device. This cooler was chosen as it had the lowest power consumption of thermoelectric coolers that were commercially available. The rated parameters of this cooler are provided in Table 1 below.

TABLE 1

Rated parameters of the S28 ™ Thermoelectric Cooler

| Voltage | 12 V DC |
|---------|---------|
| Power | 25 Watts max. |
| Weight | 5 lbs |
| Volume | 8 gallons |

During testing of the Peltier device, it was discovered that the internal temperature of the cooler rises more quickly when the device is off than it falls when the device is on. As a result, one conjectured approach, involving operating the Peltier device at a duty cycle to reduce power consumption, would not be very effective. These results also suggest that the thermoelectric cooler would not be a particularly effective cooling approach with the energy harvesting backpack of the invention in that the thermoelectric cooler was not able to achieve the desired temperature (4° C.) even under relatively benign ambient conditions. Furthermore, the power required by the device exceeded by far the power currently available from the energy harvesting backpack.

Evaporative Cooling

Figure 20:
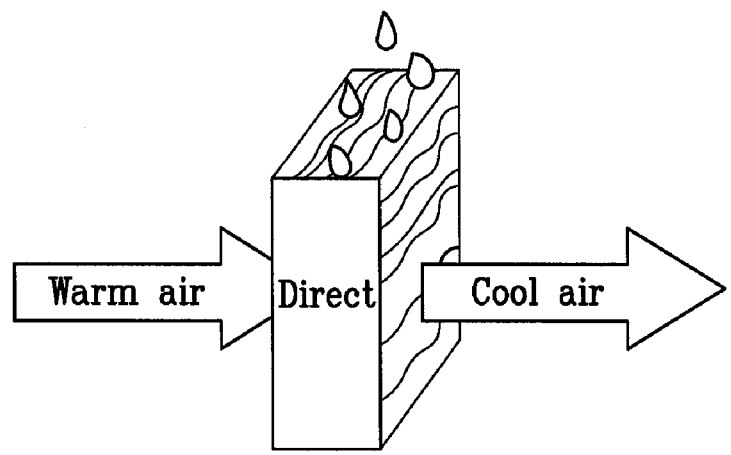
FIG. 20 illustrates of a direct evaporative cooling structure of the thermoelectric cooling circuit of FIG. 19.

Evaporative cooling was also considered as one of the potential candidates for the self-sustainable medical cooler because of its high efficiency and simple operation mechanism. Evaporative cooling is a physical phenomenon in which the evaporation of a liquid (here water is used), typically into surrounding air, cools an object or a liquid in contact with it. There are different evaporative cooling methods, such as direct evaporative cooling, indirect evaporative cooling, indirect/direct evaporative cooling, and indirect/indirect evaporative cooling. The simplest one is direct evaporative cooling, in which case outside air is blown through a water-saturated medium (usually cellulose) and cooled by evaporation. The cooled air is circulated by a blower. Direct evaporative cooling adds moisture to the air stream until the air stream is close to saturation. FIG. 20 shows the direct evaporative cooling structure. Evaporative cooling performance is based on psychrometrics, and can be calculated from a psychrometric chart. In the conventional psychrometric chart, the dry-bulb temperature is that of an air sample measured by an ordinary thermometer, and the wet-bulb temperature is the lowest air temperature achievable by evaporating water into the air such that the air is brought to full saturation. The greater the difference between the wet bulb and dry bulb temperature is, the greater the achievable temperature reduction will be.

Figure 21:
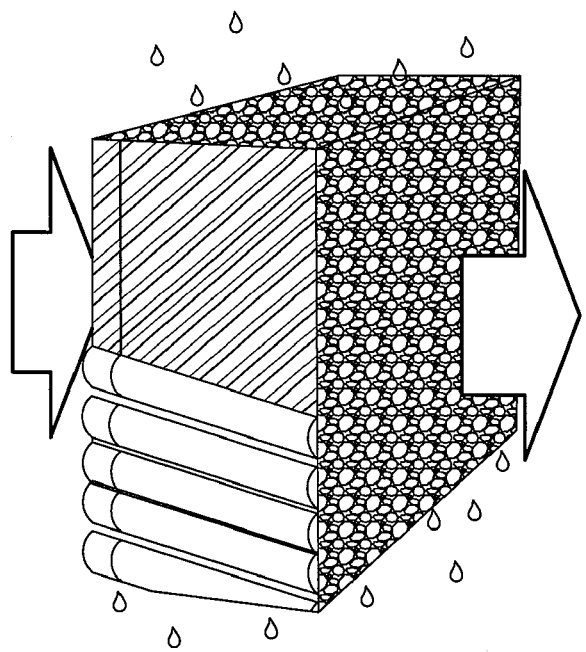
FIG. 21 illustrates a direct evaporative cooler built using a CELdek® pad as the cooling media in the evaporative cooler.

For direct evaporative cooling, the wet-bulb temperature (WBT) stays the same, while the dry bulb temperature (DBT) is reduced. For a starting dry-bulb temperature (DBT_start) and wet-bulb temperature (WBT_start):

temperature drop achievable(TDA)=(DBT_start−WBT_start)*(efficiency of the media), achievable temperature=DBT_start−TDA=DBT_final A direct evaporative cooler was built and tested using a CELdek® pad as shown in FIG. 21 as the cooling media in the evaporative cooler. Generally, CELdek® pads possess a high cooling efficiency (around 90%) and long life.

Figure 22:
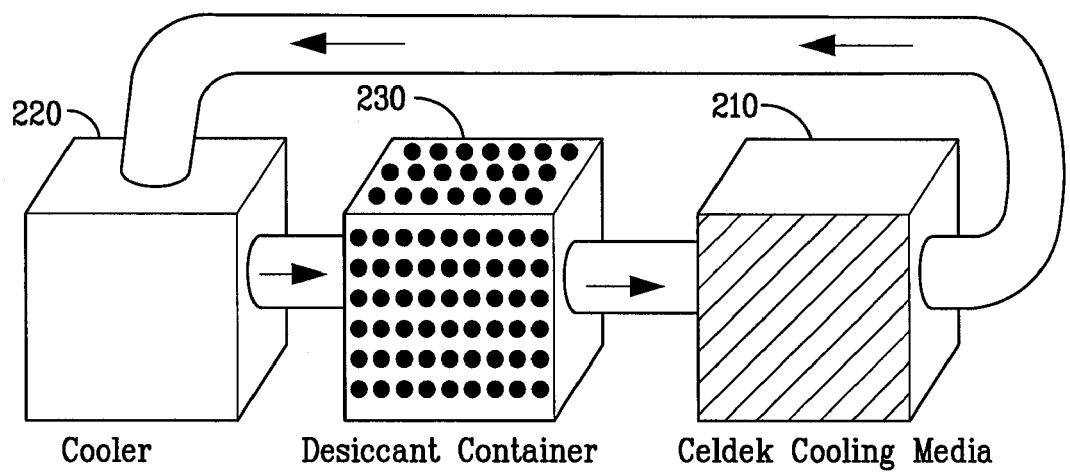
FIG. 22 illustrates an embodiment of an evaporative cooler built as a confined air system.

The air flow through the cooling media is implemented through a DC fan whose input voltage is 12 V, input power is 1.44 W, and maximum air flow is 63.5 cubic feet per minute in an exemplary embodiment. In the case of an evaporative cooler built as a confined air system as shown in FIG. 22, the air goes through the CELdek® cooling media 210 soaked with water, is cooled, and then enters the cooler 220. The air is then blown through an air dehumidifier 230 filled with desiccant to be dried, then enters the CELdek® cooling media 210 again to close the cycle.

It was found in this system that the desiccant does not dry the air quickly enough, which makes the relative humidity of the air cycled in the cooling system very high. This means that the difference between the dry-bulb temperature and the wet-bulb temperature is very small, and so the temperature drop will be very small, which makes this structure not feasible.

Figure 23:
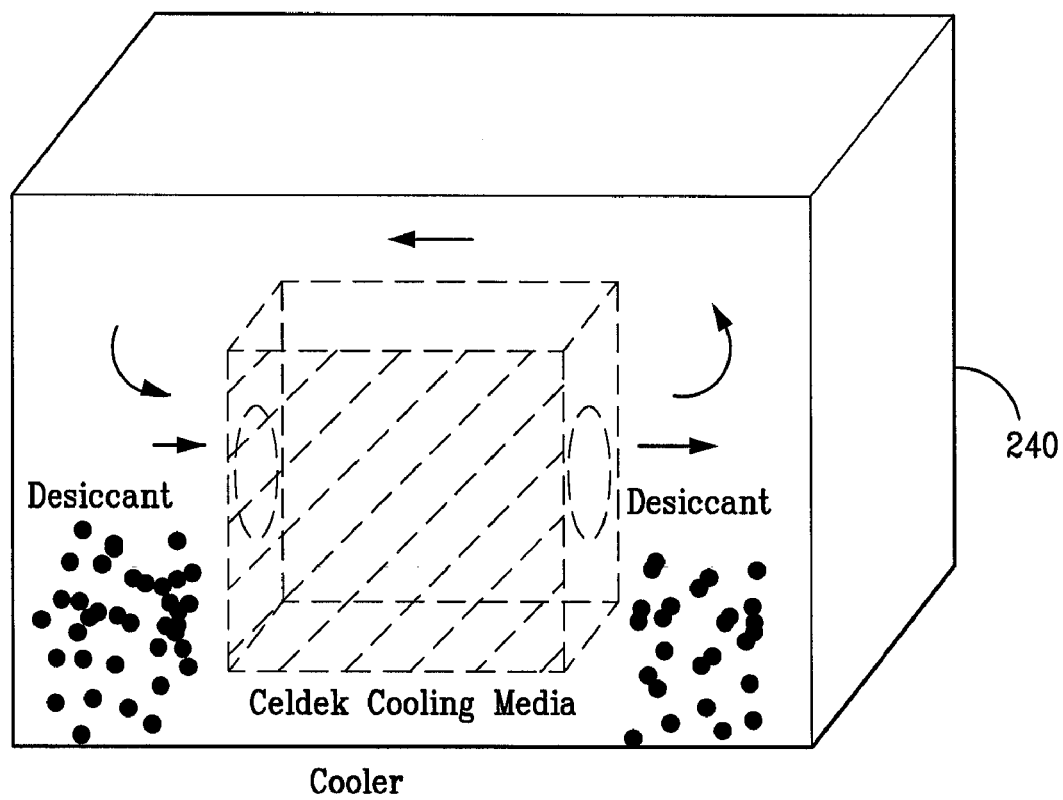
FIG. 23 illustrates an alternative evaporative cooler in which the desiccant container is omitted and the desiccant is put inside of the cooler.

In an alternate structure, the desiccant container 230 is omitted and the desiccant is put inside of the cooler 240. FIG. 23 shows this structure, which also resulted in a negligible temperature drop, so that the structure is not feasible.

In another alternate structure, the cooler is not sealed, which means that the air in the cooler can be exchanged freely with the ambient air. In this case, the working air is from the environment, which can be considered to have infinite capacity, and the dry-bulb and wet-bulb temperature can be considered as constant at one specific testing condition. Thus, the equations (2) and (3) can be used to calculate the temperature drop and achievable temperature. FIG. 24 shows the structure of this evaporative cooler 250. During testing, the ambient temperature was 23° C., and the ambient relative humidity was 38%. When the cooling fan was turned on, the temperature inside the cooler dropped from 23° C. to 14.8° C. From the psychrometric chart, the wet-bulb temperature (WBT_start) of the air at this humidity is 14° C. From equation (2) and (3):

$$\text{temperature drop achievable}(TDA) = (\text{DBT\_start} - \text{WBT\_start}) *$$
$$(\text{efficiency of the media})$$
$$= (23 - 14) * 0.9$$
$$= 8.1° \text{ C.}$$

$$\text{achievable temperature} = \text{DBT\_start} - TDA$$
$$= \text{DBT\_final}$$
$$= 23 - 8.1$$
$$= 14.9° \text{ C.},$$

which is very close to the actual measured final temperature.

In this example, the evaporative cooling technique is very efficient (with only 1.44 W input power, the achieved temperature drop is 8.2° C.) and simple. However, there are serious intrinsic disadvantages with this approach in the backpack application of the invention. From the above equations, it can be seen that the final temperature of the cooler is determined solely by the status of the working air (i.e., the initial dry-bulb temperature and the relative humidity). Even when the efficiency of the media is 100% and the initial relative humidity of the air is 0%, to achieve 4° C. final temperature the initial dry-bulb temperature has to be less than 17° C. When the ambient temperature is above 17° C., it is theoretically impossible to lower the air temperature to 4° C., no matter the rate of air flow of the fan, or how perfectly the dehumidification method can work. This was partially confirmed by changing the fan to a more powerful one, whose input power is 6.0 W. There was no improvement seen for the achievable temperature. Therefore, the evaporative cooling technique does not appear to have the ability to achieve the desired cooler temperature over the range of ambient conditions that can be expected, which eliminates its feasibility in the proposed application.

Stirling Engine Cooling

Unlike internal combustion engines, Stirling engines are closed-cycle, which means that the working fluid is permanently contained within the system. The Stirling engine has the potential to achieve the highest efficiency of any real heat engine, theoretically up to the full Carnot efficiency. When a motion is applied to the shaft, a temperature difference appears between the two reservoirs of the working fluid, and this makes the Stirling engine work as a refrigerator. This technology can be 70% more energy efficient and 40% more thermally efficient than thermoelectric or vapor compressor-based coolers.

In an exemplary embodiment, a Coleman® 26 Quart Stirling Power Cooler (Model # 5726-750) was used. Another existing Stirling cooler product, the Kodiak® AC/B5 Active-Cool Container, which appears to be based upon the same Stirling engine as the Coleman cooler, and targeted towards medical applications was also used. There are 5 different temperature settings available for the Coleman cooler, 10° C., 6° C., 3° C., −7° C., and −18° C. The target temperature of the cooler is 4° C., therefore 3° C. was chosen as the setting. The ratings of this cooler suggested that the power consumption of the cooler may be too high for the backpack application; however, power measurements revealed that the rated power consumption only occurred during the initial cool-down. Once the setting temperature is reached (in this case, 3° C.), a much lower power consumption is needed to keep the cooler at that temperature. FIG. 25 shows the current and power consumption of the Stirling cooler when the setting temperature (3° C.) is reached and the ambient temperature is 25° C. The average power to keep the temperature at 3° C. at this ambient temperature was approximately 7.5 W. On the other hand, FIG. 26 shows the case when the setting temperature (3° C.) is reached and the ambient temperature is 38° C. The average power to keep the temperature around 3° C. under these conditions was 14.2 W.

Figure 27:
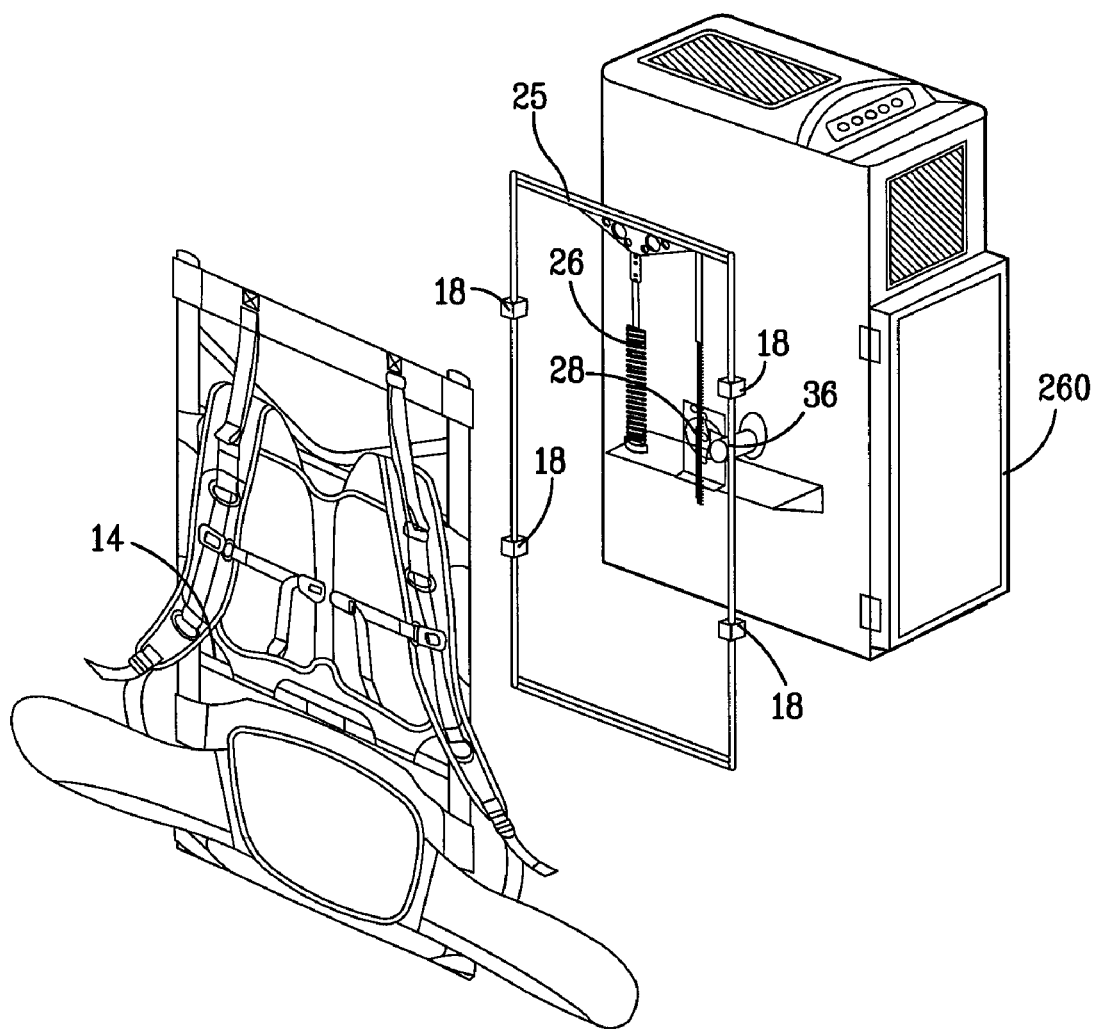
FIG. 27 illustrates a Stirling cooler attached directly to the bearing housings of an electricity generating backpack in accordance with the invention.

Of the three cooling techniques described herein, the Stirling cooler was felt to be the most appropriate choice for this application, due to its ability to control the cooler temperature independently of ambient temperature, and its relatively low power consumption when compared to thermoelectric and vapor-compression cooling. Of course, the other cooling techniques may be more appropriate for other applications. The weight and power consumption of the Stirling cooler could feasibly be used in conjunction with an energy harvesting backpack like that described above, but a smaller, lighter cooler with a lower power consumption would probably be desired. FIG. 27 illustrates such a Stirling cooler 260 attached directly to the bearing housings 18 of an electricity generating backpack in accordance with the invention. Based on the teachings provided herein, the electricity generating backpack of FIG. 27 may be designed to generate sufficient power to operate the Stirling cooler 260 to enable one to, for example, use the backpack to provide refrigerated medicines and vaccines to remote areas.

The power consumption of the Coleman® Stirling cooler while it sustains the desired temperature is comparable to the output power capabilities of the energy harvesting backpack, depending upon total backpack mass, the speed of walking, and the ambient temperature. As the wearer would not likely be walking nonstop, however, an electrochemical battery, the bicycle ergometer 110 described above, and the like would likely be required to provide power when the backpack is not in motion, as well as to provide power when the cooler requirements exceed the backpack's generating capability. Should the average power of the backpack exceed the cooling requirements, such a system could be operated indefinitely. Otherwise, the backpack power would extend the operating time of the cooler, as opposed to a battery-powered-only system.

Those skilled in the art will also appreciate that numerous other modifications to the invention are possible within the scope of the invention. For example, the efficiency of the electricity generating mechanism makes it possible to generate electrical power on the order of several watts from a small backpack which would only carry 20-30 lbs. Thus, the backpack of the invention is not limited by size. Also, those skilled in the art will appreciate that the spring 26 can be replaced by short, relatively stiff bungee cords that bypass pulleys as described in U.S. patent application Ser. No. 11/957,222. Accordingly, the scope of the invention is not intended to be limited to the preferred embodiment described above, but only by the appended claims.

What is claimed:

1. An electricity generating backpack, comprising:
   shoulder straps;
   means for accepting a load to be carried by said backpack;
   a suspension system having a first portion connected directly or indirectly to said shoulder straps and a second portion connected to said load accepting means, said suspension system incorporating a compliant mechanism that permits said second portion of said suspension system and said load accepting means to be displaced relative to said first portion of said suspension system as a result of a gait of a wearer of the backpack or the application of force to the first or second portions of the suspension system;
   a generator that converts a mechanical displacement of said first portion of said suspension system with respect to said second portion of said suspension system into electrical energy;
   an energy storage device; and
   a load emulating circuit that emulates a desired load to said generator and manages the storage of electrical energy in said energy storage device and/or the discharge of generated electrical energy to minimize overdamping and underdamping of said load by said suspension system.

2. An electricity generating backpack as in claim 1, wherein said compliant mechanism comprises a spring with an adjustable spring constant that can be matched to a frequency of up/down movement of said first and second portions of said suspension system with respect to each other as a result of the gait of the wearer of the backpack or the application of force to the first or second portions of the suspension system.

3. An electricity generating backpack as in claim 2, further comprising a spring tension adjuster for adjusting said spring constant at a position on an outside surface of said backpack.

4. An electricity generating backpack as in claim 1, wherein said compliant mechanism comprises at least one bungee cord with an adjustable spring constant that is matched to a frequency of up/down movement of said first and second portions of said suspension system with respect to each other as a result of the gait of the wearer of the backpack or the application of force to the first or second portions of the suspension system.

5. An electricity generating backpack as in claim 4, wherein said at least one bungee cord comprises a first bungee cord and a second bungee cord against which the first bungee cord can be pulled to control the spring constant of the suspension system independent of the weight carried by the backpack.

6. An electricity generating backpack as in claim 4, further comprising a cam that adjusts the length of the bungee cord, and hence the tension on the bungee cord, said cam being located at a position on an outside surface of said backpack.

7. An electricity-generating backpack as in 6, wherein the at least one bungee cord is routed though at least one square tube at the outside surface of said backpack such that said cam projects into said square tube and clamps said bungee cord against an inside surface of said square tube.

8. An electricity generating backpack as in claim 4, further comprising pulleys within said suspension system about which said bungee cord is threaded to increase the length of the bungee cord and hence to increase the compliance of the bungee cord.

9. An electricity generating backpack as in claim 8, wherein said at least one bungee cord may be rerouted through said pulleys to change said suspension system from an electricity generating suspension system into an ergonomic suspension system.

10. An electricity generating backpack as in claim 1, further comprising a rack and pinion gear mechanism disposed such that said mechanical displacement of said first portion of said suspension system with respect to said second portion of said suspension system causes said pinion gear to rotate along said rack and to provide a displacement of a gear of said generator.

11. An electricity generating backpack as in claim 10, wherein said generator and said rack and pinion gear mechanism are located between said load accepting means and said suspension system so as to be substantially removed from environmental elements.

12. An electricity generating backpack as in claim 11, wherein at least said rack and pinion gear mechanism, suspension system, generator, energy storage device, and load emulating circuit are disposed within a protective casing that keeps out dust, dirt and/or water.

13. An electricity generating backpack as in claim 1, wherein said generator comprises a brushless AC motor.

14. An electricity generating backpack as in claim 10 wherein said generator comprises a single stage spur gear that is driven by said pinion gear.

15. An electricity generating backpack as in claim 14, wherein said generator is disposed in a space within dimensions of said means for accepting a load so that the generator or said spur gear may project into said space in a direction substantially perpendicular to a wearer's body when the backpack is being worn.

16. An electricity generating backpack as in claim 1, wherein said energy storage device comprises capacitors.

17. An electricity generating backpack as in claim 16, further comprising a DC/DC converter connected to said capacitors for providing a DC output voltage to an electronic device.

18. An electricity generating backpack as in claim 1, wherein said energy storage device comprises a battery charger circuit and rechargeable batteries.

19. An electricity generating backpack as in claim 1, wherein said load emulating circuit comprises a full-bridge diode rectifier circuit having output terminals connected to input terminals of a DC/DC converter that emulates said desired load at input terminals of the generator.

20. An electricity generating backpack as in claim 19, wherein said load emulating circuit further comprises a removable resistive load that is inserted across said output terminals of said rectifier circuit when said energy storage device is full and no load is being powered by said generated electrical energy.

21. An electricity generating backpack as in claim 19, wherein said DC/DC converter comprises a flyback or buck/boost converter operating in a discontinuous current conduction mode.

22. An electricity generating backpack as in claim 21, further comprising a controller circuit that regulates an output voltage of said DC/DC converter and constrains a duty cycle of said DC/DC converter to a maximum value.

23. An electricity generating backpack as in claim 19, further comprising a single-ended primary inductor converter having an input inductor that regulates input current thereto, said single-ended primary inductor converter including means for setting said input current to be a function of input voltage thereto so as to emulate the desired load at input terminals of said single-ended primary inductor converter.

24. An electricity generating backpack as in claim 1, further comprising a bicycle ergometer connected to said generator, said bicycle ergometer including pedals that when pedaled by foot or cranked by hand by a user mechanically cranks said generator to cause said generator to create electrical energy.

25. An electricity generating backpack as in claim 24, further comprising a harness connected to said backpack for restraining the user with respect to the backpack while pedaling the pedals of the bicycle ergometer.

26. An electricity generating backpack as claim 24, wherein the bicycle ergometer includes a second generator and electrical power generated by said second generator is routed to the energy storing device.

27. An electricity generating backpack as in claim 1, further comprising a harness and foot pads configured so that force exerted on the footpads by the feet while the backpack is restrained with respect to the user by the harness causes the relative displacement between the first and second portions of the suspension system resulting in electricity generation.

28. An electricity generating backpack as in claim 1, further comprising an electricity generating module that is adapted to clip to a waist belt of the wearer of the backpack, said electricity generating module comprising:
   a second generator having gears that, when cranked, causes a mechanical displacement that is converted into electrical energy; and
   a wand that is connected to said second generator and adapted to attach to the outside of the wearer's leg and to move with the wearer's leg to thereby crank said gears.

29. An electricity generating backpack as in claim 28, wherein said wand comprises at least one hinge that facilitates the conformity of said wand to the contours of the wearer's leg.

30. An electricity generating backpack as in claim 1, further comprising an electricity generating module that is adapted to attach at the knee of the wearer of the backpack, said electricity generating module comprising:
   a second generator having gears that, when cranked, causes a mechanical displacement that is converted into electrical energy; and
   wands that are connected to said second generator and adapted to attach to the outside of the wearer's leg and to move with the wearer's leg to thereby crank said gears.

31. An electricity generating backpack as in claim 1, wherein said load comprises a cooling system powered by said generated electrical energy.

32. An electricity generating backpack as in claim 31, wherein the cooling system comprises a Stirling Engine cooler.

33. An electricity generating backpack as in claim 1, wherein said generator is removably mounted to facilitate removal.

34. An electricity generating backpack as in claim 1, wherein said means for accepting a load to be carried by said backpack is mounted on and supported by said second portion of said suspension system, whereby said second portion of said suspension system together with said first portion of said suspension system define an internal frame for said backpack.

35. An electricity generating backpack as in claim 1, further comprising a locking mechanism for locking said first portion of said suspension system with respect to said second portion of said suspension system to prevent movement therebetween.

* * * * *